US012028614B2

(12) United States Patent
Moon

(10) Patent No.: US 12,028,614 B2
(45) Date of Patent: Jul. 2, 2024

(54) CAMERA MODULE AND ELECTRONIC DEVICE INCLUDING THE SAME

(71) Applicant: SAMSUNG ELECTRONICS CO., LTD., Suwon-si (KR)

(72) Inventor: Chanyoung Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 17/969,354

(22) Filed: Oct. 19, 2022

(65) Prior Publication Data

US 2023/0117477 A1    Apr. 20, 2023

Related U.S. Application Data

(63) Continuation of application No. PCT/KR2022/014874, filed on Oct. 4, 2022.

(30) Foreign Application Priority Data

Oct. 19, 2021   (KR) .................. 10-2021-0139412
Dec. 22, 2021   (KR) .................. 10-2021-0184864

(51) Int. Cl.
*H04N 23/68*  (2023.01)
*H04N 23/51*  (2023.01)
(Continued)

(52) U.S. Cl.
CPC ........... *H04N 23/687* (2023.01); *H04N 23/51* (2023.01); *H04N 23/54* (2023.01); *H04N 23/55* (2023.01)

(58) Field of Classification Search
CPC ........ H04N 23/51; H04N 23/54; H04N 23/55; H04N 23/687; H04N 23/57
See application file for complete search history.

(56) References Cited

U.S. PATENT DOCUMENTS 9,549,109 B2   1/2017   Kim et al.
9,726,899 B2   8/2017   Kim et al.
(Continued)

FOREIGN PATENT DOCUMENTS

JP   WO2019/065825 A1   10/2020
KR   20-2011-0008714 U    9/2011
(Continued)

OTHER PUBLICATIONS

International Search Report (PCT/ISA/210) issued by the International Searching Authority on Feb. 3, 2023 in International Patent Application No. PCT/KR2022/014874.
(Continued)

*Primary Examiner* — Marly S Camargo
(74) *Attorney, Agent, or Firm* — Sughrue Mion, PLLC

(57) ABSTRACT

A camera module includes a camera housing, a first carrier provided in the camera housing and configured to be movable, a second carrier having a lens coupled thereto, the second carrier being at least partially provided in the first carrier and configured to move relative to the first carrier in at least one direction substantially perpendicular to an optical axis of the lens, a plurality of magnets provided on the second carrier, the plurality of magnets including a first magnet and a second magnet facing directions perpendicular to each other, and a plurality of yoke members provided on the first carrier and configured to form magnetic attractions with the plurality of magnets, the plurality of yoke members including a first yoke member and a second yoke member facing the first magnet and the second magnet, respectively.

20 Claims, 39 Drawing Sheets

(51) Int. Cl.
*H04N 23/54* (2023.01)
*H04N 23/55* (2023.01)
*H04N 23/57* (2023.01)

(56) References Cited

U.S. PATENT DOCUMENTS

| | | | |
|---|---|---|---|
| 9,885,881 | B2 | 2/2018 | Kim et al. |
| 9,955,077 | B2 | 4/2018 | Lim et al. |
| 10,747,013 | B2 | 8/2020 | Lim |
| 10,884,259 | B2 | 1/2021 | Awazu et al. |
| 11,402,653 | B2 | 8/2022 | Awazu et al. |
| 11,513,308 | B2 | 11/2022 | Park et al. |
| 11,754,851 | B2 | 9/2023 | Lim |
| 2015/0256727 | A1 | 9/2015 | Kim et al. |
| 2015/0373272 | A1 | 12/2015 | Lim et al. |
| 2019/0196300 | A1* | 6/2019 | Kim .................. H02K 41/0356 |
| 2020/0225507 | A1 | 7/2020 | Awazu et al. |
| 2020/0310079 | A1 | 10/2020 | Park et al. |
| 2020/0341291 | A1 | 10/2020 | Lim |
| 2021/0088805 | A1 | 3/2021 | Awazu et al. |
| 2021/0173223 | A1* | 6/2021 | Seo ......................... G02B 7/09 |
| 2021/0173226 | A1* | 6/2021 | Lee ....................... G02B 27/64 |
| 2022/0252895 | A1 | 8/2022 | Kwon |
| 2022/0272237 | A1* | 8/2022 | Rho ....................... H04N 23/60 |
| 2022/0385822 | A1* | 12/2022 | Hwang .................. H04N 23/57 |
| 2023/0049848 | A1 | 2/2023 | Park et al. |
| 2023/0056716 | A1 | 2/2023 | Lim |
| 2023/0185164 | A1* | 6/2023 | Lee ........................ G03B 13/36 |
| 2023/0188851 | A1* | 6/2023 | Lee .................... H02K 41/0356 |
| 2023/0403452 | A1* | 12/2023 | Lee ........................ H04N 23/55 |

FOREIGN PATENT DOCUMENTS

| | | |
|---|---|---|
| KR | 10-2015-0085426 A | 7/2015 |
| KR | 10-1792441 B1 | 10/2017 |
| KR | 10-2020-0004490 A | 1/2020 |
| KR | 10-2020-0116402 A | 10/2020 |
| KR | 10-2021-0039651 A | 4/2021 |
| KR | 10-2021-0080294 A | 6/2021 |

OTHER PUBLICATIONS

Written Opinion (PCT/ISA/237) issued by the International Searching Authority on Feb. 3, 2023 in International Patent Application No. PCT/KR2022/014874.

* cited by examiner

CAMERA MODULE AND ELECTRONIC DEVICE INCLUDING THE SAME

CROSS-REFERENCE TO RELATED APPLICATION(S)

This application is a by-pass continuation of International Application No. PCT/KR2022/014874, filed on Oct. 4, 2022, in the Korean Intellectual Property Receiving Office, which is based on and claims priority to Korean Patent Application No. 10-2021-0184864, filed on Dec. 22, 2021, and Korean Patent Application No. 10-2021-0139412, filed on Oct. 19, 2021, in the Korean Intellectual Property Office, the disclosures of which are incorporated by reference herein in their entireties.

BACKGROUND

1. Field

The disclosure relates to a camera module and an electronic device including the same.

2. Description of Related Art

A mobile electronic device, such as a smartphone, may include a camera module. The camera module may include lenses, a lens barrel surrounding the lenses, and an image sensor. The camera module may support various functions. For example, the camera module may support functions related to image stabilization (e.g., optical image stabilization (OIS), digital image stabilization (DIS), or electrical image stabilization (EIS)) and auto focus (AF).

The camera module may be configured to provide an image stabilization function and an auto focus function by moving the lenses relative to the image sensor. For example, the camera module may be configured to move the lenses relative to the image sensor in directions substantially perpendicular to the optical axis of the lenses in relation to the image stabilization function, or may be configured to move the lenses relative to the image sensor in the direction of the optical axis in relation to the auto focus function.

The camera module may include various types of actuators for implementing the movements of the lenses. For example, the actuators may be provided by using a stepping motor (STM), a voice coil motor (VCM), shape memory alloys (SMA), and a piezoelectric motor.

The camera module may move a lens assembly in the directions substantially perpendicular to the optical axis when the image stabilization function is performed. For example, a structure (e.g., a lens carrier) having the lens assembly coupled thereto may be disposed to move in two directions perpendicular to each other in a camera housing, and driving forces facing the two directions perpendicular to each other may be applied to the structure. When the driving forces are applied, the structure may be unintentionally rotated. The unintended rotation may make it difficult to accurately control the position of the lens assembly and may degrade image correction performance.

The technical problems to be solved by the disclosure are not limited to the aforementioned problems, and any other technical problems not mentioned herein will be clearly understood from the following description by those skilled in the art to which the disclosure pertains.

SUMMARY

Provided are a camera module for decreasing a rotational component of a lens assembly by increasing rotational restoring forces using attractive forces acting between yoke members and magnets, and an electronic device including the camera module.

Additional aspects will be set forth in part in the description which follows and, in part, will be apparent from the description, or may be learned by practice of the presented embodiments.

According to an aspect of the disclosure, a camera module includes: a camera housing; a first carrier provided in the camera housing and configured to be movable; a lens; a second carrier having the lens coupled thereto, the second carrier being at least partially provided in the first carrier and configured to move relative to the first carrier in at least one direction substantially perpendicular to an optical axis of the lens; a plurality of magnets provided on the second carrier, the plurality of magnets including a first magnet and a second magnet facing directions perpendicular to each other; and a plurality of yoke members provided on the first carrier and configured to form magnetic attractions with the plurality of magnets, the plurality of yoke members including a first yoke member facing the first magnet and a second yoke member facing the second magnet, wherein the first yoke member includes a first part and a second part spaced apart from the first part in a lengthwise direction of the first magnet, the second yoke member includes a third part and a fourth part spaced apart from the third part in a lengthwise direction of the second magnet, the second part is longer than the first part or has a larger area than the first part, the fourth part is longer than the third part or has a larger area than the third part, the first part is closer to the second magnet than the second part, and the third part is closer to the first magnet than the fourth part.

The second part may be configured to form a larger magnetic attraction with the first magnet than the first part, and the fourth part may be configured to form a larger magnetic attraction with the second magnet than the third part.

The camera module may further include: a first coil facing the first magnet; and a second coil facing the second magnet, wherein the first magnet and the first coil are configured to move the second carrier in a direction of a first movement axis perpendicular to the optical axis through electromagnetic interaction, and the second magnet and the second coil are configured to move the second carrier in a direction of a second movement axis perpendicular to the optical axis and the first movement axis through electromagnetic interaction.

The first magnet may face the direction of the first movement axis and the second magnet faces the direction of the second movement axis, the first part and the second part of the first yoke member may be sequentially disposed in a first direction that is parallel to the second movement axis and away from the second magnet, and the third part and the fourth part of the second yoke member may be sequentially disposed in a second direction that is parallel to the first movement axis and away from the first magnet.

The first magnet and the first coil may be configured to form a driving force facing the second direction or a direction opposite to the second direction based on a direction of a current applied to the first coil, and the second magnet and the second coil may be configured to form a driving force facing the first direction or a direction opposite to the first direction based on a direction of a current applied to the second coil.

The first yoke member further may include a fifth part provided between the first part and the second part of the first yoke member, the second yoke member further includes a sixth part provided between the third part and the fourth part of the second yoke member, the fifth part is shorter than the second part or has a smaller area than the second part, and the sixth part is shorter than the fourth part or has a smaller area than the fourth part.

The first part, the fifth part, and the second part of the first yoke member may be sequentially disposed in the first direction, and the third part, the sixth part, and the fourth part of the second yoke member may be sequentially disposed in the second direction.

The second part may be configured to form a stronger magnetic attraction with the first magnet than the first part and the fifth part, and the fourth part may be configured to form a stronger magnetic attraction with the second magnet than the third part and the sixth part.

A first central axis and a second central axis parallel to the optical axis may be defined in the first magnet and the second magnet, respectively, the first yoke member may be disposed at a position in which a center of the first yoke member overlaps the first central axis when viewed in the direction of the first movement axis, and the second yoke member may be disposed at a position in which a center of the second yoke member overlaps the second central axis when viewed in the direction of the second movement axis.

A rotation axis may be defined to extend parallel to the optical axis and to pass through a center of a line segment connecting the first central axis and the second central axis so as to be perpendicular to the first central axis and the second central axis, the second part may be located farther away from the rotation axis than the first part, and the fourth part may be located farther away from the rotation axis than the third part.

The first magnet and the first yoke member may be disposed at a position in which the first central axis is spaced apart from the optical axis by a first distance in the first direction when viewed in the direction of the first movement axis.

The second magnet and the second yoke member may be disposed at a position in which the second central axis is spaced apart from the optical axis by a second distance in the second direction when viewed in the direction of the second movement axis.

When viewed in a direction of the optical axis, a first line segment connecting the optical axis and the first central axis and a second line segment connecting the optical axis and the second central axis may be defined, and an angle formed by the first line segment and the second line segment may be an obtuse angle.

The first magnet may face the direction of the second movement axis and the second magnet faces the direction of the first movement axis, the first part and the second part of the first yoke member may be sequentially disposed in a first direction that is parallel to the first movement axis and away from the second magnet, and the third part and the fourth part of the second yoke member may be sequentially disposed in a second direction that is parallel to the second movement axis and away from the first magnet.

The first magnet and the first coil may be configured to form a driving force facing the first direction or a direction opposite to the first direction based on a direction of a current applied to the first coil, and the second magnet and the second coil may be configured to form a driving force facing the second direction or a direction opposite to the second direction based on a direction of a current applied to the second coil.

According to an aspect of the disclosure, a camera module includes: a camera housing; a first carrier provided in the camera housing and configured to be movable; a lens; a second carrier having the lens coupled thereto, the second carrier being at least partially provided in the first carrier and configured to move relative to the first carrier in a direction perpendicular to an optical axis of the lens; a first magnet provided on the second carrier and configured to move the second carrier in a direction of a first movement axis perpendicular to the optical axis; a second magnet provided on the second carrier and configured to move the second carrier in a direction of a second movement axis perpendicular to the optical axis and the first movement axis; a first yoke member provided on the first carrier and configured to form a magnetic attraction with the first magnet; and a second yoke member provided on the first carrier and configured to form a magnetic attraction with the second magnet, wherein a first central axis and a second central axis parallel to the optical axis are defined in the first magnet and the second magnet, respectively, and when viewed in a direction of the optical axis, a first line segment connecting the optical axis and the first central axis and a second line segment connecting the optical axis and the second central axis are defined, and a first angle formed by the first line segment and the second line segment is an obtuse angle.

When viewed in the direction of the optical axis, a first extension line extending from the optical axis in a direction parallel to the first movement axis and a second extension line extending from the optical axis in a direction parallel to the second movement axis may be defined, the first line segment may form a second angle with the first extension line in a direction away from the second magnet, and the second line segment may form a third angle with the second extension line in a direction away from the first magnet.

Opposite surfaces of the first magnet may face the direction of the first movement axis, opposite surfaces of the second magnet may face the direction of the second movement axis, the first yoke member may be disposed at a position in which a center of the first yoke member overlaps the first central axis when viewed in the direction of the first movement axis, and the second yoke member may be disposed at a position in which a center of the second yoke member overlaps the second central axis when viewed in the direction of the second movement axis.

The first magnet and the first yoke member are disposed at a position in which the first central axis is spaced apart from the optical axis by a first distance in a first direction when viewed in the direction of the first movement axis, and the first direction is parallel to the second movement axis and away from the second magnet.

The second magnet and the second yoke member may be disposed at a position in which the second central axis is spaced apart from the optical axis by a second distance in a second direction when viewed in the direction of the second movement axis, and the second direction is parallel to the first movement axis and away from the first magnet.

According to one or more embodiments of the disclosure, the camera module may include the yoke members, each of which is asymmetrically divided, thereby increasing rotational restoring forces and reducing a rotational component.

Furthermore, according to one or more embodiments of the disclosure, the positions of the yoke members and the magnets may be moved in the directions in which the radius of rotation is increased, and thus the camera module may increase rotational restoring forces and may reduce a rotational component.

In addition, embodiments of the disclosure may provide various effects that are directly or indirectly recognized.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
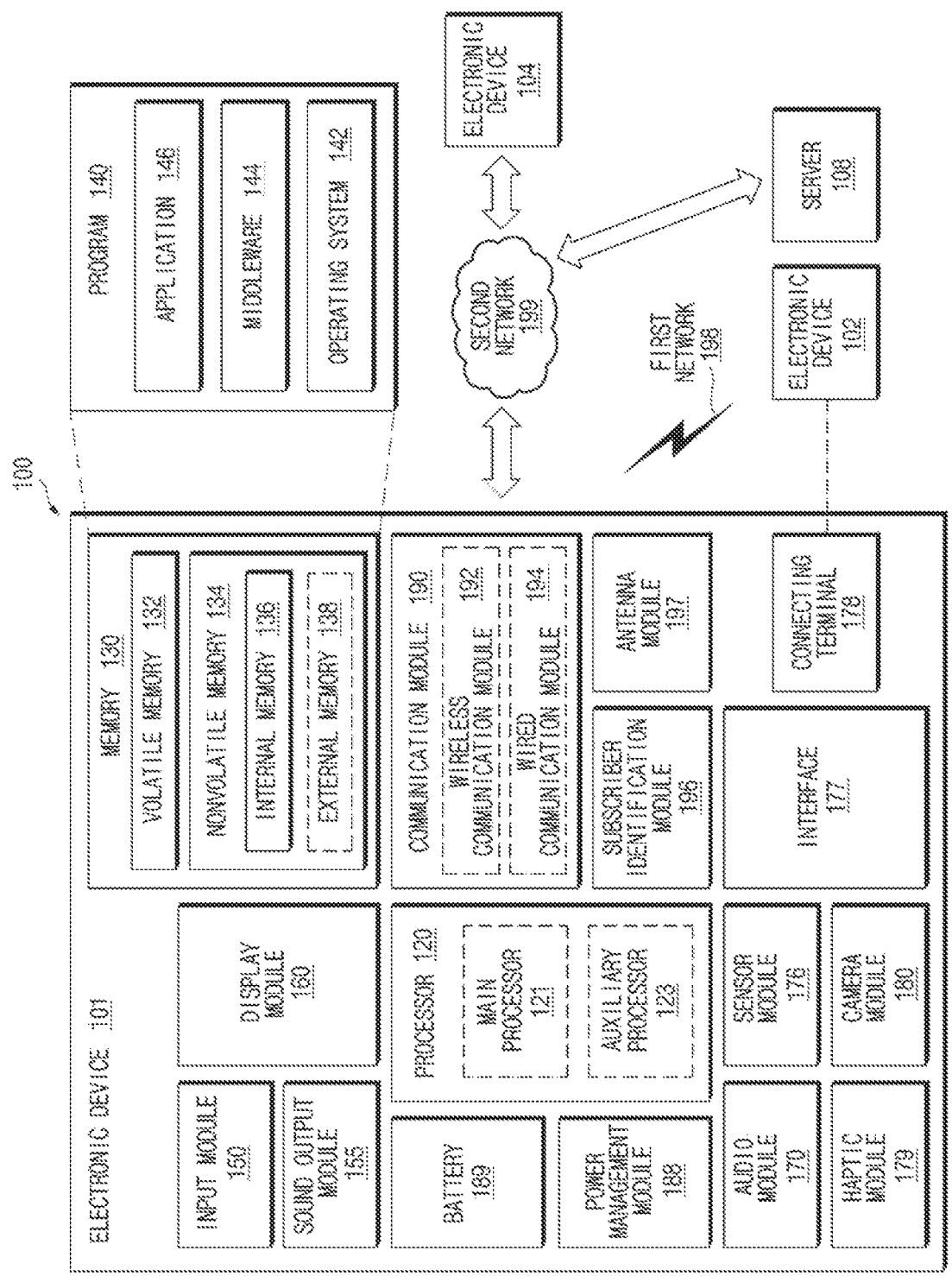
FIG. 1 is a block diagram of an electronic device in a network environment according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

In the drawings, identical or similar reference numerals may be used to refer to identical or similar components.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
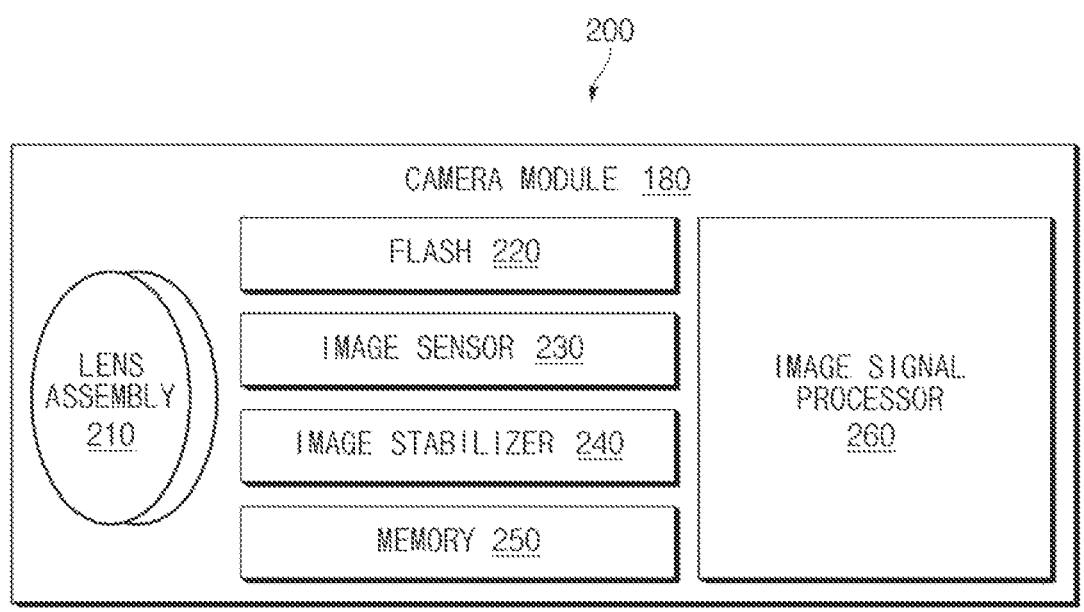
FIG. 2 is a block diagram illustrating a camera module according to various embodiments.

FIG. 2 is a block diagram illustrating the camera module according to various embodiments.

Referring to FIG. 2, the camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an IR LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
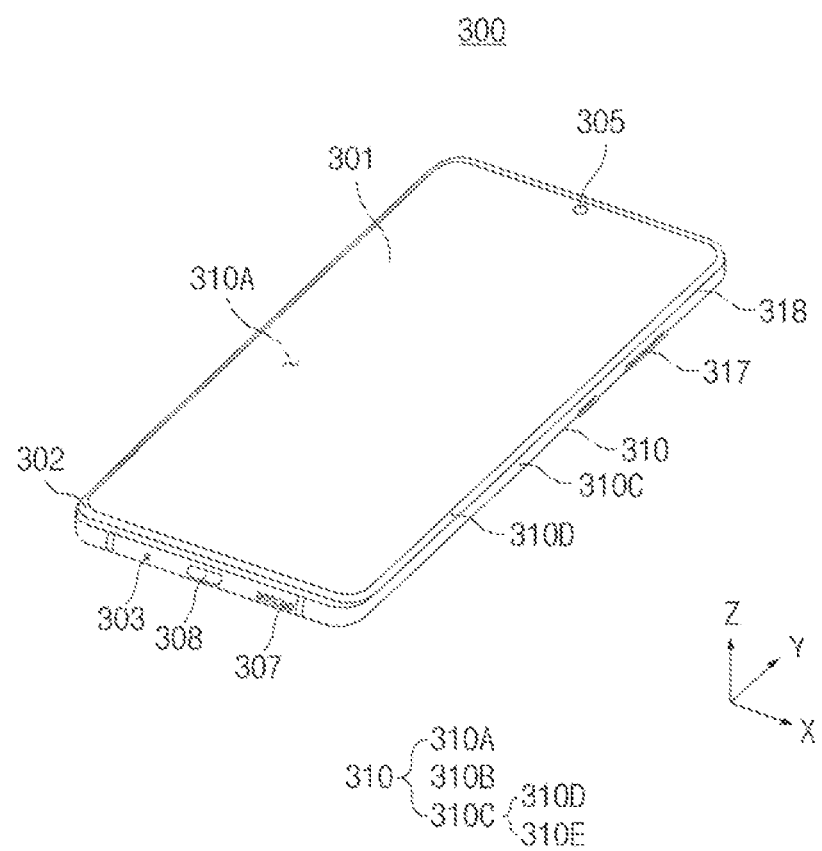
FIG. 3A is a front perspective view of an electronic device according to an embodiment.
Figure 3B:
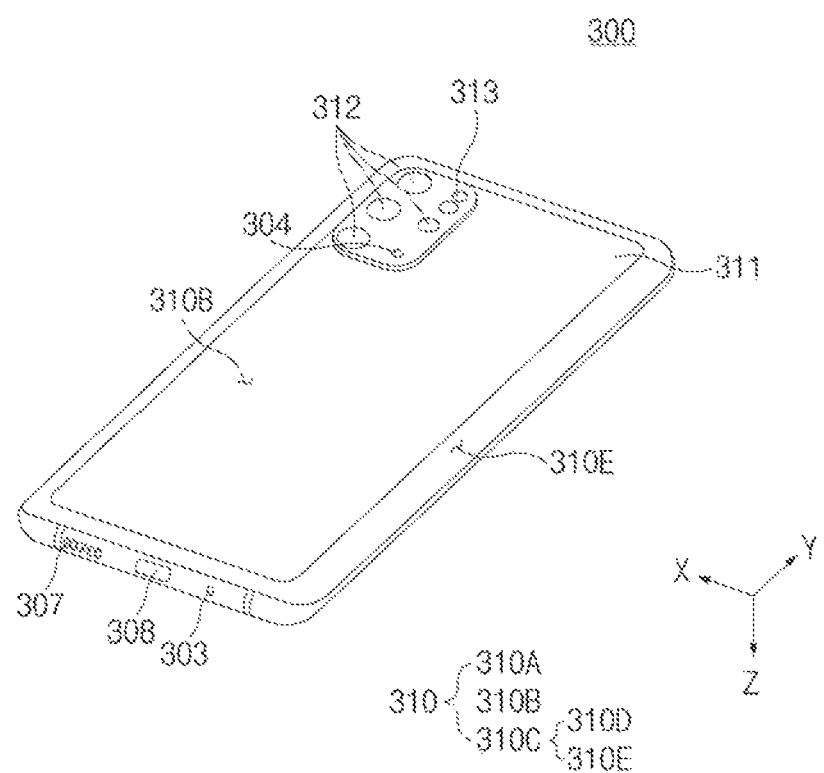
FIG. 3B is a rear perspective view of the electronic device according to an embodiment.
Figure 3C:
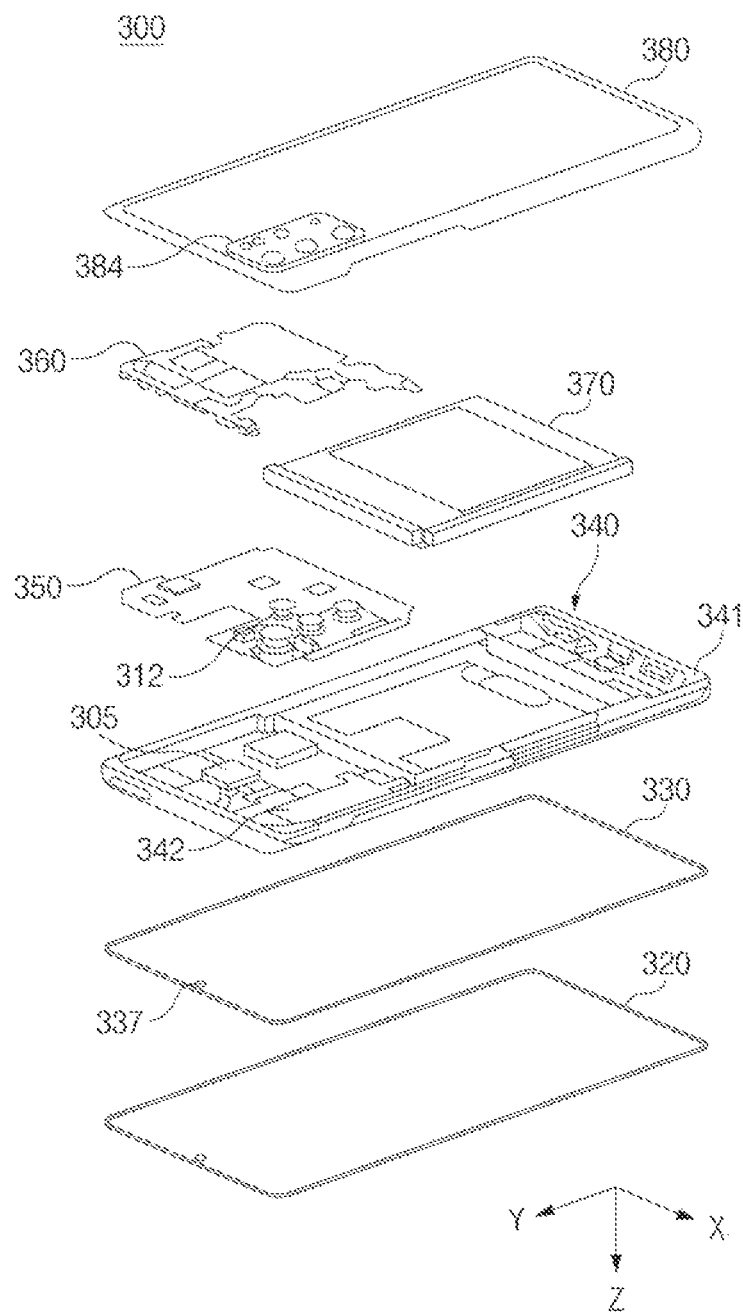
FIG. 3C is an exploded perspective view of the electronic device according to an embodiment.

FIG. 3A is a front perspective view of an electronic device according to an embodiment. FIG. 3B is a rear perspective view of the electronic device according to an embodiment. FIG. 3C is an exploded perspective view of the electronic device according to an embodiment.

Referring to FIGS. 3A and 3B, the electronic device 300 according to an embodiment (e.g., the electronic device 101 of FIG. 1) may include a housing 310 that includes a first surface (or, a front surface) 310A, a second surface (or, a rear surface) 310B, and a third surface (or, a side surface) 310C surrounding a space between the first surface 310A and the second surface 310B.

In another embodiment, the housing 310 may refer to a structure that forms some of the first surface 310A, the second surface 310B, and the third surface 310C.

In an embodiment, the first surface 310A may be formed by a front plate 302, at least a portion of which is substantially transparent (e.g., a glass plate including various coating layers, or a polymer plate). The second surface 310B may be formed by a back plate 311 that is substantially opaque. The back plate 311 may be formed of, for example, coated or colored glass, ceramic, a polymer, metal (e.g., aluminum, stainless steel (STS), or magnesium), or a combination of at least two of the aforementioned materials. The third surface 310C may be formed by a side bezel structure (or, a side member) 318 that is coupled with the front plate 302 and the back plate 311 and that contains metal and/or a polymer.

In another embodiment, the back plate 311 and the side bezel structure 318 may be integrally formed with each other and may contain the same material (e.g., a metallic material such as aluminum).

In the illustrated embodiment, the front plate 302 may include two first areas 310D that curvedly and seamlessly extend from partial areas of the first surface 310A toward the back plate 311. The first areas 310D may be located at opposite long edges of the front plate 302.

In the illustrated embodiment, the back plate 311 may include two second areas 310E that curvedly and seamlessly extend from partial areas of the second surface 310B toward the front plate 302. The second areas 310E may be located at opposite long edges of the back plate 311.

In another embodiment, the front plate 302 (or, the back plate 311) may include only one of the first areas 310D (or, the second areas 310E). Furthermore, in another embodiment, the front plate 302 (or, the back plate 311) may not include a part of the first areas 310D (or, the second areas 310E).

In an embodiment, when viewed from a side of the electronic device 300, the side bezel structure 318 may have a first thickness (or, width) at sides (e.g., short sides) not including the first areas 310D or the second areas 310E and may have a second thickness at sides (e.g., long sides) including the first areas 310D or the second areas 310E, the second thickness being smaller than the first thickness.

In an embodiment, the electronic device 300 may include at least one of a display 301 (e.g., the display module 160 of FIG. 1), audio modules 303, 304, and 307 (e.g., the audio module 170 of FIG. 1), a sensor module (e.g., the sensor module 176 of FIG. 1), camera modules 305, 312, and 313 (e.g., the camera module 180 of FIG. 1), key input devices 317 (e.g., the input device 150 of FIG. 1), a light emitting element, or a connector hole 308 (e.g., the connecting terminal 178 of FIG. 1). In another embodiment, at least one component (e.g., the key input devices 317 or the light emitting element) among the aforementioned components may be omitted from the electronic device 300, or other component(s) may be additionally included in the electronic device 300.

In an embodiment, the display 301 may be visually exposed through most of the front plate 302. For example, at least a portion of the display 301 may be visually exposed through the front plate 302 that includes the first surface 310A and the first areas 310D of the third surface 310C. The display 301 may be disposed on the rear surface of the front plate 302.

In an embodiment, the periphery of the display 301 may be formed to be substantially the same as the shape of the adjacent outside edge of the front plate 302. In another embodiment, to expand the area by which the display 301 is visually exposed, the gap between the outside edge of the display 301 and the outside edge of the front plate 302 may be substantially constant.

In an embodiment, a surface of the housing 310 (or, the front plate 302) may include a screen display area that is formed as the display 301 is visually exposed. For example, the screen display area may include the first surface 310A and the first areas 310D of the side surface 310C.

In another embodiment, the screen display area 310A and 310D may include a sensing area that is configured to obtain biometric information of a user. When the screen display area 310A and 310D includes the sensing area, this may mean that at least a portion of the sensing area overlaps the screen display area 310A and 310D. For example, the sensing area may refer to an area capable of displaying visual information by the display 301 like the other areas of the screen display area 310A and 310D and additionally obtaining biometric information (e.g., a fingerprint) of the user.

In an embodiment, the screen display area 310A and 310D of the display 301 may include an area through which the first camera module 305 (e.g., a punch hole camera) is visually exposed. For example, at least a portion of the periphery of the area through which the first camera module 305 is visually exposed may be surrounded by the screen display area 310A and 310D. In various embodiments, the first camera module 305 may include a plurality of camera modules (e.g., the camera module 180 of FIG. 1).

In various embodiments, the display 301 may be configured such that at least one of an audio module, a sensor module, a camera module (e.g., the first camera module 305), or a light emitting element is disposed on the rear surface of the screen display area 310A and 310D. For example, the electronic device 300 may be configured such that the first camera module 305 (e.g., an under display camera (UDC)) is disposed on the rear side (e.g., the side facing the −z-axis direction) of the first surface 310A (e.g., the front surface) and/or the side surface 310C (e.g., at least one surface of the first areas 310D) so as to face toward the first surface 310A and/or the side surface 310C. For example, the first camera module 305 may be disposed under the display 301 and may not be visually exposed through the screen display area 310A and 310D.

In various embodiments, when the first camera module 305 is implemented with an under display camera, the area of the display 301 that faces the first camera module 305 may be formed to be a transmissive area that has a specified transmittance as a portion of the display area that displays contents. For example, the transmissive area may have a transmittance of about 5% to about 50%. The transmissive area may include an area through which light for generating an image by being focused on an image sensor (e.g., the image sensor 230 of FIG. 2) passes and that overlaps an effective area (e.g., a field of view (FOV) area) of the first camera module 305. For example, the transmissive area of the display 301 may include an area having a lower pixel density and/or wiring density than a surrounding area.

In another embodiment, the display 301 may be coupled with, or disposed adjacent to, touch detection circuitry, a pressure sensor capable of measuring the intensity (pressure) of a touch, and/or a digitizer that detects a stylus pen of a magnetic field type.

In an embodiment, the audio modules 303, 304, and 307 may include the microphone holes 303 and 304 and the speaker hole 307.

In an embodiment, the microphone holes 303 and 304 may include the first microphone hole 303 formed in a partial area of the third surface 310C and the second microphone hole 304 formed in a partial area of the second surface 310B. A microphone for obtaining external sound may be disposed in the microphone holes 303 and 304. The microphone may include a plurality of microphones to sense the direction of sound.

In an embodiment, the second microphone hole 304 formed in the partial area of the second surface 310B may be disposed adjacent to the camera modules 305, 312, and 313. For example, the second microphone hole 304 may obtain sounds when the camera modules 305, 312, and 313 are executed, or may obtain sounds when other functions are executed.

In an embodiment, the speaker hole 307 may include an external speaker hole 307 and a receiver hole for telephone call. The external speaker hole 307 may be formed in a portion of the third surface 310C of the electronic device 300. In another embodiment, the external speaker hole 307, together with the microphone hole 303, may be implemented as a single hole. The receiver hole for telephone call may be formed in another portion of the third surface 310C. For example, the receiver hole for telephone call may be formed in another portion (e.g., a portion facing the +y-axis direction) of the third surface 310C that faces the portion (e.g., a portion facing the −y-axis direction) of the third surface 310C in which the external speaker hole 307 is formed. According to various embodiments, the receiver hole for telephone call may not be formed in a portion of the third surface 310C and may be formed by a separation space between the front plate 302 (or, the display 301) and the side bezel structure 318.

In an embodiment, the electronic device 300 may include at least one speaker that is configured to output sound outside the housing 310 through the external speaker hole 307 or the receiver hole for telephone call. According to various embodiments, the speaker may include a piezoelectric speaker from which the speaker hole 307 is omitted.

In an embodiment, the sensor module may generate an electrical signal or a data value that corresponds to an operational state inside the electronic device 300 or an environmental state external to the electronic device 300. For example, the sensor module may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an IR sensor, a biosensor, a temperature sensor, a humidity sensor, or an illuminance sensor.

In an embodiment, the camera modules 305, 312, and 313 may include the first camera module 305 (e.g., a punch hole camera) exposed on the first surface 310A of the electronic device 300, the second camera module 312 exposed on the second surface 310B, and/or the flash 313.

In an embodiment, the first camera module 305 may be visually exposed through a portion of the screen display area 310A and 310D of the display 301. For example, the first camera module 305 may be visually exposed on a partial region of the screen display area 310A and 310D through an opening that is formed in a portion of the display 301. In another example, the first camera module 305 (e.g., an under display camera) may be disposed on the rear surface of the display 301 and may not be visually exposed through the screen display area 310A and 310D.

In an embodiment, the second camera module 312 may include a plurality of cameras (e.g., a dual camera, a triple camera, or a quad camera). However, the second camera module 312 is not necessarily limited to including the plurality of cameras and may include one camera.

In an embodiment, the first camera module 305 and the second camera module 312 may include one or more lenses, an image sensor, and/or an image signal processor. The flash 313 may include, for example, a light emitting diode or a xenon lamp. In another embodiment, two or more lenses (an IR camera lens, a wide angle lens, and a telephoto lens) and image sensors may be disposed on one surface of the electronic device 300.

In an embodiment, the key input devices 317 may be disposed on the third surface 310C of the housing 310 (e.g., the first areas 310D and/or the second areas 310E). In another embodiment, the electronic device 300 may not include all or some of the key input devices 317, and the key input devices 317 not included may be implemented in a different form, such as a soft key, on the display 301. In another embodiment, the key input devices 317 may include a sensor module that forms the sensing area that is included in the screen display area 310A and 310D.

In an embodiment, the connector hole 308 may accommodate a connector. The connector hole 308 may be disposed in the third surface 310C of the housing 310. For example, the connector hole 308 may be disposed in the third surface 310C so as to be adjacent to at least a part of the audio modules (e.g., the microphone hole 303 and the speaker hole 307). In another embodiment, the electronic device 300 may include the first connector hole 308 capable of accommodating a connector (e.g., a USB connector) for transmitting/receiving power and/or data with an external electronic device, and/or a second connector hole capable of accommodating a connector (e.g., an earphone jack) for transmitting/receiving audio signals with an external electronic device.

In an embodiment, the electronic device 300 may include the light emitting element. For example, the light emitting element may be disposed on the first surface 310A of the housing 310. The light emitting element may provide state information of the electronic device 300 in the form of light. In another embodiment, the light emitting element may provide a light source that operates in conjunction with operation of the first camera module 305. For example, the light emitting element may include an LED, an IR LED, and/or a xenon lamp.

Referring to FIG. 3C, the electronic device 300 according to an embodiment may include a front plate 320 (e.g., the front plate 302 of FIG. 3A), a display 330 (e.g., the display 301 of FIG. 3A), a side member 340 (e.g., the side bezel structure 318 of FIG. 3A), a printed circuit board 350, a rear case 360, a battery 370, a back plate 380 (e.g., the back plate 311 of FIG. 3B), and an antenna.

In various embodiments, the electronic device 300 may not include at least one component (e.g., the rear case 360) among the aforementioned components, or may additionally include other component(s). Some of the components of the electronic device 300 illustrated in FIG. 3C may be identical or similar to some of the components of the electronic device 300 illustrated in FIGS. 3A and 3B, and repetitive descriptions will hereinafter be omitted.

In an embodiment, the front plate 320 and the display 330 may be coupled to the side member 340. For example, based on FIG. 3C, the front plate 320 and the display 330 may be disposed under the side member 340. The front plate 320 and the display 330 may be located in the +z-axis direction from the side member 340. For example, the display 330 may be coupled to the bottom of the side member 340, and the front plate 320 may be coupled to the bottom of the display 330. The front plate 320 may form a portion of the outer surface (or, the exterior) of the electronic device 300. The display 330 may be disposed between the front plate 320 and the side member 340 so as to be located inside the electronic device 300.

In an embodiment, the side member 340 may be disposed between the display 330 and the back plate 380. For example, the side member 340 may be configured to surround a space between the back plate 380 and the display 330.

In an embodiment, the side member 340 may include a frame structure 341 that forms a portion of the side surface of the electronic device 300 (e.g., the third surface 310C of FIG. 3A) and a plate structure 342 extending inward from the frame structure 341.

In an embodiment, the plate structure 342 may be disposed inside the frame structure 341 so as to be surrounded by the frame structure 341. The plate structure 342 may be connected with the frame structure 341, or may be integrally formed with the frame structure 341. The plate structure 342 may be formed of a metallic material and/or a nonmetallic (e.g., polymer) material. In an embodiment, the plate structure 342 may support other components included in the electronic device 300. For example, at least one of the display 330, the printed circuit board 350, the rear case 360, or the battery 370 may be disposed on the plate structure 342. For example, the display 330 may be coupled to one surface (e.g., the surface facing the +z-axis direction) of the plate structure 342, and the printed circuit board 350 may be coupled to an opposite surface (e.g., the surface facing the −z-axis direction) that faces away from the one surface.

In an embodiment, the rear case 360 may be disposed between the back plate 380 and the plate structure 342. The rear case 360 may be coupled to the side member 340 so as to overlap at least a portion of the printed circuit board 350. For example, the rear case 360 may face the plate structure 342 with the printed circuit board 350 therebetween.

In an embodiment, a processor (e.g., the processor 120 of FIG. 1), memory (e.g., the memory 130 of FIG. 1), and/or an interface (e.g., the interface 177 of FIG. 1) may be mounted on the printed circuit board 350. The processor may include, for example, one or more of a central processing unit, an application processor, a graphic processing unit, an image signal processor, a sensor hub processor, or a communication processor. The memory may include, for example, volatile memory or nonvolatile memory. The interface may include, for example, a HDMI, a USB interface, an SD card interface, and/or an audio interface. The interface may electrically or physically connect the electronic device 300 with an external electronic device and may include a USB connector, an SD card/MultiMediaCard (MMC) connector, or an audio connector.

In an embodiment, the battery 370 (e.g., the battery 189 of FIG. 1) may supply power to at least one component of the electronic device 300. For example, the battery 370 may include a primary cell that is not rechargeable, a secondary cell that is rechargeable, or a fuel cell. At least a portion of the battery 370 may be disposed on substantially the same plane as the printed circuit board 350. The battery 370 may be integrally disposed inside the electronic device 300, or may be disposed to be detachable from the electronic device 300.

In an embodiment, the antenna (e.g., the antenna module 197 of FIG. 1) may be disposed between the back plate 380 and the battery 370. The antenna may include, for example, a near field communication (NFC) antenna, a wireless charging antenna, and/or a magnetic secure transmission (MST) antenna. For example, the antenna may perform short-range communication with an external device, or may wirelessly transmit and receive power required for charging.

In an embodiment, the first camera module 305 may be disposed on at least a portion (e.g., the plate structure 342) of the side member 340 such that a lens receives external light through a partial area of the front plate 320 (e.g., the front surface 310A of FIG. 3A). For example, the lens of the first camera module 305 may be visually exposed through a partial area of the front plate 320. A camera area 337 (e.g., an opening area or a light transmitting area) corresponding to the first camera module 305 may be formed in the display 330.

In an embodiment, the second camera module 312 may be disposed on the printed circuit board 350 such that a lens receives external light through a camera area 384 of the back plate 380 (e.g., the rear surface 310B of FIG. 3B) of the electronic device 300. For example, the lens of the second camera module 312 may be visually exposed through the camera area 384. In an embodiment, the second camera module 312 may be disposed in at least a portion of an inner space formed in the housing of the electronic device 300 (e.g., the housing 310 of FIGS. 3A and 3B) and may be electrically connected to the printed circuit board 350 through a connecting member (e.g., a connector).

In an embodiment, the camera area 384 may be formed in a surface of the back plate 380 (e.g., the rear surface 310B of FIG. 3B). In an embodiment, the camera area 384 may be formed to be at least partially transparent such that external light is incident on the lens of the second camera module 312. In an embodiment, at least a portion of the camera area 384 may protrude to a predetermined height from the surface of the back plate 380. However, without being necessarily limited thereto, the camera area 384 may form substantially the same plane as the surface of the back plate 380.

Figure 4:
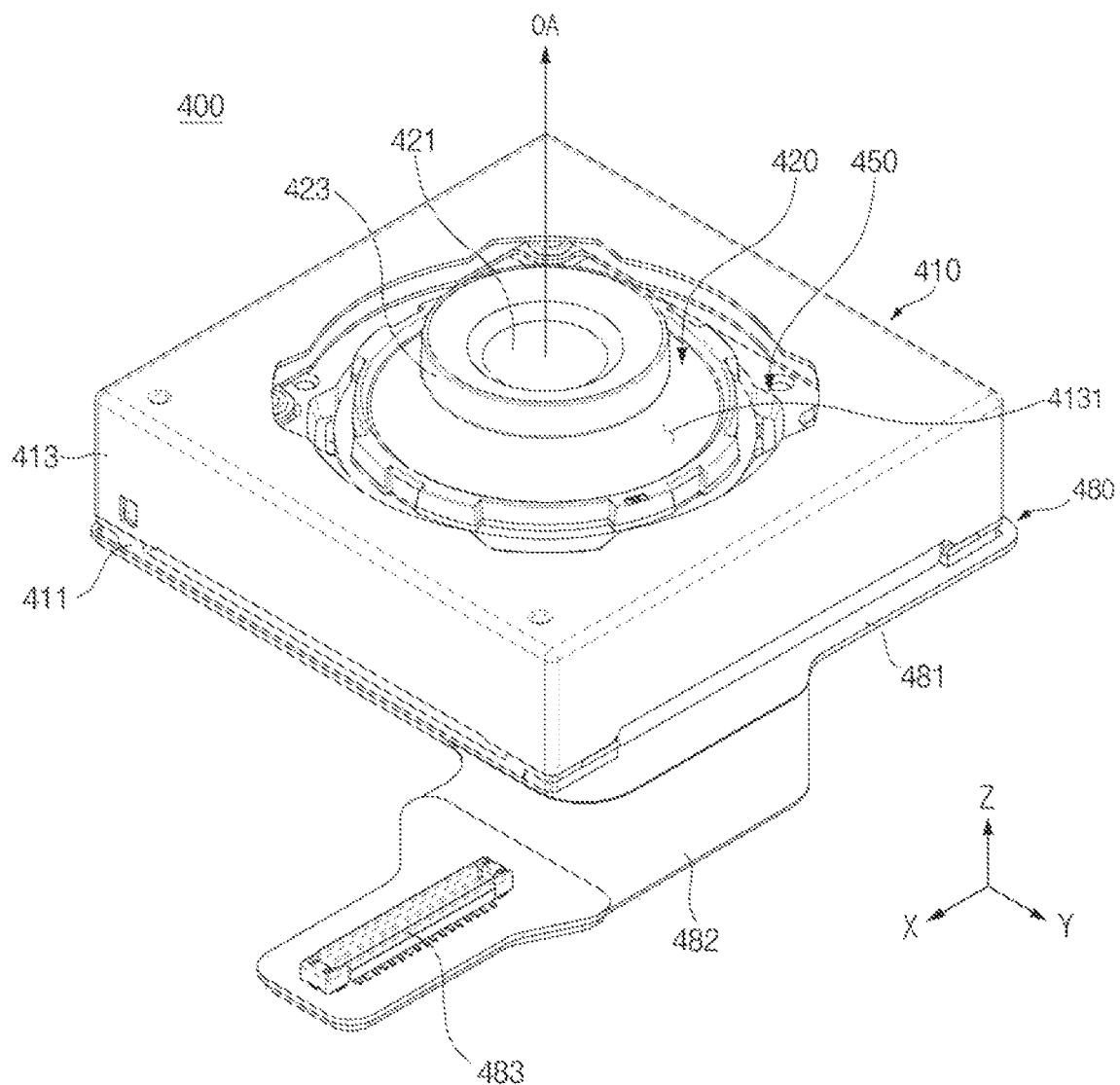
FIG. 4 is a perspective view of a camera module according to an embodiment.

FIG. 4 is a perspective view of a camera module according to an embodiment.

Referring to FIG. 4, the camera module 400 according to an embodiment (e.g., the camera module 180 of FIGS. 1 and 2 or the camera module 305 or 312 of FIG. 3C) may include a camera housing 410, a lens assembly 420 (e.g., the lens assembly 210 of FIG. 2), a lens carrier 450, and a substrate member 480.

In an embodiment, the camera module 400 may be configured to receive external light through a partial area of a surface of an electronic device (e.g., the electronic device 300 of FIGS. 3A to 3C).

In an embodiment, the camera housing 410 may provide a predetermined space in which other components of the camera module 400 are accommodated. The camera housing 410 may include a frame 411 and a cover 413 coupled to the frame 411. For example, the frame 411 and the cover 413 may be coupled with each other to form an inner space in which at least a portion of the lens assembly 420 and at least a portion of the lens carrier 450 are accommodated. At least a portion of the lens assembly 420 and at least a portion of the lens carrier 450 may be accommodated in the frame 411, and the cover 413 may be coupled to the frame 411 to cover at least a portion of the lens assembly 420 and at least a portion of the lens carrier 450.

In an embodiment, the frame 411 may support the lens assembly 420 and the lens carrier 450 disposed therein. The substrate member 480 having an image sensor (e.g., the image sensor 230 of FIG. 2) electrically connected thereto may be disposed on the frame 411. For example, the substrate member 480 having the image sensor 230 mounted thereon may be disposed on the lower surface (or, the bottom surface) (e.g., the surface facing the −z-axis direction) of the frame 411. The frame 411 may have, in the lower surface thereof, an opening through which light passing through a lens 421 is incident on the image sensor 230.

In an embodiment, the cover 413 may have an opening 4131 formed therein through which at least a portion of the lens assembly 420 is visually exposed outside the camera module 410. For example, the opening 4131 may be formed in the upper surface (e.g., the surface facing the +z-axis direction) of the cover 413 such that the lens 421 and at least a portion of a lens barrel 423 are exposed outside the camera housing 410. The opening 4131 may be at least partially aligned with an optical axis OA of the lens 421. For example, the opening 4131 may overlap the lens assembly 420 in the direction of the optical axis OA.

In an embodiment, at least a portion of the lens assembly 420 may be accommodated in the camera housing 410. A portion of the lens assembly 420 may protrude outside the camera housing 410 through the opening 4131. At least a portion of the lens assembly 420 may be exposed outside the camera housing 410 through the opening 4131 of the cover 413, and thus external light may be incident on the lens 421.

In an embodiment, the lens assembly 420 may include the lens 421 and the lens barrel 423 in which the lens 421 is accommodated. For example, the lens barrel 423 may surround one or more lenses 421. The lens barrel 423 may provide a function of supporting the lenses 421 and protecting the lenses 421 from an external impact.

In an embodiment, the lens assembly 420 may be accommodated in the camera housing 410 in the state of being coupled to the lens carrier 450. The lens assembly 420 may be coupled to (or, mounted on) at least a portion of the lens carrier 450 and may be configured to move together with the lens carrier 450 relative to the camera housing 410. For example, in response to a movement of the lens carrier 450, the lens assembly 420 may move relative to the camera housing 410 in the direction of the optical axis OA (e.g., the z-axis direction) and/or one or more directions (e.g., the x-axis direction and/or the y-axis direction) substantially perpendicular to the optical axis OA.

In an embodiment, the lens carrier 450 may be coupled with the lens assembly 420 and may be configured to move the lens assembly 420 relative to the camera housing 410 (or, the image sensor 230 fixed to the camera housing 410). The lens carrier 450 may be disposed in the camera housing 410 such that at least a portion of the lens carrier 450 is movable relative to the camera housing 410 in the direction of the optical axis OA or the directions substantially perpendicular to the optical axis OA. For example, all or part of the lens carrier 450 may move in the direction of the optical axis OA and/or the directions substantially perpendicular to the optical axis OA in the state in which the lens carrier 450 is partially accommodated in the camera housing 410, and the lens assembly 420 may move together with the lens carrier 450.

In an embodiment, the substrate member 480 may be coupled to the frame 411. For example, at least a portion of the substrate member 480 may be attached to the bottom surface (e.g., the surface facing the −z-axis direction) of the frame 411, and thus the substrate member 480 may be fixed to the camera housing 410. The substrate member 480 may include a sensor board 481 having the image sensor (e.g., the image sensor 230 of FIG. 2) disposed thereon, a connecting member 482 extending from the sensor board 481, and a connector 483 formed on the connecting member 482.

The image sensor 230 may be disposed on the upper surface (e.g., the surface facing the +z-axis direction) of the sensor board 481. For example, the image sensor 230 may be disposed on the upper surface of the sensor board 481 to overlap the lens 421 in the direction of the optical axis OA. The image sensor 230 may be electrically connected with the sensor board 481. The image sensor 230 may covert an optical signal received through the lens 421 into an electrical signal. The image sensor 230 may be fixed to the camera housing 410 as the sensor board 481 is coupled with the frame 411, and when the lens assembly 420 moves relative to the camera housing 410, the relative positions of the image sensor 230 and the lens 421 may be changed.

In an embodiment, the substrate member 480 may be electrically connected with the electronic device 300 through the connecting member 482 and the connector 483. For example, the connecting member 482 may extend from the sensor board 481 toward the main board of the electronic device 300 (e.g., the printed circuit board 350 of FIG. 3C), and the connector 483 may be coupled to the main board 350. The connecting member 482 and the connector 483 may electrically connect electrical components (e.g., the image sensor 230, the sensor board 481, or coils (e.g., coils 462, 464, and 466 of FIG. 6)) included in the camera module 400 with the main board 350 of the electronic device 300. In various embodiments, the sensor board 481 may include a PCB, and the connecting member 482 may include a flexible printed circuit board (FPCB).

The camera module 400 according to embodiments of the disclosure may provide an auto focus (AF) function and an optical image stabilization (OIS) function by controlling a movement of the lens carrier 450. For example, the camera module 400 may be configured to perform the auto focus function by moving the entire lens carrier 450 in the direction of the optical axis OA. For example, the camera module 400 may provide the optical image stabilization function (e.g., a camera-shake correction function) by moving a portion of the lens carrier 450 in the directions substantially perpendicular to the optical axis OA.

Figure 5A:
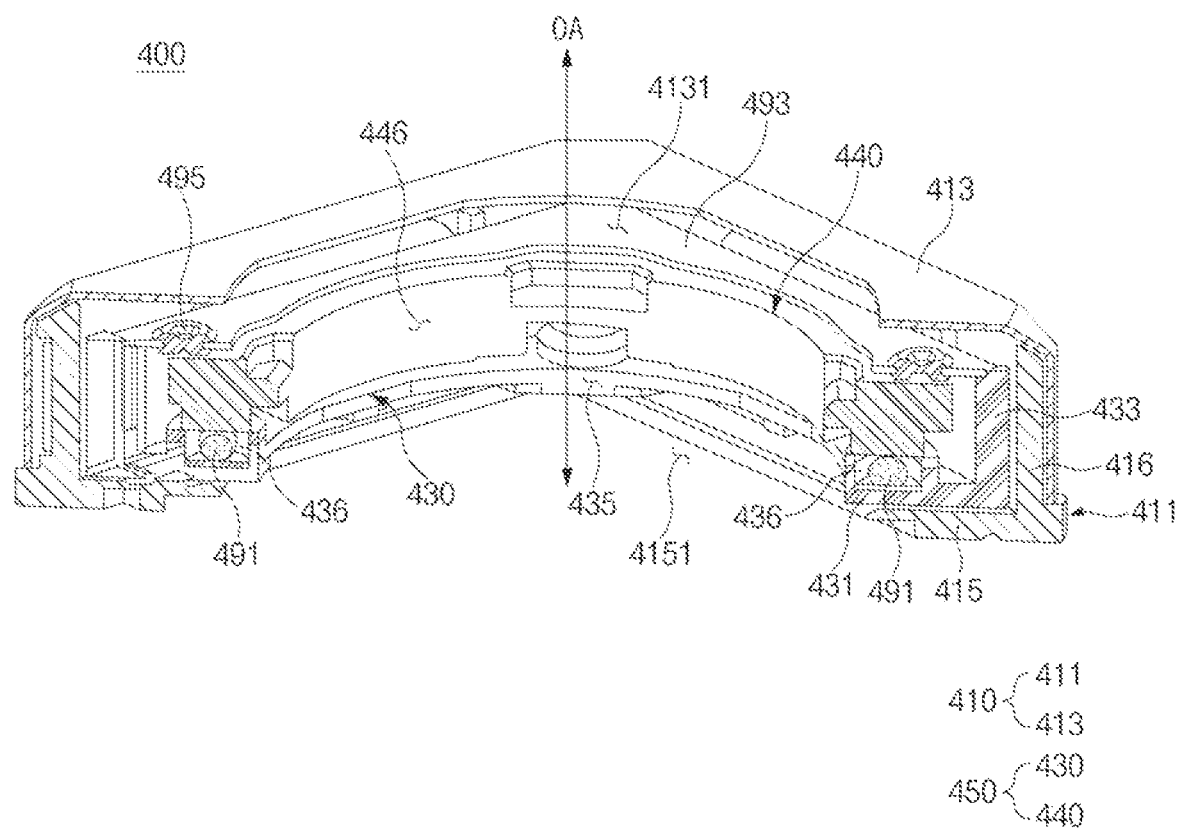
FIG. 5A is a sectional perspective view of the camera module according to an embodiment.
Figure 5B:
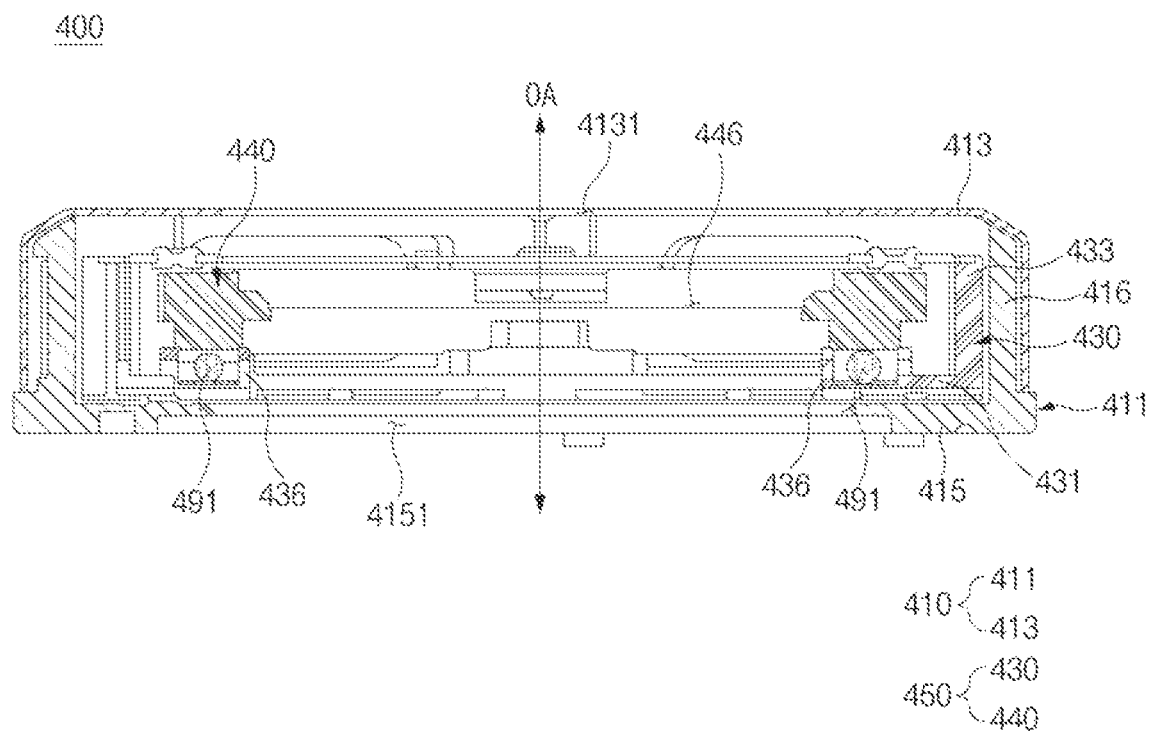
FIG. 5B is a sectional view of the camera module according to an embodiment.

FIG. 5A is a sectional perspective view of the camera module according to an embodiment. FIG. 5B is a sectional view of the camera module according to an embodiment.

FIGS. 5A and 5B may be views in which the lens assembly (e.g., the lens assembly 420 of FIG. 4) and the substrate member (e.g., the substrate member 480 of FIG. 4) are omitted.

Referring to FIGS. 5A and 5B, the camera module 400 according to an embodiment may include the camera housing 410, the lens carrier 450, a stopper 493, and a first ball 491. At least some of the components of the camera module 400 illustrated in FIGS. 5A and 5B may be identical or similar to some of the components of the camera module 400 illustrated in FIG. 4, and repetitive descriptions will hereinafter be omitted.

In an embodiment, the camera housing 410 may include the frame 411 in which the lens carrier 450 is disposed and the cover 413 coupled to the frame 411. For example, the frame 411 and the cover 413 may form a space in which the lens carrier 450 and the stopper 493 are disposed.

In an embodiment, the frame 411 may include a plate 415 and a sidewall 416 substantially vertically extending from the plate 415. The plate 415 and the sidewall 416 may form a space in which the lens carrier 450 is disposed. The plate 415 may support the lens carrier 450, and the sidewall 416 may surround at least a part (e.g., a first carrier 430) of the lens carrier 450. The plate 415 may have a first opening 4151 formed therein through which the lens coupled to the lens carrier 450 (e.g., the lens 421 of the lens assembly 420 of FIG. 4) faces the image sensor 230. For example, the sensor board (e.g., the sensor board 481 of FIG. 4) having the image sensor (e.g., the image sensor 230 of FIG. 2) disposed thereon may be coupled to the lower surface (e.g., the surface facing the −z-axis direction) of the plate 415 (e.g., refer to FIG. 4), and light passing through the lens 421 may be incident on the image sensor 230 through the first opening 4151.

In an embodiment, the cover 413 may be formed such that one portion is coupled to the sidewall 416 of the frame 411 and another portion faces the plate 415. The cover 413 may have the second opening 4131 formed therein to partially overlap the first opening 4151 in the direction of the optical axis OA. External light may be incident on the lens 421 through the second opening 4131. The cover 413 may perform a function of shielding electro-magnetic interference (EMI). For example, the cover 413 may be formed of a metallic material and may be referred to as a shield can (or, an EMI shield can). However, the material of the cover 413 is not limited to metal.

In an embodiment, the lens carrier 450 may include the first carrier 430 disposed in the frame 411 of the camera housing 410 and a second carrier 440 disposed in the first carrier 430. The first carrier 430 may be disposed to be movable in the frame 411, and the second carrier 440 may be disposed to be movable in the first carrier 430.

In an embodiment, the first carrier 430 may be disposed in the frame 411. For example, the first carrier 430 may be supported by the plate 415 of the frame 411 and may be surrounded by the sidewall 416 of the frame 411. The second carrier 440 and at least a portion of the lens assembly (e.g., the lens assembly 420 of FIG. 4) coupled to the second carrier 440 may be disposed in the first carrier 430. For example, the first carrier 430 may surround a portion of the second carrier 440 and a portion of the lens assembly 420. The first carrier 430 may have a first receiving hole 435 formed therein in which at least a portion of the lens assembly 420 is disposed. For example, one portion of the lens assembly 420 may be coupled to the second carrier 440 and may be surrounded by a second receiving hole 446 of the second carrier 440, and another portion of the lens assembly 420 may be surrounded by the first receiving hole 435 of the first carrier 430.

In an embodiment, the first carrier 430 may move relative to the camera housing 410 in the direction of the optical axis OA. For example, the first carrier 430 may move in the direction of the optical axis OA with respect to the frame 411. When the first carrier 430 moves, the second carrier 440 and the lens assembly 420 disposed in the first carrier 430 may move together with the first carrier 430. As the first carrier 430 moves in the direction of the optical axis OA, the distance between the image sensor 230 fixed to the frame 411 and the lens assembly 420 (or, the lens 421) may vary, and thus an auto focus function may be performed.

In an embodiment, the first carrier 430 may include a base part 431 and a sidewall part 433 substantially vertically extending from the base part 431. The base part 431 and the sidewall part 433 may form a space in which the second carrier 440 is disposed. The base part 431 may have the first receiving hole 435 formed therein in which the lens assembly 420 is disposed.

In an embodiment, the base part 431 of the first carrier 430 may at least partially face the plate 415 of the camera housing 410 (e.g., the frame 411). The sidewall part 433 of the first carrier 430 may partially face the sidewall 416 of the camera housing 410 (e.g., the frame 411). A guide ball (e.g., a second ball 492 of FIG. 8) for guiding a movement of the first carrier 430 in the direction of the optical axis OA may be disposed in at least a portion of the space between the sidewall part 433 of the first carrier 430 and the sidewall 416 of the frame 411 (e.g., refer to FIG. 8).

In an embodiment, at least one first ball 491 for guiding a movement of the second carrier 440 may be disposed on the base part 431 of the first carrier 430. The first ball 491 may be disposed between the first carrier 420 and the second carrier 440 and may be brought into contact with the first carrier 430 and the second carrier 440. For example, a ball receiving portion 436 for accommodating the first ball 491 may be formed on the base part 431. The first ball 491 may move while rotating in the ball receiving portion 436. For example, the first ball 491 may provide a rolling frictional force between the base part 431 and the second carrier 440 when the second carrier 440 moves relative to the first carrier 430 in directions (e.g., the x-axis direction and the y-axis direction) substantially perpendicular to the optical axis OA as an optical image stabilization function is performed.

In an embodiment, the first carrier 430 may be coupled with the stopper 493. The stopper 493 may provide a function of limiting a movement of the second carrier 440 in the direction of the optical axis OA. For example, the stopper 493 may be coupled to the first carrier 430 to partially overlap the second carrier 440 in the direction of the optical axis OA, thereby preventing separation of the second carrier 440 from inside the first carrier 430 in the direction of the optical axis OA. The stopper 493 may have an opening area formed therein in which the lens assembly 420 is disposed. For example, the opening area may partially overlap the first receiving hole 435 of the first carrier 430, the second receiving hole 446 of the second carrier 440, the first opening 4151 of the frame 411, and the second opening 4131 of the cover 413 in the direction of the optical axis OA. The stopper 493 may have a damping member 495 disposed thereon to absorb shock and reduce vibration when the second carrier 440 collides with the stopper 493. The damping member 495 may be formed of an elastic material, for example, an elastomer or rubber.

In an embodiment, the second carrier 440 may be disposed in the first carrier 430. For example, the second carrier 440 may be disposed to be movable in a space formed by the first carrier 430 and the stopper 493 coupled to the first carrier 430. The second carrier 440 may be coupled with the lens assembly 420. For example, the second receiving hole 446 to which the lens assembly 420 is coupled may be formed in the second carrier 440. The lens assembly 420 may be mounted in the second receiving hole 446 and may move together with the second carrier 440 accordingly.

In an embodiment, the second carrier 440 may be configured to move in the first carrier 430 in the directions substantially perpendicular to the optical axis OA relative to the first carrier 430. For example, the second carrier 440, together with the lens assembly 420, may move in the directions substantially perpendicular to the optical axis OA with respect to the first carrier 430 and the frame 411. As the second carrier 440 moves in the directions substantially perpendicular to the optical axis OA, the relative positions of the image sensor 230 fixed to the frame 411 and the lens assembly 420 (or, the lens 421) may be changed, and thus an optical image stabilization function may be performed.

In an embodiment, the second carrier 440 may be disposed on the base part 431 of the first carrier 430 through the at least one first ball 491 so as to be movable in one or more directions (e.g., the x-axis and y-axis directions) substantially perpendicular to the optical axis OA. For example, the second carrier 440 may be disposed in the first carrier 430 in the state of being at least partially brought into contact with the first ball 491.

Figure 6:
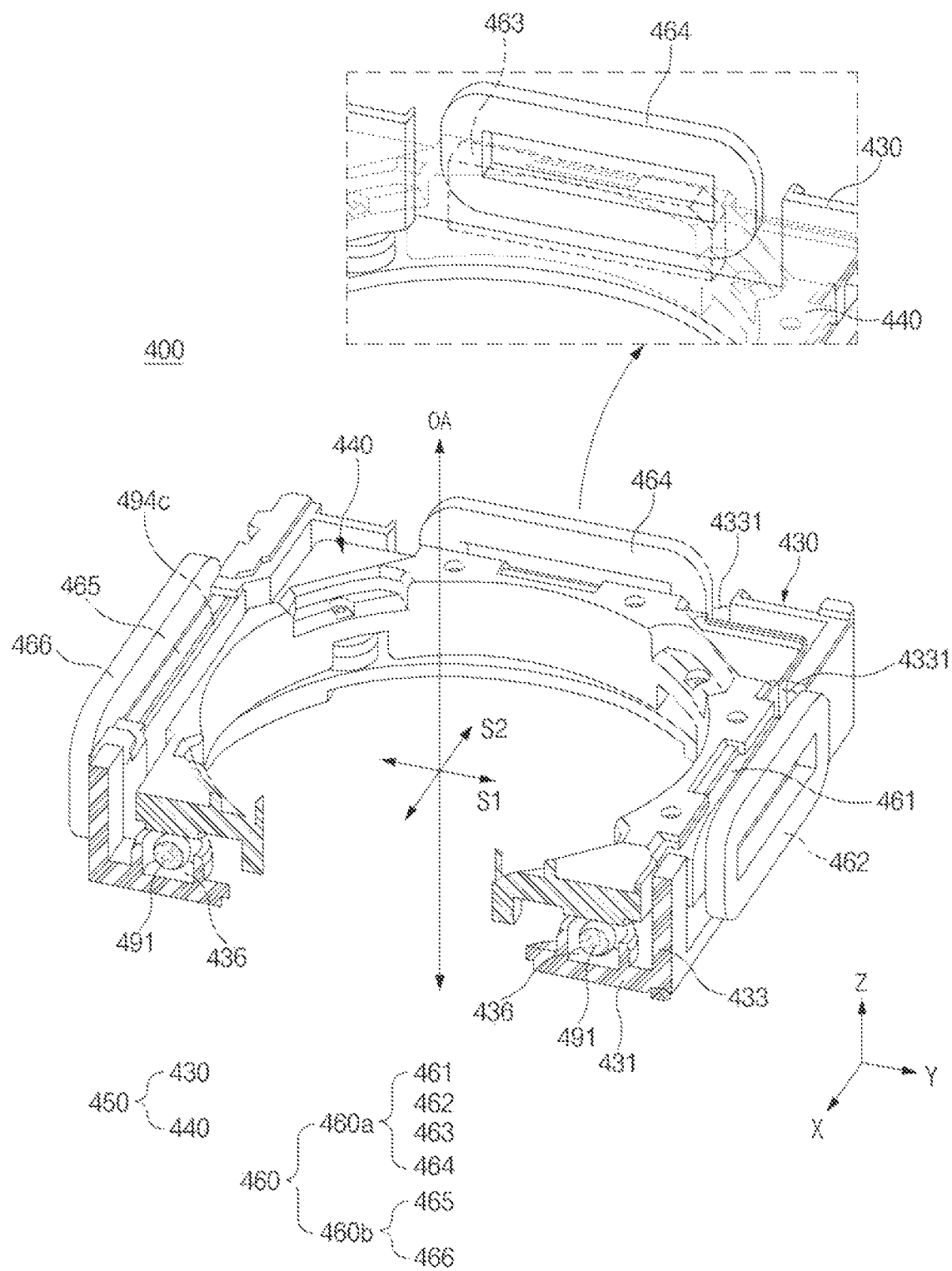
FIG. 6 is a diagram of a lens carrier and a drive member of the camera module according to an embodiment.
Figure 7A:
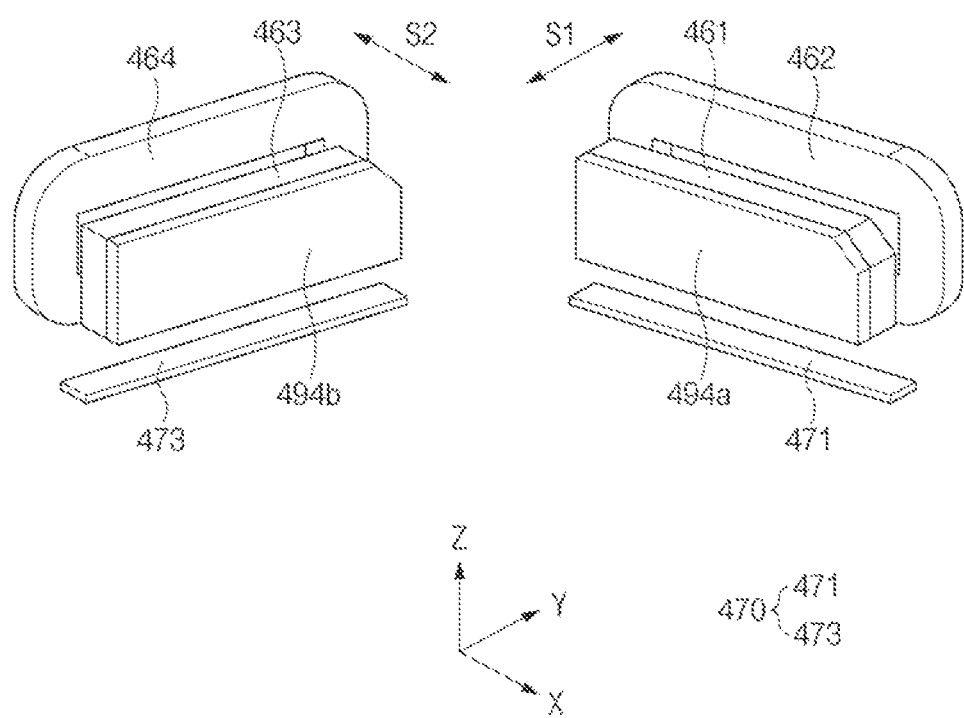
FIG. 7A is a diagram of a first drive unit and yoke members of the camera module according to an embodiment.
Figure 7B:
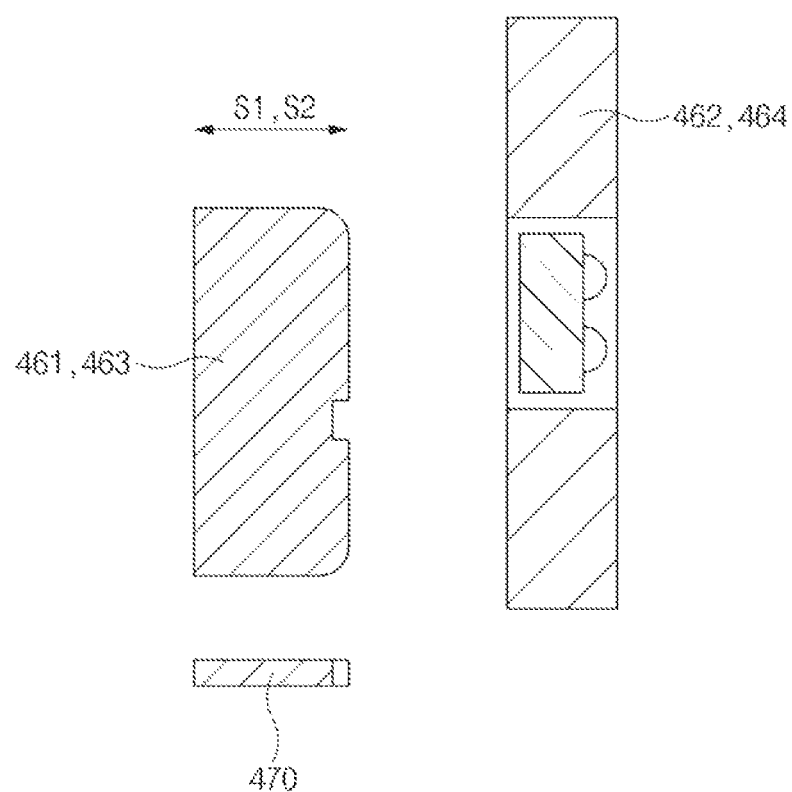
FIG. 7B is a diagram of the first drive unit and the yoke members of the camera module according to an embodiment.

FIG. 6 is a diagram of the lens carrier and a drive member of the camera module according to an embodiment. FIG. 7A is a diagram of a first drive unit and yoke members of the camera module according to an embodiment. FIG. 7B is a diagram of the first drive unit and the yoke members of the camera module according to an embodiment.

FIG. 6 may be a view in which the camera housing 410 and the stopper 493 are omitted from the camera module 400 of FIGS. 5A and 5B.

Referring to FIGS. 6, 7A, and 7B, the camera module 400 according to an embodiment may include the lens carrier 450, the drive member 460, and the yoke members 470. At least some of the components of the camera module 400 illustrated in FIGS. 6, 7A, and 7B may be identical or similar to some of the components of the camera module 400 illustrated in FIGS. 4, 5A, and 5B, and repetitive descriptions will hereinafter be omitted.

In an embodiment, the lens carrier 450 may include the first carrier 430 and the second carrier 440 disposed in the first carrier 430 so as to be movable. For example, the second carrier 440 may be configured to move relative to the first carrier 430 in the direction of a first movement axis S1 (e.g., the y-axis direction) and the direction of a second movement axis S2 (e.g., the x-axis direction), which are substantially perpendicular to the optical axis OA, by using driving forces provided by the drive member 460.

In an embodiment, the first carrier 430 may include the base part 431 having the ball receiving portion 436 formed thereon and the sidewall part 433 substantially vertically extending from the base part 431. The ball receiving portion 436 of the first carrier 430 may be formed to face toward the second carrier 440, and the first ball 491 may be accommodated in the ball receiving portion 436. The sidewall part 433 of the first carrier 430 may partially face the side surface of the second carrier 440.

In an embodiment, the yoke members 470 corresponding to magnets 461 and 463 of the first drive unit 460a may be disposed on the base part 431 of the first carrier 430. For example, the yoke members 470 may be disposed on one surface (e.g., the surface facing the +z-axis direction) of the base part 431 to face the first magnet 461 and the second magnet 463 in the direction of the optical axis OA. Based on FIG. 6, a first yoke member 471 may be disposed adjacent to the sidewall facing the +y-axis direction on the one surface of the base part 431 to overlap the first magnet 461 in the direction of the optical axis OA. A second yoke member 473 may be disposed adjacent to the sidewall facing the −x-axis direction on the one surface of the base part 431 to overlap the second magnet 463 in the direction of the optical axis OA.

In an embodiment, the first carrier 430 may have opening areas 4331 formed therein through which the coils 462 and 464 and the magnets 461 and 463 of the first drive unit 460a face each other. For example, the sidewall of the sidewall part 433 of the first carrier 430 that faces the +y-axis direction may have the opening area 4331 through which the first coil 462 and the first magnet 461 face each other, and the sidewall facing the −x-axis direction may have the opening 4331 through which the second coil 464 and the second magnet 463 face each other.

In an embodiment, a third magnet 465 may be disposed on a portion of the sidewall part 433 of the first carrier 430. For example, the third magnet 465 may be disposed on the sidewall of the sidewall part 433 of the first carrier 430 that faces the −y-axis direction. The sidewall part 433 of the first carrier 430 may partially face the sidewall (e.g., the sidewall 416 of FIGS. 5A and 5B) of the frame 411 of the camera housing (e.g., the camera housing 410 of FIGS. 5A and 5B), and thus the third magnet 465 may be disposed on the sidewall part 433 of the first carrier 430 to face the third coil 466 disposed on the sidewall 416 of the frame 411.

In an embodiment, the drive member 460 may provide driving forces to move the first carrier 430 and the second carrier 440. The drive member 460 may include the first drive unit 460a configured to move the second carrier 440 in directions substantially perpendicular to the optical axis OA and a second drive unit 460b configured to move the first carrier 430 in the direction of the optical axis OA. The first drive unit 460a may include the first magnet 461 and the first coil 462 facing each other and the second magnet 463 and the second coil 464 facing each other, and the second drive unit 460b may include the third magnet 465 and the third coil 466 facing each other. Although FIG. 6 is a view in which the camera housing 410 is omitted, the coils (e.g., the first coil 462, the second coil 464, and the third coil 466) included in the drive member 460 may be understood as being fixedly disposed on the frame (e.g., the frame 411 of FIGS. 5A and 5B) of the camera housing 410.

In an embodiment, the first drive unit 460a may be configured to move the second carrier 440 in the direction of the first movement axis S1 (e.g., the +y/−y axis) and the direction of the second movement axis S2 (e.g., the +x/−x axis) that are substantially perpendicular to the optical axis OA (e.g., the +z/−z axis). The first movement axis S1 and the second movement axis S2 may be substantially perpendicular to each other. The first drive unit 460a may include the plurality of magnets 461 and 463 and the plurality of coils 462 and 464 that electromagnetically interact with each other and generate driving forces to move the second carrier 440.

In an embodiment, the plurality of magnets 461 and 463 may be disposed on the second carrier 440. The plurality of coils 462 and 464 may be disposed on the frame 411 of the camera housing 410 to face the plurality of magnets 461 and 463. The plurality of magnets 461 and 463 may include the first magnet 461 configured to move the second carrier 440 in the direction of the first movement axis S1 and the second magnet 463 configured to move the second carrier 440 in the direction of the second movement axis S2. The first magnet 461 and the second magnet 463 may be disposed to face directions substantially perpendicular to each other. For example, based on FIG. 6, the first magnet 461 may face the +y-axis direction, and the second magnet 463 may face the −x-axis direction. The plurality of coils 462 and 464 may include the first coil 462 fixedly disposed on the sidewall 416 of the frame 411 to face the first magnet 461 and the second coil 464 fixedly disposed on the sidewall 416 of the frame 411 to face the second magnet 463.

In an embodiment, the first drive unit 460a may include a voice coil motor (VCM) of a solenoid type. For example, when currents flow through the plurality of coils 462 and 464 of the first drive unit 460a in predetermined directions, magnetic fields may be generated around the plurality of coils 462 and 464 in directions determined according to the Ampere's right hand law. Attractive forces or repulsive forces may be generated between the plurality of coils 462 and 464 and the plurality of magnets 461 and 463 depending on the directions of the magnetic fields and the polarities of the magnets, and the plurality of magnets 461 and 463 may move toward or away from the plurality of relatively fixed coils 462 and 464.

In an embodiment, the first magnet 461 may be coupled to a side surface (e.g., the side surface facing the +y-axis direction) of the second carrier 440 to face the direction of the first movement axis S1. The first magnet 461 may electromagnetically interact with the first coil 462. For example, an attractive force or a repulsive force that acts in the direction of the first movement axis S1 may be formed between the first magnet 461 and the first coil 462 depending on the direction of a current applied to the first coil 462. As the first coil 462 is fixed to the camera housing 410, the first magnet 461 may move relative to the first coil 462 in the direction of the first movement axis S1, and the second carrier 440 may move in the direction of the first movement axis S1 by the movement of the first magnet 461.

In an embodiment, the second magnet 463 may be coupled to a side surface (e.g., the side surface facing the −x-axis direction) of the second carrier 440 to face the direction of the second movement axis S2. The second magnet 463 may electromagnetically interact with the second coil 464. For example, an attractive force or a repulsive force that acts in the direction of the second movement axis S2 may be formed between the second magnet 463 and the second coil 464 depending on the direction of a current applied to the second coil 464. As the second coil 464 is fixed to the camera housing 410, the second magnet 463 may move relative to the second coil 464 in the direction of the second movement axis S2, and the second carrier 440 may move in the direction of the second movement axis S2 by the movement of the second magnet 463.

In an embodiment, the second drive unit 460b may be configured to move the first carrier 430 in the direction of the optical axis OA (e.g., the z-axis). The second drive unit 460b may include the third magnet 465 and the third coil 466 that electromagnetically interact with each other and generate a driving force to move the first carrier 430. The third magnet 465 may be disposed on the first carrier 430. The third coil 466 may be disposed on the frame 411 of the camera housing 410 to face the third magnet 465. For example, the third coil 466 may be fixedly disposed on the sidewall 416 of the frame 411.

In an embodiment, the third magnet 465 may be coupled to the sidewall part 433 of the first carrier 430. For example, the third magnet 465 may be coupled to the sidewall part 433 of the first carrier 430 to parallel one of the first magnet 461 or the second magnet 463. Based on FIG. 6, the third magnet 465 may be disposed in the −y-axis direction to parallel the first magnet 461. However, the position of the third magnet 465 is not limited to the illustrated example.

In an embodiment, the third magnet 465 may electromagnetically interact with the third coil 466. For example, an electromagnetic force that acts in the direction of the optical axis OA may be formed between the third magnet 465 and the third coil 466 depending on the direction of a current applied to the third coil 466. As the third coil 466 is fixed to the camera housing 410, the third magnet 465 may move relative to the third coil 466 in the direction of the optical axis OA, and the first carrier 430 may move in the direction of the optical axis OA by the movement of the third magnet 465. For example, the third magnet 465 may have a form in which the surface facing the third coil 466 is polarized in the direction of the optical axis OA, and the electromagnetic force acting between the third magnet 465 and the third coil 466 may be understood as the Lorentz force.

In an embodiment, the yoke members 470 may form attractive forces with the plurality of magnets (e.g., the first magnet 461 and the third magnet 463) included in the first drive unit 460a. The yoke members 470 may be disposed on the base part 431 of the first carrier 430 to partially overlap the plurality of magnets 461 and 463 in the direction of the optical axis OA. The yoke members 470 and the plurality of magnets 461 and 463 may be spaced apart from each other by a predetermined gap, and attractive forces (e.g., magnetic attractive forces) may act between the yoke members 470 and the plurality of magnets 461 and 463. External forces may be applied to the second carrier 440 in a direction toward the base part 431 of the first carrier 430 by the attractive forces between the yoke members 470 and the plurality of magnets 461 and 463. Accordingly, the first ball 491 disposed between the first carrier 430 and the second carrier 440 may rotate and/or move in the state of being brought into close contact with the first carrier 430 and the second carrier 440.

In an embodiment, the yoke members 470 may provide a function of restraining the plurality of magnets 461 and 463 and the second carrier 440 in a predetermined range through the attractive forces between the yoke members 470 and the plurality of magnets 461 and 463. For example, a movement of the second carrier 440 in the direction of the optical axis OA may be limited within a predetermined range by the attractive forces between the yoke members 470 and the plurality of magnets 461 and 463. Furthermore, the attractive forces between the yoke members 470 and the plurality of magnets 461 and 463 may act as restoring forces to restore the positions of the plurality of magnets 461 and 463. For example, when the plurality of magnets 461 and 463 move relative to the yoke members 470 in the direction of the first movement axis S1 or the direction of the second movement axis S2 as an optical image stabilization function is performed based on FIGS. 7A and 7B, restoring forces to restore the plurality of magnets 461 and 463 to the initial positions before the movement may be applied to the plurality of magnets 461 and 463 by the attractive forces between the yoke members 470 and the plurality of magnets 461 and 463. The second carrier 440 may be restrained to the first carrier 430 through the magnetic spring structure including the yoke members 470 and the plurality of magnets 461 and 463.

In an embodiment, the yoke members 470 may include the first yoke member 471 corresponding to the first magnet 461 and the second yoke member 473 corresponding to the second magnet 463. The first yoke member 471 may be fixedly disposed on the base part 431 to face the first magnet 461 in the direction of the optical axis OA. The second yoke member 473 may be fixedly disposed on the base part 431 to face the second magnet 463 in the direction of the optical axis OA. According to various embodiments, the first yoke member 471 and the second yoke member 473 may be attached to the base part 431 or may be integrally formed with the base part 431 through an injection process, but are not limited thereto.

In an embodiment, the first yoke member 471 may extend in the direction of the second movement axis S2, and the second yoke member 473 may extend in the direction of the first movement axis S1. The first yoke member 471 may have substantially the same length as the first magnet 461, or may be longer than the first magnet 461. For example, when the first yoke member 471 and the first magnet 461 are viewed in the direction of the optical axis OA, the length of the first yoke member 471 in the direction of the second movement axis S2 may be greater than, or substantially the same as, the length of the first magnet 461 in the direction of the second movement axis S2. The second yoke member 473 may have substantially the same length as the second magnet 463, or may be longer than the second magnet 463. For example, when the second yoke member 473 and the second magnet 463 are viewed in the direction of the optical axis OA, the length of the second yoke member 473 in the direction of the first movement axis S1 may be greater than, or substantially the same as, the length of the second magnet 463 in the direction of the first movement axis S1.

In an embodiment, the camera module 400 may further include shielding members 494a, 494b, and 494c for shielding magnetic fields of the magnets 461, 463, and 465 included in the drive member 460. For example, the shielding members 494a, 494b, and 494c may be disposed on surfaces of the magnets 461, 463, and 465. The shielding members 494a, 494b, and 494c may be formed of a ferromagnetic material and may be configured to shield the magnetic fields formed by the magnets 461, 463, and 465. The shielding members 494a, 494b, and 494c may include the first shielding member 494a corresponding to the first magnet 461, the second shielding member 494b corresponding to the second magnet 463, and the third shielding member 494c corresponding to the third magnet 465.

Referring to FIG. 7A, the first shielding member 494a may be disposed on one surface of the first magnet 461, and the second shielding member 494b may be disposed on one surface of the second magnet 463. For example, the one surface of the first magnet 461 on which the first shielding member 494a is disposed may be a surface (e.g., the surface facing the −y-axis direction) facing away from the surface of the first magnet 461 that faces the first coil 462, and the one surface of the second magnet 463 on which the second shielding member 494b is disposed may be a surface (e.g., the surface facing the +x-axis direction) facing away from the surface of the second magnet 463 that faces the second coil 464. The first shielding member 494a may be disposed between the first magnet 461 and the second carrier 440 such that the magnetic field formed by the first magnet 461 fails to pass through the second carrier 440. The second shielding member 494b may be disposed between the second magnet 463 and the second carrier 440 such that the magnetic field formed by the second magnet 463 fails to pass through the second carrier 440.

Referring to FIG. 6, the third shielding member 494c may be disposed on one surface of the third magnet 465. For example, the one surface of the third magnet 465 on which the third shielding member 494c is disposed may be a surface (e.g., the surface facing the +y-axis direction) facing away from the surface of the third magnet 465 that faces the third coil 466. The third shielding member 494c may be disposed between the third magnet 465 and the second carrier 440 such that the magnetic field formed by the third magnet 465 fails to pass through the first carrier 430 (or, the second carrier 440). For example, the third shielding member 494c may be disposed on the sidewall part 433 (e.g., the sidewall facing the −y-axis direction) of the first carrier 430 together with the third magnet 465 and may block the space between the inner space of the first carrier 430 and the third magnet 465.

Figure 8:
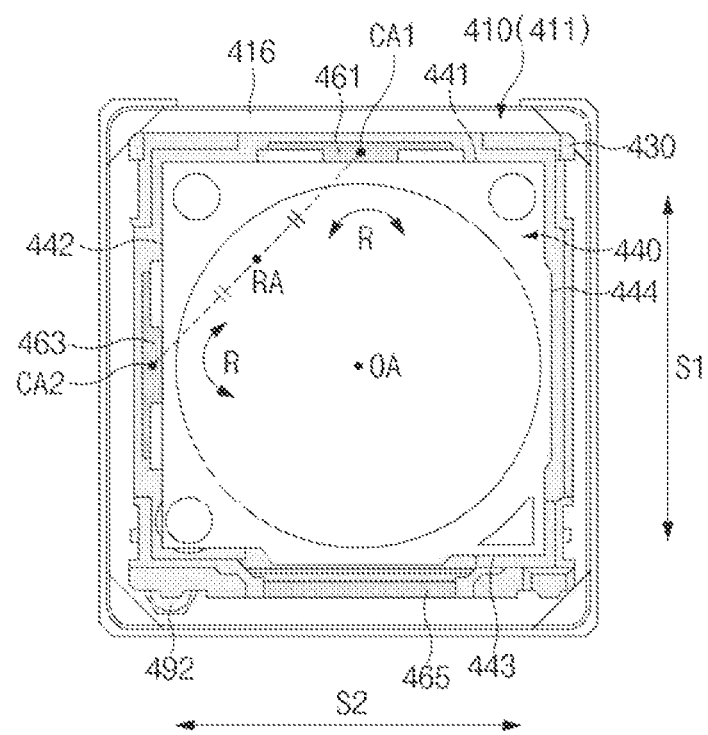
FIG. 8 is a plan view of the camera module according to an embodiment.
Figure 9:
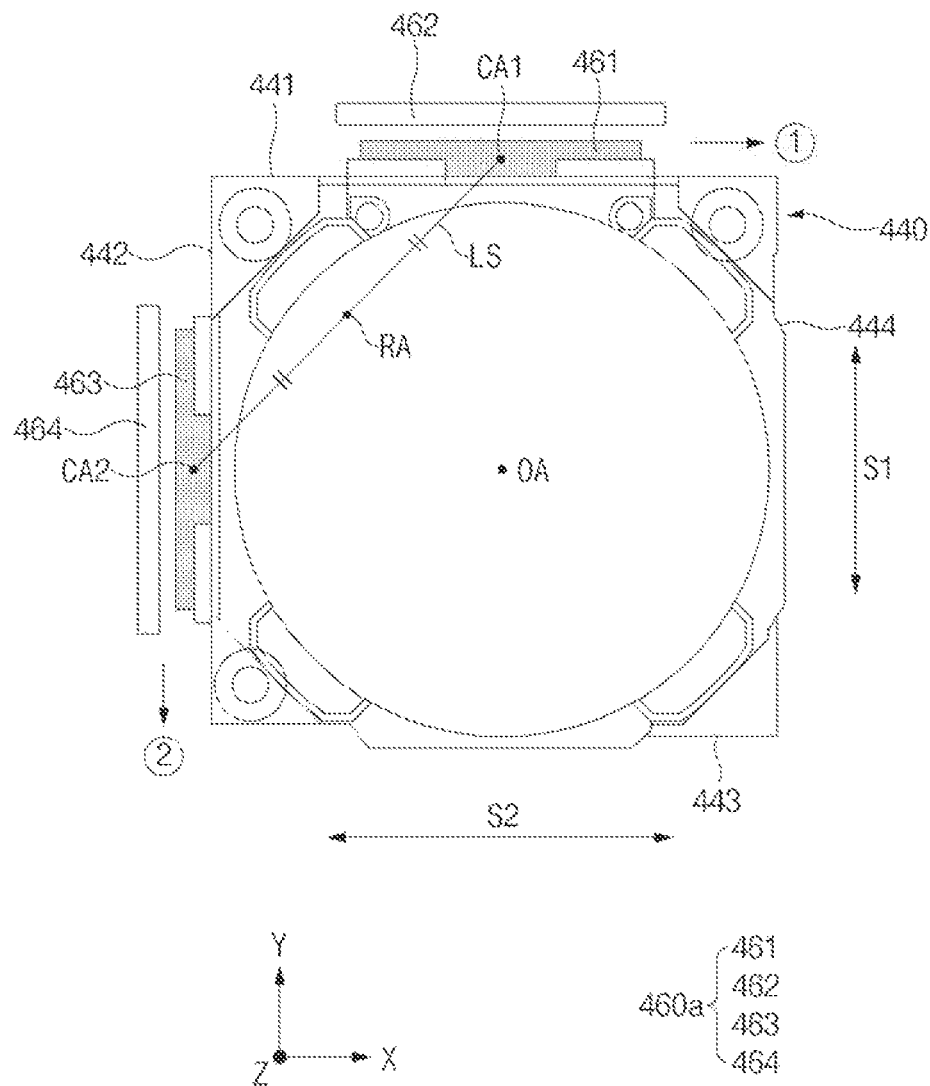
FIG. 9 is a diagram of a second carrier and the first drive unit of the camera module according to an embodiment.
Figure 10A:
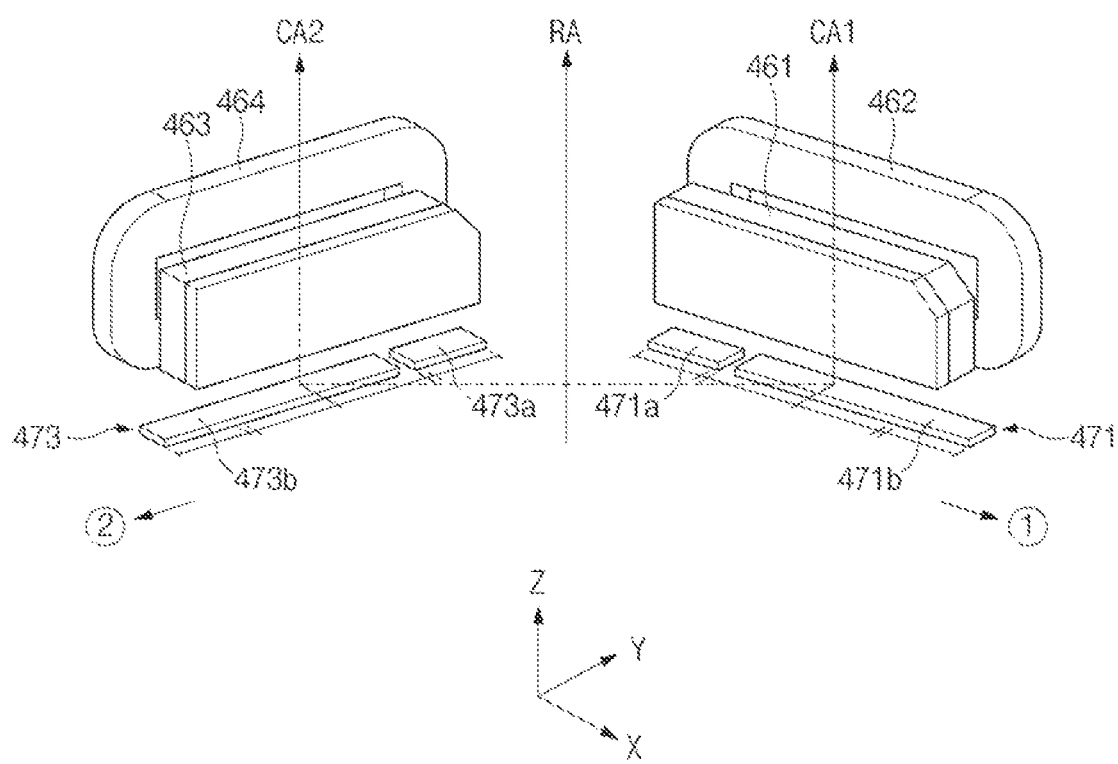
FIG. 10A is a diagram of the first drive unit and the yoke members of the camera module according to an embodiment.
Figure 10B:
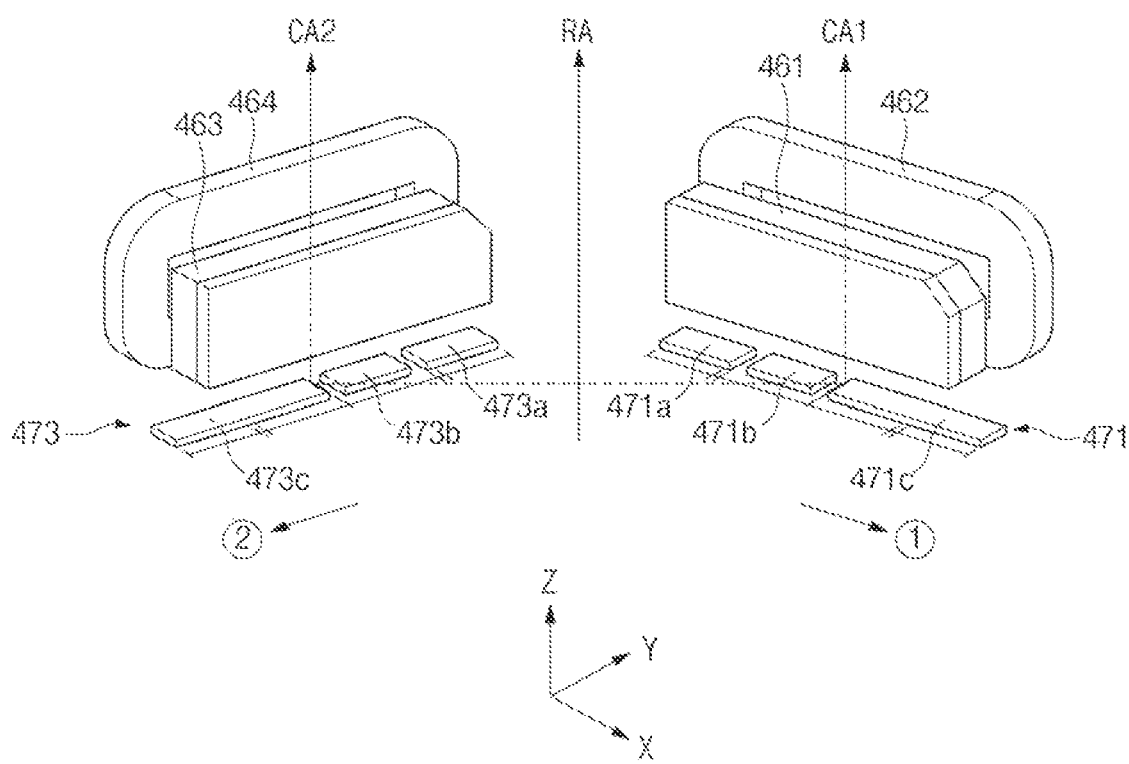
FIG. 10B is a diagram of the first drive unit and the yoke members of the camera module according to an embodiment.

FIG. 8 is a plan view of the camera module according to an embodiment. FIG. 9 is a diagram of the second carrier and the first drive unit of the camera module according to an embodiment. FIG. 10A is a diagram of the first drive unit and the yoke members of the camera module according to an embodiment. FIG. 10B is a diagram of the first drive unit and the yoke members of the camera module according to an embodiment.

FIGS. 8 and 9 may be views of the camera module 400 as viewed from above (e.g., the +z-axis direction).

FIG. 8 may be a view in which the cover 413, the lens assembly 420, the stopper 493, and the coils 462, 464, and 466 are omitted. FIG. 9 may be a view illustrating a positional relationship between the first drive unit 460a and the second carrier 440 for an OIS operation.

Referring to FIGS. 8, 9, 10A, and 10B, the camera module 400 according to an embodiment may include the camera housing 410, the first carrier 430, the second carrier 440, the first drive unit 460a, the third magnet 465 (e.g., the second drive unit 460b), and the yoke members 470. For example, the camera housing 410 of FIG. 8 may be referred to as a frame (e.g., the frame 411 of FIGS. 5A and 5B).

In an embodiment, the frame 411 may include the sidewall 416 formed to laterally surround the first carrier 430. At least one second ball 492 may be disposed between the sidewall 416 and the first carrier 430. The second ball 492 may provide a rolling frictional force when the first carrier 430 moves relative to the frame 411 in the direction of the optical axis OA. For example, the second ball 492 may at least partially make contact with the sidewall 416 and the first carrier 430.

In an embodiment, the first carrier 430 may be configured to move relative to the camera housing 410 in the direction of the optical axis OA. The second carrier 440 may be configured to move relative to the first carrier 430 and the camera housing 410 in one or more directions substantially perpendicular to the optical axis OA. The second carrier 440 may move together with the first carrier 430 when the first carrier 430 moves in the direction of the optical axis OA.

In an embodiment, the first carrier 430 may be configured to be moved in the direction of the optical axis OA by the third magnet 465. For example, the third magnet 465 may be disposed on the first carrier 430, and the third coil (e.g., the third coil 466 of FIG. 6) corresponding to the third magnet 465 may be fixedly disposed on the sidewall 416 of the frame 411 to face the third magnet 465. The third magnet 465 and the third coil 466 may electromagnetically interact with each other to move the first carrier 430 in the direction of the optical axis OA.

In an embodiment, the second carrier 440 may include a plurality of side surfaces 445 that face directions substantially perpendicular to the optical axis OA. The plurality of side surfaces 445 may include a first side surface 441 and a third side surface 443 that face the direction of the first movement axis S1 and face each other and a second side surface 442 and a fourth side surface 444 that face the direction of the second movement axis S2 and face each other. For example, the first side surface 441 and the third side surface 443 may extend in the direction of the second movement axis S2 by a predetermined length, and the second side surface 442 and the fourth side surface 444 may extend in the direction of the first movement axis S1 by a predetermined length. Based on FIG. 9, the first side surface 441 may face the +y-axis direction, the second side surface 442 may face the −x-axis direction, the third side surface 443 may face the −y-axis direction, and the fourth side surface 444 may face the +x-axis direction. The first side surface 441 and the third side surface 443 may be substantially perpendicular to the second side surface 442 and the fourth side surface 444. For example, the second side surface 442 may extend from one end of the first side surface 441 toward one end of the third side surface 443 so as to be substantially perpendicular to the first side surface 441 and the third side surface 443, and the fourth side surface 444 may extend from an opposite end of the first side surface 441 toward an opposite end of the third side surface 443 so as to be substantially perpendicular to the first side surface 441 and the third side surface 443.

In an embodiment, the first drive unit 460*a* may be configured to move the second carrier 440 in the direction of the first movement axis S1 and the direction of the second movement axis S2 that are substantially perpendicular to the optical axis OA. The first movement axis S1 and the second movement axis S2 may be perpendicular to each other. The first drive unit 460*a* may include the first magnet 461 and the first coil 462 for a movement of the second carrier 440 in the direction of the first movement axis S1. The first drive unit 460*a* may include the second magnet 463 and the second coil 464 for a movement of the second carrier 440 in the direction of the second movement axis S2.

In an embodiment, the first magnet 461 and the second magnet 463 may be disposed to face directions perpendicular to each other. For example, the first magnet 461 may be disposed on the second carrier 440 to face the direction of the first movement axis S1, and the second magnet 463 may be disposed on the second carrier 440 to face the direction of the second movement axis S2. Based on FIG. 9, the first magnet 461 may be disposed on the first side surface 441 of the second carrier 440, and the second magnet 463 may be disposed on the second side surface 442 of the second carrier 440. However, the positions of the first magnet 461 and the second magnet 463 are not limited to the illustrated embodiment. For example, the first magnet 461 may be disposed on one of the first side surface 441 or the third side surface 443, and the second magnet 463 may be disposed on one of the second side surface 442 or the fourth side surface 444.

In an embodiment, the first coil 462 may be disposed on the frame 411 to face the first magnet 461, and the second coil 464 may be disposed on the frame 411 to face the second magnet 463. For example, the first coil 462 may be fixedly disposed on the sidewall 416 of the frame 411 to overlap the first magnet 461 in the direction of the first movement axis S1, and the second coil 464 may be fixedly disposed on the sidewall 416 of the frame 411 to overlap the second magnet 463 in the direction of the second movement axis S2.

In an embodiment, the first magnet 461 and the first coil 462 may electromagnetically interact with each other to move the second carrier 440 in the direction of the first movement axis S1. The second magnet 463 and the second coil 464 may electromagnetically interact with each other to move the second carrier 440 in the direction of the second movement axis S2. For example, the lens assembly (e.g., the lens assembly 420 of FIG. 4) may move together with the second carrier 440 in the direction of the first movement axis S1 and the direction of the second movement axis S2, and thus an optical image stabilization function (or, a shake correction function) may be performed.

In an embodiment, the yoke members 470 may include the first yoke member 471 corresponding to the first magnet 461 and the second yoke member 473 corresponding to the second magnet 463. The first yoke member 471 may be fixedly disposed on the first carrier 430 to overlap the first magnet 461 in the direction of the optical axis OA. The second yoke member 473 may be fixedly disposed on the first carrier 430 to overlap the second magnet 463 in the direction of the optical axis OA.

In an embodiment, the first yoke member 471 and the second yoke member 473 may form attractive forces with the first magnet 461 and the second magnet 463, respectively. Accordingly, the second carrier 440 may be restrained through a magnetic spring formed by the attractive force between the first magnet 461 and the first yoke member 471 and the attractive force between the second magnet 463 and the second yoke member 473. In this state, the second carrier 440 may be movable in the first carrier 430 in the direction of the first movement axis S1 and the direction of the second movement axis S2.

In an embodiment, when an OIS function is performed, the second carrier 440 may receive driving forces generated by the first drive unit 460*a*. For example, a driving force may be applied to the second carrier 440 in the direction of the first movement axis S1 by the first magnet 461 and the first coil 462, and a driving force may be applied to the second carrier 440 in the direction of the second movement axis S2 by the second magnet 463 and the second coil 464. When the driving forces are applied, rotation R (e.g., a rotary motion or a rotational component) of the second carrier 440 may be generated. For example, because the second carrier 440 is restrained only by the attractive forces between the magnets 461 and 463 and the yoke members 470, linear movements (e.g., linear motions) of the second carrier 440 in the direction of the first movement axis S1 and the direction of the second movement axis S2 may not be ensured, and thus the rotation R may be generated by the driving forces. The rotation R may act as crosstalk to affect an operation of controlling a movement of the second carrier 440 and obstruct the optical image stabilization function.

The camera module 400 according to embodiments of the disclosure may be configured to suppress the rotation R through asymmetrical shapes of the yoke members 470 or to suppress the rotation R through adjustment of the positions in which the yoke members 470 and the magnets 461 and 463 are disposed. For example, the yoke members 470 may be formed in a shape for increasing restoring forces (e.g., rotational restoring forces) acting on the magnets 461 and 463. Hereinafter, asymmetrical shapes of the yoke members 470 for increasing the rotational restoring forces will be described. The positions of the yoke members 470 and the magnets 461 and 463 for increasing the restoring forces will be described below with reference to FIG. 15.

In an embodiment, the rotation R of the second carrier 440 may be made about a virtual rotation axis RA parallel to the optical axis OA. Referring to FIG. 8, in an OIS operation, the rotation R of the second carrier 440 may be made about the rotation axis RA in a predetermined range in opposite directions (e.g., the clockwise and counterclockwise directions based on FIG. 9). The rotation axis RA may be defined as a virtual axis extending parallel to the optical axis OA while passing through the center of a line segment LS connecting the center of the first magnet 461 and the center of the second magnet 463. For example, referring to FIGS. 9, 10A, and 10B, a first central axis CA1 parallel to the optical axis OA while passing through the center of the first magnet 461 and a second central axis CA2 parallel to the optical axis OA while passing through the center of the second magnet 463 may be defined. The line segment LS may connect the first central axis CA1 and the second central axis CA2 so as to be perpendicular to the first central axis CA1 and the second central axis CA2, and the rotation axis RA may extend parallel to the optical axis OA while passing through the center of the line segment LS. The line segment LS may be a line extending from one point of the first central axis CA1 toward the second central axis CA2 so as to be perpendicular to the second central axis CA2. For example, the line segment LS may be perpendicular to the first central axis CA1, the second central axis CA2, and the optical axis OA.

In an embodiment, when viewed in directions perpendicular to the optical axis OA, the first yoke member 471 may be disposed in a position in which the center of the first yoke member 471 overlaps the first central axis CA1 of the first magnet 461, and the second yoke member 473 may be disposed in a position in which the center of the second yoke member 473 overlaps the second central axis CA2 of the second magnet 463. Referring to FIGS. 10A and 10B, when viewed in the direction of the first movement axis S1, the first central axis CA1 may pass through the center of the first magnet 461 and the center of the first yoke member 471, and when viewed in the direction of the second movement axis S2, the second central axis CA2 may pass through the center of the second magnet 463 and the center of the second yoke member 473. Each of the center of the first yoke member 471 and the center of the second yoke member 473 may be defined as a point that bisects the distance between the opposite outermost ends. According to various embodiments, the first magnet 461 and the second magnet 463 may be formed in substantially the same size or shape, and the first yoke member 471 and the second yoke member 473 may be formed in substantially the same size or shape.

In an embodiment, the yoke members 470 may be formed in an asymmetrically divided shape. Each of the first yoke member 471 and the second yoke member 473 may be formed such that at least two parts are spaced apart from each other by a predetermined gap. For example, the first yoke member 471 may have an asymmetrical shape with respect to the first central axis CA1, and the second yoke member 473 may have an asymmetrical shape with respect to the second central axis CA2. Because each of the yoke members 470 is asymmetrically divided, biased magnetic forces (e.g., magnetic attractive forces) may be formed between the magnets 461 and 463 and the yoke members 470. The yoke members 470 may be configured such that attractive forces formed between parts relatively far away from the rotation axis RA and the magnets 461 and 463 are greater than attractive forces formed between other parts relatively close to the rotation axis RA and the magnets 461 and 463. For example, the yoke members 470 may be formed such that the areas or lengths of the parts far away from the rotation axis RA are greater than the areas or lengths of the parts close to the rotation axis RA.

Referring to FIG. 10A, each of the yoke members 470 may be asymmetrically divided into two parts. The first yoke member 471 may include a first part 471a and a second part 471b spaced apart from the first part 471a by a predetermined gap, and the second yoke member 473 may include a first part 473a and a second part 473b spaced apart from the first part 473a by a predetermined gap. The first yoke member 471 may be formed such that the second part 471b is spaced apart from the first part 471a in the direction of the second movement axis S2. The second yoke member 473 may be formed such that the second part 473b is spaced apart from the first part 473a in the direction of the first movement axis S1.

In the embodiment of FIG. 10A, the yoke members 470 may be configured such that the first parts 471a and 473a are located relatively close to the rotation axis RA and the second parts 471b and 473b are located relatively far away from the rotation axis RA. For example, the first part 471a and the second part 471b of the first yoke member 471 may be sequentially disposed in a first direction parallel to the second movement axis S2, and the first direction may be a direction away from the second magnet 463. For example, the first part 473a and the second part 473b of the second yoke member 473 may be sequentially disposed in a second direction parallel to the first movement axis S1, and the second direction may be a direction away from the first magnet 461.

In the embodiment of FIG. 10A, the first yoke member 471 and the second yoke member 473 may be formed such that the areas (or, sizes) of the second parts 471b and 473b located far away from the rotation axis RA are greater than the areas (or, sizes) of the first parts 471a and 473a located close to the rotation axis RA. For example, the first yoke member 471 may be formed such that the widths of the first part 471a and the second part 471b (e.g., the distances measured in the y-axis direction or the direction of the first movement axis S1) are equal to each other and the length of the second part 471b (e.g., the distance measured in the x-axis direction or the direction of the second movement axis S2) is longer than the length of the first part 471a. For example, the second yoke member 473 may be formed such that the widths of the first part 473a and the second part 473b (e.g., the distances measured in the x-axis direction or the direction of the second movement axis S2) are equal to each other and the length of the second part 473b (e.g., the distance measured in the y-axis direction or the direction of the first movement axis S1) is longer than the length of the first part 473a. Accordingly, the second parts 471b and 473b located relatively far away from the rotation axis RA may form stronger attractive forces with the magnets 461 and 462 than the first parts 471a and 473a.

Referring to FIG. 10B, each of the yoke members 470 may be asymmetrically divided into three parts. The first yoke member 471 may include a first part 471a, a second part 471b spaced apart from the first part 471a by a predetermined gap, and a third part 471c spaced apart from the second part 471b by a predetermined gap, and the second yoke member 473 may include a first part 473a, a second part 473b spaced apart from the first part 473a by a predetermined gap, and a third part 473c spaced apart from the second part 473b by a predetermined gap. The first yoke member 471 may be formed such that the second part 471b and the third part 471c are spaced apart from the first part 471a in the direction of the second movement axis S2. The second yoke member 473 may be formed such that the second part 473b and the third part 473c are spaced apart from the first part 473a in the direction of the first movement axis S1.

In the embodiment of FIG. 10B, the yoke members 470 may be configured such that the third parts 471c and 473c are located farther away from the rotation axis RA than the first parts 471a and 473a and the second parts 471b and 473b. For example, the first part 471a, the second part 471b, and the third part 471c of the first yoke member 471 may be sequentially disposed in the first direction ① parallel to the second movement axis S2, and the first direction ① may be a direction away from the second magnet 463. For example, the first part 473a, the second part 473b, and the third part 473c of the second yoke member 473 may be sequentially disposed in the second direction ② parallel to the first movement axis S1, and the second direction ② may be a direction away from the first magnet 461.

In the embodiment of FIG. 10B, the first yoke member 471 and the second yoke member 473 may be formed such that the areas (or, sizes) of the third parts 471c and 473c located far away from the rotation axis RA are greater than the areas (or, sizes) of the first parts 471a and 473a and the second parts 471b and 473b located close to the rotation axis RA. For example, the first yoke member 471 may be formed such that the first part 471a, the second part 471b, and the third part 471c have the same width and the third part 471c is longer than the first part 471a and the second part 471b. For example, the second yoke member 473 may be formed such that the first part 473a, the second part 473b, and the third part 473c have the same width and the third part 473c is longer than the first part 473a and the second part 473b. Accordingly, the third parts 471c and 473c located relatively far away from the rotation axis RA may form stronger attractive forces with the magnets 461 and 463 than the first parts 471a and 473a and the second parts 471b and 473b. According to various embodiments, the first parts 471a and 473a and the second parts 471b and 473b may have the same area (or, length), and the areas (or, lengths) of the second parts 471b and 473b may be greater than the areas (or, lengths) of the first parts 471a and 473a.

According to embodiments of the disclosure, the camera module 400 may be configured such that relatively strong magnetic attractive forces act on the parts of the yoke members 470 located far away from the rotation axis RA. Accordingly, the camera module 400 may increase the rotational restoring forces (e.g., torques) acting on the second carrier 440, and thus may decrease the rotation R of the second carrier 440.

Figure 11:
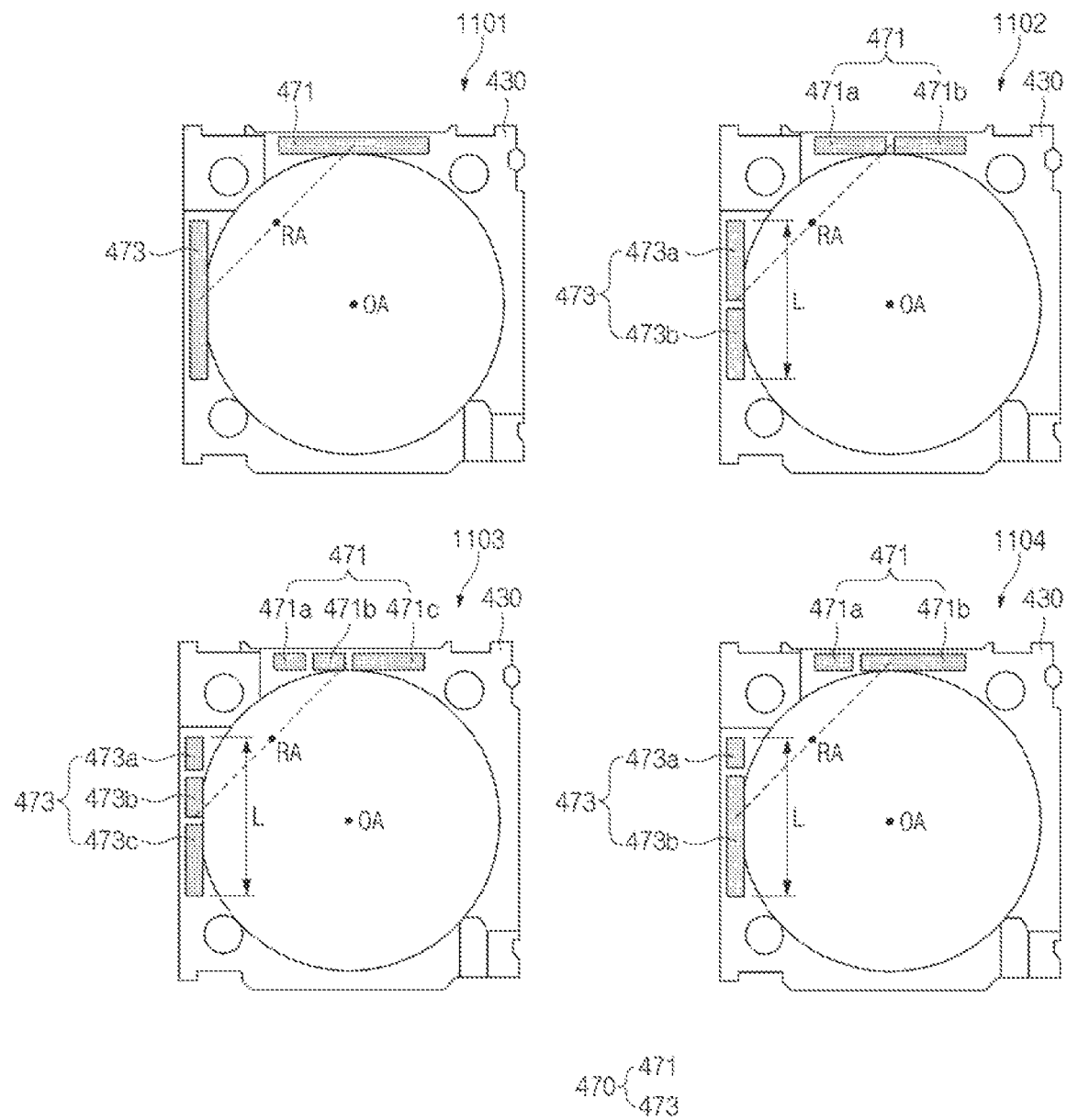
FIG. 11 is a diagram of various shapes of yoke members of the camera module according to an embodiment.
Figure 12:
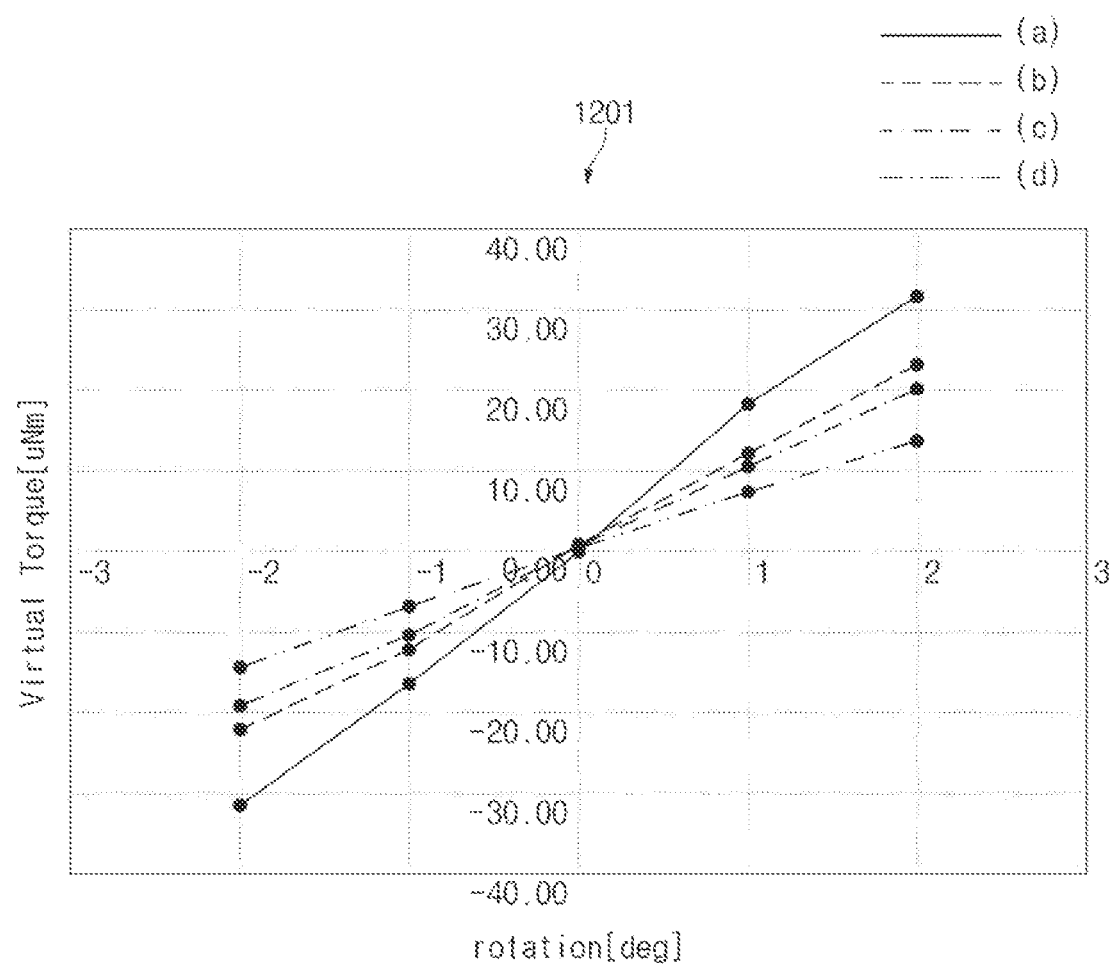
FIG. 12 is a graph depicting the magnitudes of rotational restoring forces for the various shapes of the yoke members illustrated in FIG. 11 according to an embodiment.

FIG. 11 is a diagram of various shapes of yoke members of the camera module according to an embodiment. FIG. 12 is a graph depicting the magnitudes of rotational restoring forces for the various shapes of the yoke members illustrated in FIG. 11 according to an embodiment.

FIG. 11 is a view illustrating the shapes of yoke members according to comparative example 1101, comparative example 1102, embodiment 1103, and embodiment 1104. FIG. 12 is a graph depicting rotational restoring forces (e.g., torques) of the yoke members according to comparative example 1101, comparative example 1102, embodiment 1103, and embodiment 1104.

Referring to FIG. 11, each of the yoke members 470 according to various embodiments may be disposed on the first carrier 430. The yoke members 470 may include a first yoke member 471 and a second yoke member 473, and the first yoke member 471 and the second yoke member 473 may be disposed substantially perpendicular to each other.

The yoke members 470 of comparative example 1101 may be integrally formed without being divided. Each of the yoke members 470 of comparative example 1102 may be divided into two parts symmetrical to each other. For example, the yoke members 470 of comparative example 1102 may have a shape in which first parts 471a and 473a and second parts 471b and 473b have the same area (or, length) so as to be symmetrical to each other with respect to the center of the yoke members 470.

The yoke members 470 of embodiment 1103 may have a shape in which first parts 471a and 473a, second parts 471b and 473b, and third parts 471c and 473c are asymmetrically divided from one another and the areas of the third parts 471c and 473c located far away from the rotation axis RA are greater than the areas of the first parts 471a and 473a and the second parts 471b and 473b. For example, the yoke members 470 of embodiment 1103 may be referred to as the yoke members 470 illustrated in FIG. 10B. The yoke members 470 of embodiment 1104 may have a shape in which first parts 471a and 473a and second parts 471b and 473b are asymmetrically divided from each other and the areas of the second parts 471b and 473b located far away from the rotation axis RA are greater than the areas of the first parts 471a and 473a. For example, the yoke members 470 of embodiment 1104 may be referred to as the yoke members 470 illustrated in FIG. 10A.

In FIG. 11, the entire lengths L of the yoke members 470 of comparative example 1101, comparative example 1102, embodiment 1103, and embodiment 1104 may be substantially the same. The entire lengths L of the yoke members 470 may refer to the distances between the opposite outermost ends. For example, the entire lengths L of the yoke members 470 of comparative example 1102 and embodiment 1104 may be the distances between the outer ends of the first parts 471a and 473a and the outer ends of the second parts 471b and 473b. The entire lengths L of the yoke members 470 of embodiment 1103 may be the distances between the outer ends of the first parts 471a and 473a and the outer ends of the third parts 471c and 473c.

Referring to FIG. 12, graph 1201 is a graph depicting the rotational restoring forces of the yoke members according to comparative example 1101, comparative example 1102, embodiment 1103, and embodiment 1104 and is a graph depicting rotational restoring force (unit: μNm) versus rotation angle (unit: ° (degree)). For example, in graph 1201, the horizontal axis represents rotation angle, and the vertical axis represents rotational restoring force. In graph 1202, (a) is a graph depicting the rotational restoring forces of the yoke members according to embodiment 1104, (b) is a graph depicting the rotational restoring forces of the yoke members according to embodiment 1103, (c) is a graph depicting the rotational restoring forces of the yoke members according to comparative example 1102, and (d) is a graph depicting the rotational restoring forces of the yoke members according to comparative example 1101.

Based on graph 1201, the rotational restoring forces for comparative example 1101, comparative example 1102, embodiment 1103, and embodiment 1104 may be listed as in Table 1 below. In Table 1, the rotational restoring forces indicated by the + sign and the rotational restoring forces indicated by the − sign may face opposite directions.

TABLE 1

|  | Comparative example 1101 | Comparative example 1102 | Embodiment 1103 | Embodiment 1104 |
| --- | --- | --- | --- | --- |
| −2 (deg) | −14.38 | −19.12 | −22.05 | −31.13 |
| −1 (deg) | −6.64 | −10.26 | −12.01 | −16.43 |

TABLE 1-continued

|  | Comparative example 1101 | Comparative example 1102 | Embodiment 1103 | Embodiment 1104 |
|---|---|---|---|---|
| 0(deg) | 0.47 | 0.63 | 0.70 | −0.04 |
| 1(deg) | 7.41 | 10.57 | 12.26 | 18.09 |
| 2(deg) | 13.81 | 20.23 | 23.24 | 31.71 |

Referring to Table 1 together with graph 1201, it can be seen that the magnitudes of the rotational restoring forces in embodiment 1103 and embodiment 1104 are greater than the magnitudes of the rotational restoring forces in comparative example 1101 and comparative example 1102. In addition, it can be seen that the rotational restoring forces are increased in the order of comparative example 1101, comparative example 1102, embodiment 1103 and embodiment 1104. As depicted in graph 1201, the rotational restoring forces may be increased by asymmetrically dividing the yoke members 470 and making the areas (or, lengths) of the parts far away from the rotation axis RA larger.

Figure 13A:
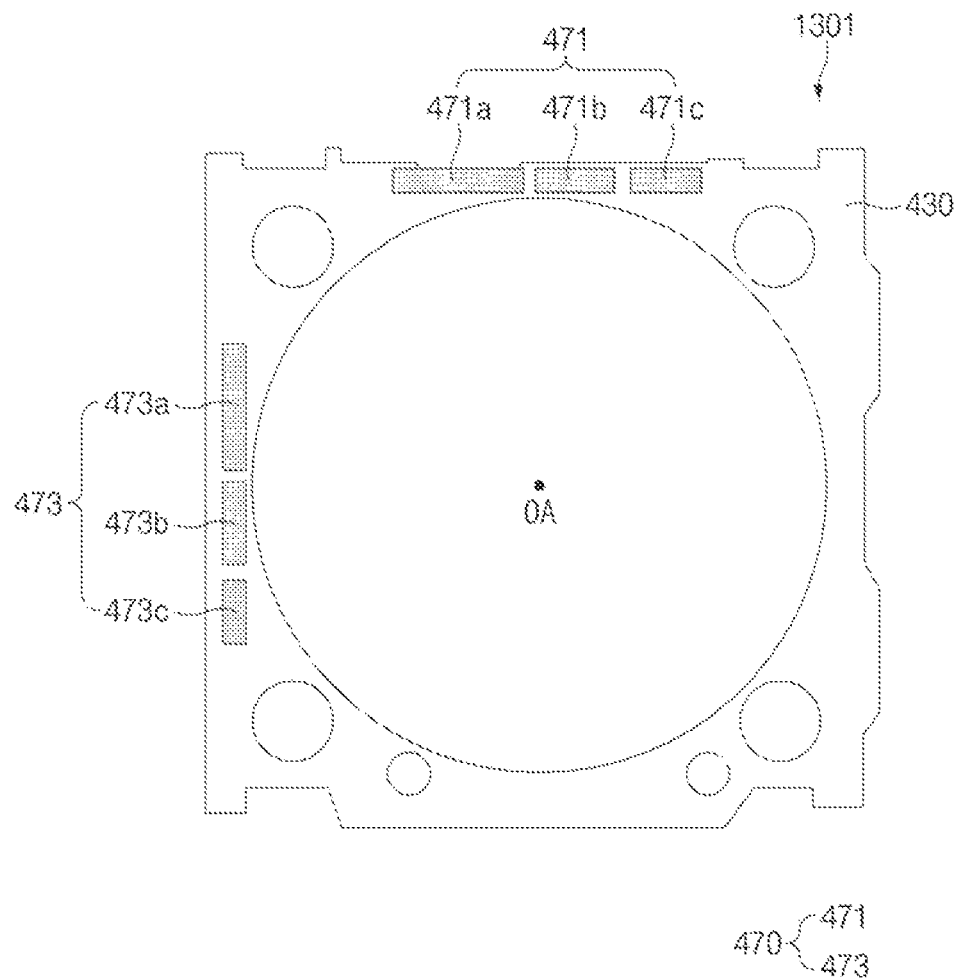
FIG. 13A is a diagram of yoke members having another shape according to an embodiment.
Figure 13B:
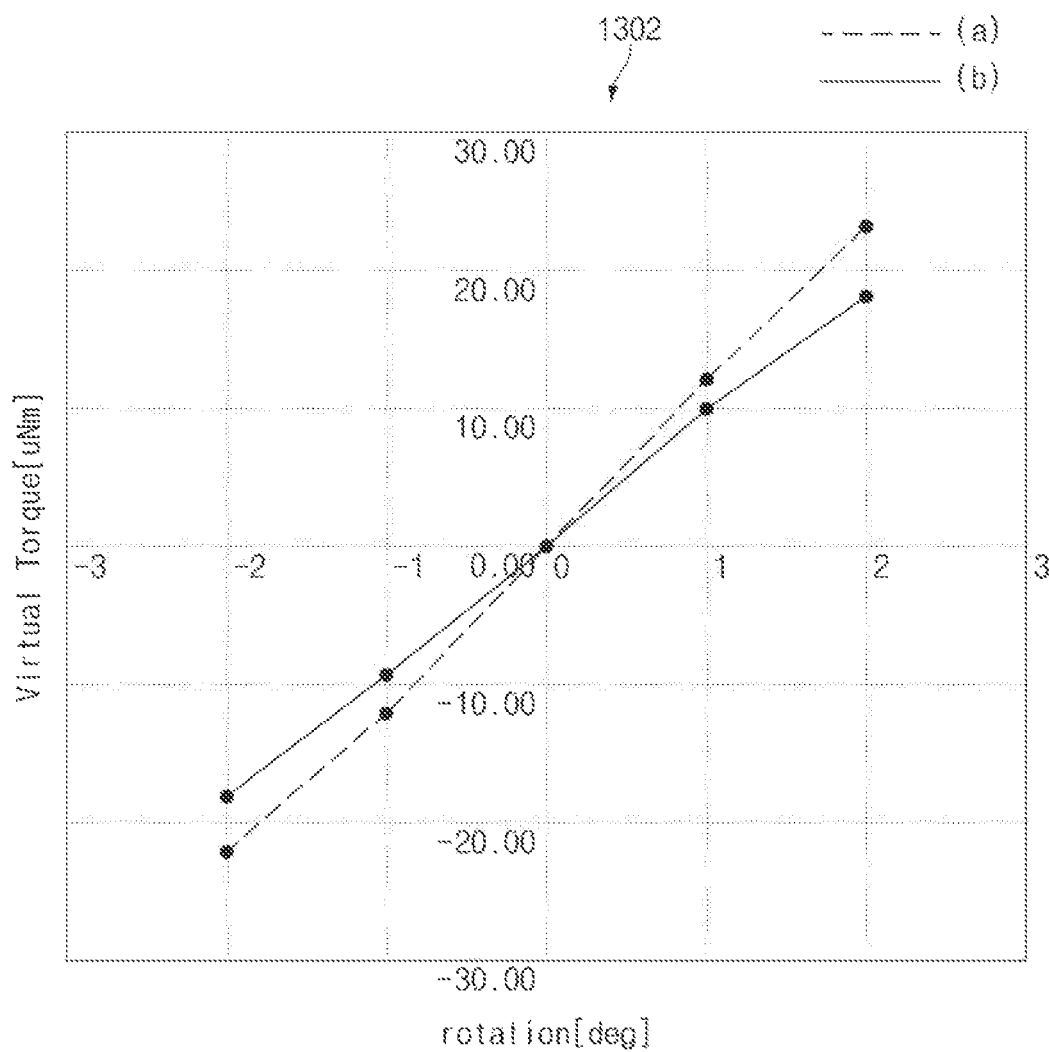
FIG. 13B is a graph depicting the magnitudes of rotational restoring forces for the yoke members having the other shape according to an embodiment.

FIG. 13A is a diagram of yoke members having another shape according to an embodiment. FIG. 13B is a graph depicting the magnitudes of rotational restoring forces for the yoke members having the other shape according to an embodiment.

FIG. 13A is a view illustrating the shape of yoke members according to comparative example 1301.

Referring to FIGS. 13A and 11 together, the yoke members 470 of comparative example 1301 may have a shape in which the first parts 471a and 473a, the second parts 471b and 473b, and the third parts 471c and 473c in the yoke members 470 of embodiment 1103 illustrated in FIG. 11 are arranged in the reverse order. For example, the yoke members 470 of comparative example 1103 may be formed such that first parts 471a and 473a located close to the rotation axis RA are longer than second parts 471b and 473b and third parts 471c and 473.

Referring to FIG. 13B, graph 1302 is a graph depicting the rotational restoring forces for embodiment 1103 and comparative example 1301 and is a graph depicting rotational restoring force (unit: μNm) versus rotation angle (unit: ° (degree)). For example, in graph 1302, the horizontal axis represents rotation angle, and the vertical axis represents rotational restoring force. In graph 1302, (a) is a graph depicting the rotational restoring forces of the yoke members according to embodiment 1103, and (b) is a graph depicting the rotational restoring forces of the yoke members according to comparative example 1301.

Based on graph 1302, the rotational restoring forces for embodiment 1103 and comparative example 1301 may be listed as in Table 2 below. In Table 2, the rotational restoring forces indicated by the + sign and the rotational restoring forces indicated by the − sign may face opposite directions.

TABLE 2

|  | Embodiment 1103 | Comparative example 1301 |
|---|---|---|
| −2(deg) | −22.05 | −18.05 |
| −1(deg) | −12.01 | −9.33 |
| 0(deg) | 0.70 | 0.40 |
| 1(deg) | 12.26 | 9.95 |
| 2(deg) | 23.24 | 18.39 |

Referring to Table 2 together with graph 1302, it can be seen that the magnitudes of the rotational restoring forces in embodiment 1103 are greater than the magnitudes of the rotational restoring forces in comparative example 1301. As depicted in graph 1302, the rotational restoring forces may be increased by asymmetrically dividing the yoke members 470 and making the areas (or, lengths) of the parts far away from the rotation axis RA larger.

Figure 14A:
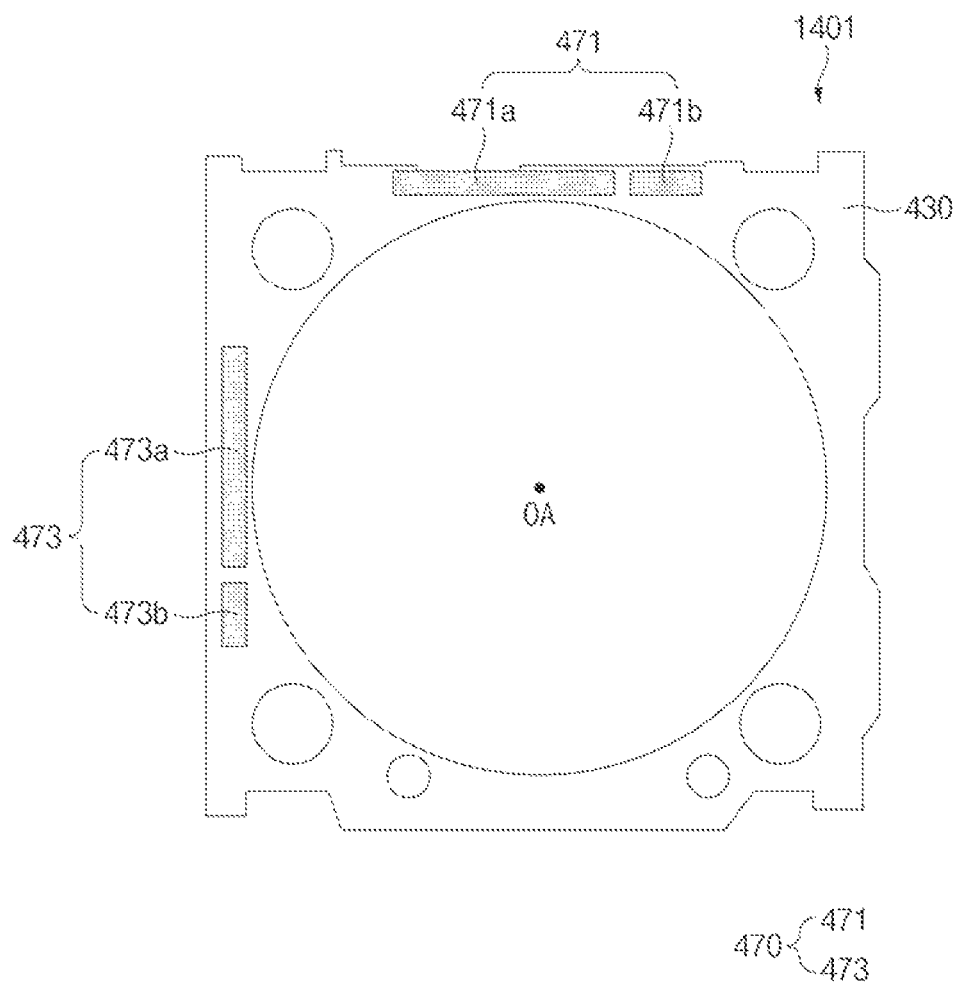
FIG. 14A is a diagram of yoke members having another shape according to an embodiment.
Figure 14B:
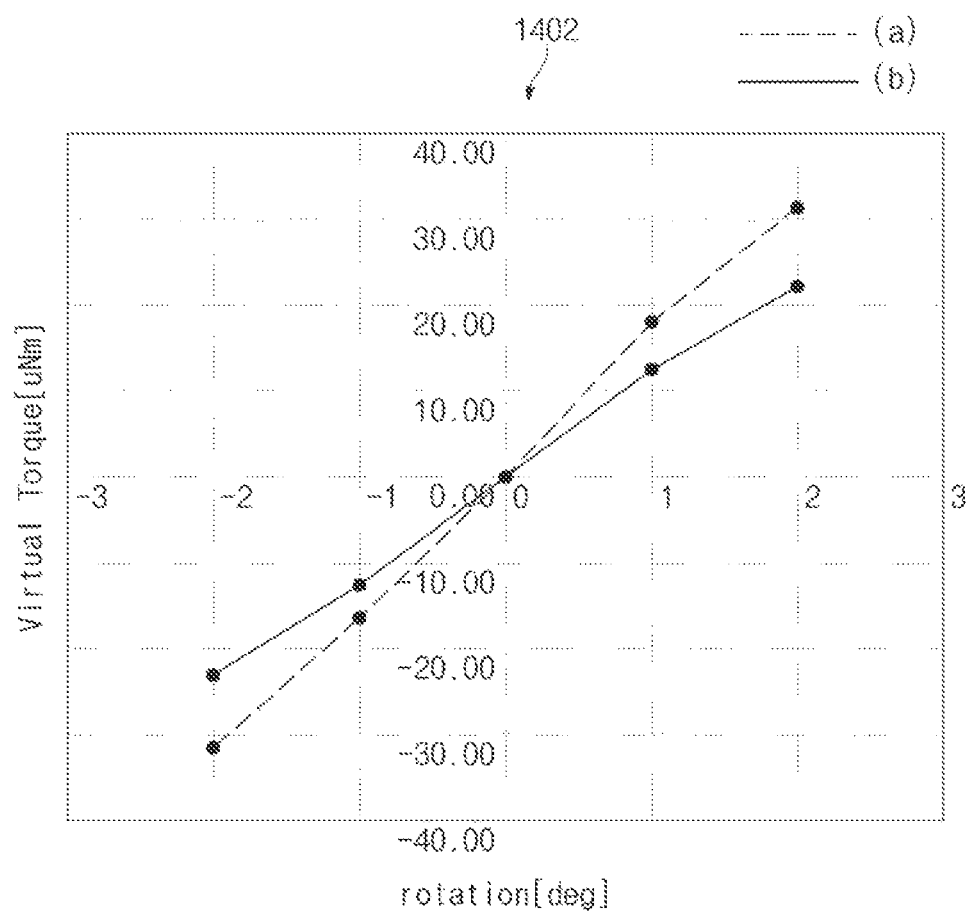
FIG. 14B is a graph depicting the magnitudes of rotational restoring forces for the yoke members having the other shape according to an embodiment.

FIG. 14A is a diagram of yoke members having another shape according to an embodiment. FIG. 14B is a graph depicting the magnitudes of rotational restoring forces for the yoke members having the other shape according to an embodiment.

FIG. 14A is a view illustrating the shape of yoke members according to comparative example 1401.

Referring to FIGS. 14A and 11, the yoke members 470 of comparative example 1401 may have a shape in which the first parts 471a and 473a and the second parts 471b and 473b in the yoke members 470 of embodiment 1104 illustrated in FIG. 11 are arranged in the reverse order. For example, the yoke members 470 of comparative example 1401 may be formed such that first parts 471a and 473a located close to the rotation axis RA are longer than second parts 471b and 473b.

Referring to FIG. 14B, graph 1402 is a graph depicting the rotational restoring forces for embodiment 1104 and comparative example 1401 and is a graph depicting rotational restoring force (unit: μNm) versus rotation angle (unit: ° (degree)). For example, in graph 1402, the horizontal axis represents rotation angle, and the vertical axis represents rotational restoring force. In graph 1402, (a) is a graph depicting the rotational restoring forces of the yoke members according to embodiment 1104, and (b) is a graph depicting the rotational restoring forces of the yoke members according to comparative example 1401.

Based on graph 1402, the rotational restoring forces for embodiment 1104 and comparative example 1401 may be listed as in Table 3 below. In Table 3, the rotational restoring forces indicated by the + sign and the rotational restoring forces indicated by the − sign may face opposite directions.

TABLE 3

|  | Embodiment 1104 | Comparative example 1401 |
|---|---|---|
| −2(deg) | −31.13 | −22.90 |
| −1(deg) | −16.43 | −12.60 |
| 0(deg) | −0.04 | −0.22 |
| 1(deg) | 18.09 | 12.36 |
| 2(deg) | 31.71 | 22.10 |

Referring to Table 3 together with graph 1402, it can be seen that the magnitudes of the rotational restoring forces in embodiment 1104 are greater than the magnitudes of the rotational restoring forces in comparative example 1401. As depicted in graph 1402, the rotational restoring forces may be increased by asymmetrically dividing the yoke members 470 and making the areas (or, lengths) of the parts far away from the rotation axis RA larger.

Figure 15:
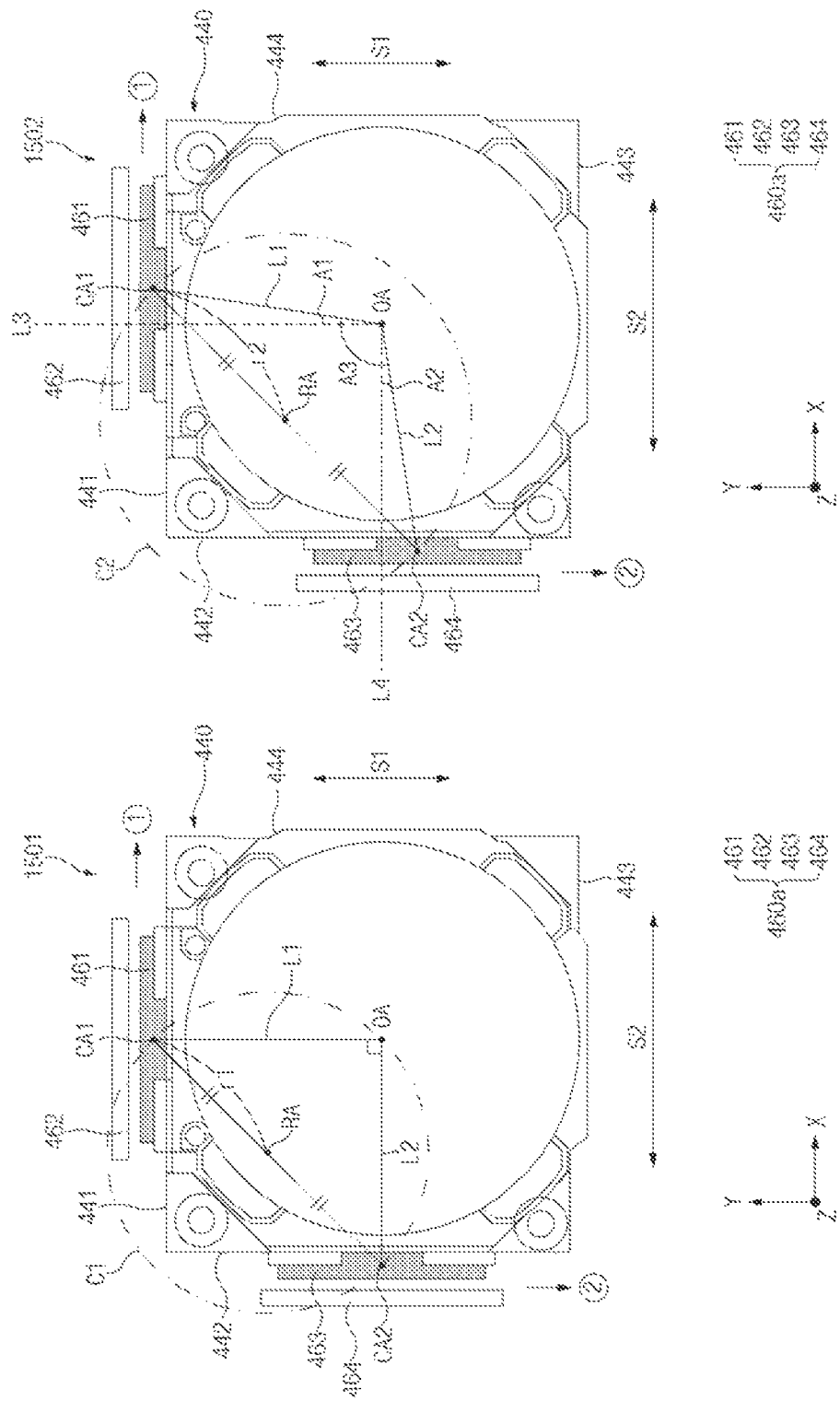
FIG. 15 is a diagram of the second carrier and the first drive unit of the camera module according to an embodiment.

FIG. 15 is a diagram of the second carrier and the first drive unit of the camera module according to an embodiment.

Referring to FIG. 15, the camera module 400 according to an embodiment may include the second carrier 440 and the first drive unit 460a.

In an embodiment, the second carrier 440 may include the first side surface 441 and the third side surface 443 that face the direction of the first movement axis S1 and face each other and the second side surface 442 and the fourth side surface 444 that face the direction of the second movement axis S2 and face each other.

In an embodiment, the first drive unit 460*a* may include the first magnet 461 disposed on the second carrier 440 to face the direction of the first movement axis S1, the second magnet 463 disposed on the second carrier 440 to face the direction of the second movement axis S2, the first coil 462 facing the first magnet 461, and the second coil 464 facing the second magnet 463.

The camera module 400 according to an embodiment may be provided in a structure in which to increase rotational restoring forces, the position of the first drive unit 460*a* is moved in a direction in which the rotation axis RA approaches the optical axis OA. For example, in FIG. 15, a first arrangement structure 1501 may be a structure before the first drive unit 460*a* is moved, and a second arrangement structure 1502 may be a structure after the first drive unit 460*a* is moved.

Referring to the first arrangement structure 1501 of FIG. 15, the first magnet 461 may be disposed on the first side surface 441 of the second carrier 440, and the second magnet 463 may be disposed on the second side surface 442 of the second carrier 440. The first central axis CA1 may be substantially parallel to the optical axis OA, and the first magnet 461 may be disposed in a position in which the first central axis CA1 overlaps the optical axis OA when viewed in the direction of the first movement axis S1. For example, a first line segment L1 connecting the optical axis OA and the first central axis CA1 so as to be substantially perpendicular to the optical axis OA and the first central axis CA1 may be parallel to the first movement axis S1. The second central axis CA2 may be substantially parallel to the optical axis OA, and the second magnet 463 may be disposed in a position in which the second central axis CA2 overlaps the optical axis OA when viewed in the direction of the second movement axis S2. For example, a second line segment L2 connecting the optical axis OA and the second central axis CA2 so as to be substantially perpendicular to the optical axis OA and the second central axis CA2 may be parallel to the second movement axis S2. The first line segment L1 and the second line segment L2 may be defined as lines that extend from one point on the optical axis OA toward the first central axis CA1 and the second central axis CA2 so as to be perpendicular to the optical axis OA.

According to the first arrangement structure 1501, the first line segment L1 connecting the optical axis OA and the first central axis CA1 and the second line segment L2 connecting the optical axis OA and the second central axis CA2 may be perpendicular to each other. When the first arrangement structure 1501 is viewed in the direction of the optical axis OA based on FIG. 15, a first virtual circle C1 having the rotation axis RA as the center thereof and passing through the first central axis CA1 and the second central axis CA2 may be defined, and the first radius r1 of the first circle C1 may be the radius of rotation of rotational restoring forces acting on the second carrier 440.

Referring to the second arrangement structure 1502 of FIG. 15, the second arrangement structure 1502 may be a structure in which the first magnet 461 and the second magnet 463 are moved such that the distance between the rotation axis RA and the optical axis OA is shorter than that in the first arrangement structure 1501. For example, the second arrangement structure 1502 may be understood as a structure in which, based on the first arrangement structure 1501, the first magnet 461 is moved in the first direction ① away from the second magnet 463 and the second magnet 463 is moved in the second direction ② away from the first magnet 461. The first direction ① may be a direction parallel to the second movement axis S2 and away from the second magnet 463 or the second side surface 442, and the second direction ② may be a direction parallel to the first movement axis S1 and away from the first magnet 461 or the first side surface 441. The first coil 462, the second coil 464, and the yoke members (e.g., the yoke members 470 of FIGS. 10A and 10B) may move together in response to the movements of the first magnet 461 and the second magnet 463. For example, referring to FIGS. 10A And 10B together, in response to the movement of the first magnet 461, the first yoke member 471 may be disposed in a position in which the center thereof is aligned with the first central axis CA1 of the first magnet 461, and in response to the movement of the second magnet 463, the second yoke member 473 may be disposed in a position in which the center thereof is aligned with the second central axis CA2 of the second magnet 463.

In the second arrangement structure 1502, the first magnet 461 may be disposed in a position in which the first central axis CA1 is moved in the first direction ① with respect to the optical axis OA without overlapping the optical axis OA when viewed in the direction of the first movement axis S1. The second magnet 463 may be disposed in a position in which the second central axis CA2 is moved in the second direction ② with respect to the optical axis OA without overlapping the optical axis OA when viewed in the direction of the second movement axis S2. For example, when the second arrangement structure 1502 is viewed in the direction of the optical axis OA, a first extension line L3 extending parallel to the first movement axis S1 from the optical axis OA and a second extension line L4 extending parallel to the second movement axis S2 from the optical axis OA may be defined. The first magnet 461 may be disposed in a position in which the first central axis CA1 is spaced apart from the first extension line L3 by a predetermined distance in the first direction ①, and the second magnet 463 may be disposed in a position in which the second central axis CA2 is spaced apart from the second extension line L4 by a predetermined distance in the second direction ②. The first extension line L3 and the second extension line L4 may extend substantially perpendicular to the optical axis OA.

In the second arrangement structure 1502, the first line segment L1 connecting the optical axis OA and the first central axis CA1 so as to be perpendicular to the optical axis OA and the first central axis CA1 may not be parallel to the first movement axis S1, and the second line segment L2 connecting the optical axis OA and the second central axis CA2 so as to be perpendicular to the optical axis OA and the second central axis CA2 may not be parallel to the second movement axis S2. For example, the first line segment L1 may form a first included angle A1 in the first direction ① with the first extension line L3 (or, the first movement axis S1). The second line segment L2 may form a second included angle A2 in the second direction ② with the second extension line L4 (or, the second movement axis S2). The first included angle A1 and the second included angle A2 may be equal to or different from each other.

According to the second arrangement structure 1502, the first line segment L1 connecting the optical axis OA and the first central axis CA1 and the second line segment L2 connecting the optical axis OA and the second central axis CA2 may form an obtuse angle. For example, the included angle A3 between the first line segment L1 and the second line segment L2 may be greater than 90° and smaller than 180°. When the second arrangement structure 1502 is viewed in the direction of the optical axis OA based on FIG. 15, a second virtual circle C2 having the rotation axis RA as the center thereof and passing through the first central axis CA1 and the second central axis CA2 may be defined, and the second radius r2 of the second circle C2 may be the radius of rotation of rotational restoring forces acting on the second carrier 440. The second radius r2 of the second circle C2 may be greater than the first radius r1 of the first circle C1 in the first arrangement structure 1501.

In an embodiment, a rotational restoring force that acts on the second carrier 440 may be obtained by Equation (1) below.

$$\tau = r \times F \quad (1)$$

In Equation (1), "τ" may refer to a rotational restoring force (e.g., moment or torque), "r" may refer to a radius of rotation, and "F" may refer to a force applied to the second carrier 440 (or, the magnets 461 and 463). For example, the radius of rotation may be the distance from the rotation axis RA to a point at which the force is applied. Based on Equation 1 above, the rotational restoring force may be increased as the radius of rotation is increased.

When the first arrangement structure 1501 and the second arrangement structure 1502 of FIG. 15 are compared with each other, the radius of rotation r of Equation 1 in the second arrangement structure 1502 in which the rotation axis RA is located close to the optical axis OA may be greater than that in the first arrangement structure 1501 in the case in which the yoke members 470 have the same shape. For example, the radius of rotation r in the first arrangement structure 1501 may be the first radius r1 of the first circle C1, and the radius of rotation r in the second arrangement structure 1502 may be the second radius r2 of the second circle C2. The second radius r2 may be greater than the first radius r1, and thus the rotational restoring forces in the second arrangement structure 1502 may be greater than the rotational restoring forces in the first arrangement structure 1501.

In the camera module 400 according to embodiments of the disclosure, the first magnet 461 and the second magnet 463 may be disposed in positions in which the first line segment L1 connecting the optical axis OA and the first central axis CA1 and the second line segment L2 connecting the optical axis OA and the second central axis CA2 form an obtuse angle. Accordingly, the rotational restoring forces that act on the second carrier 440 may be increased, and thus rotation of the second carrier 440 (e.g., the rotation R of FIG. 8) may be decreased.

Figure 16A:
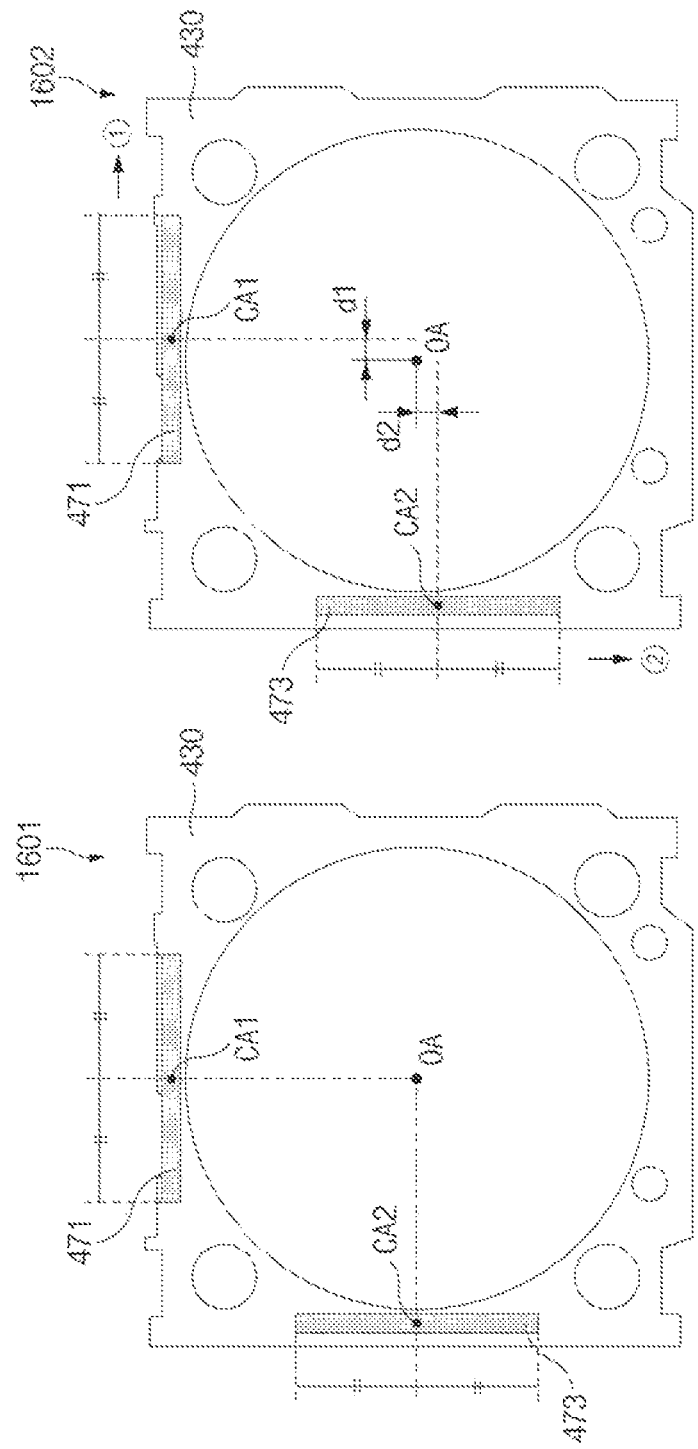
FIG. 16A is a diagram of various arrangement structures of yoke members of the camera module according to an embodiment.
Figure 16B:
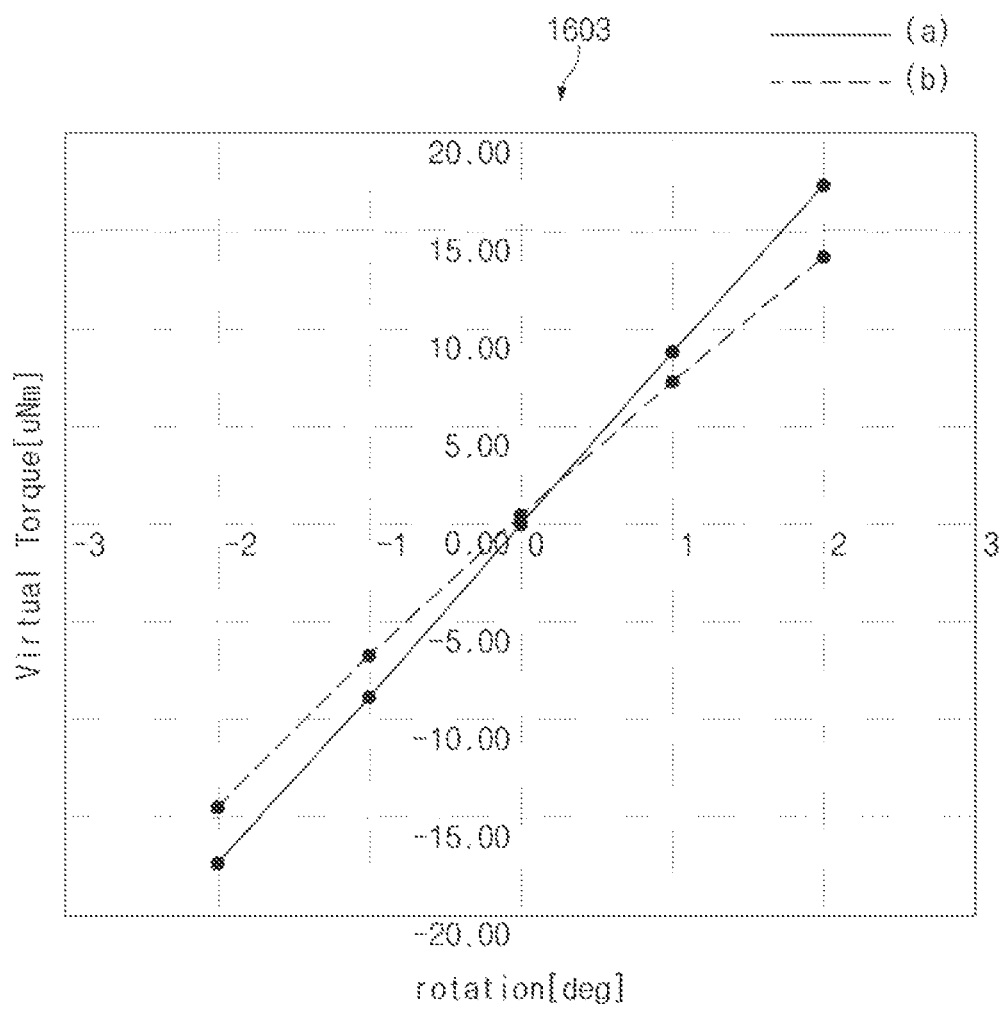
FIG. 16B is a graph depicting the magnitudes of rotational restoring forces for the various arrangement structures of the yoke members illustrated in FIG. 16A according to an embodiment.

FIG. 16A is a diagram of various arrangement structures of yoke members of the camera module according to an embodiment. FIG. 16B is a graph depicting the magnitudes of rotational restoring forces for the various arrangement structures of the yoke members illustrated in FIG. 16A according to an embodiment.

FIG. 16A is a view illustrating the shapes and positions of yoke members according to comparative example 1601 and embodiment 1602. FIG. 16B is a graph depicting rotational restoring forces (e.g., torques) for the yoke members according to comparative example 1601 and embodiment 1602.

Referring to FIG. 16A, in comparative example 1601 (e.g., comparative example 1101 of FIG. 11), the yoke members 470 may have an integral shape without being divided and may be disposed in positions corresponding to a first arrangement structure (e.g., the first arrangement structure 1501 of FIG. 15). In embodiment 1602, the yoke members 470 may be disposed in positions corresponding to a second arrangement structure (e.g., the second arrangement structure 1502 of FIG. 15) by moving the positions of the yoke members 470 and the magnets (e.g., the first magnet 461 and the second magnet 463 of FIG. 15) in comparative example 1601. For example, embodiment 1602 may correspond to a structure in which, based on comparative example 1601, the first yoke member 471 is moved together with the first magnet 461 in the first direction ① by a predetermined distance and the second yoke member 473 is moved together with the second magnet 463 in the second direction ② by a predetermined distance. In embodiment 1602, the first central axis CA1 may be spaced apart from the optical axis OA by a first distance d1 in the first direction ①, and the second central axis CA2 may be spaced apart from the optical axis OA by a second distance d2 in the second direction ②. The first distance d1 and the second distance d2 may be equal to or different from each other.

Referring to FIG. 16B, graph 1603 is a graph depicting the rotational restoring forces for comparative example 1601 and embodiment 1602 and is a graph depicting rotational restoring force (unit: μNm) versus rotation angle (unit: ° (degree)). For example, in graph 1603, the horizontal axis represents rotation angle, and the vertical axis represents rotational restoring force. In graph 1603, (a) is a graph depicting the rotational restoring forces of the yoke members according to embodiment 1602, and (b) is a graph depicting the rotational restoring forces of the yoke members according to comparative example 1601.

Based on graph 1603, the rotational restoring forces for comparative example 1601 and embodiment 1602 may be listed as in Table 4 below. In Table 4, the rotational restoring forces indicated by the + sign and the rotational restoring forces indicated by the − sign may face opposite directions.

TABLE 4

| | Comparative example 1601 | Embodiment 1602 |
|---|---|---|
| −2 (deg) | −14.38 | −17.03 |
| −1 (deg) | −6.64 | −8.82 |
| 0 (deg) | 0.47 | 0.16 |
| 1 (deg) | 7.41 | 8.82 |
| 2 (deg) | 13.81 | 17.25 |

Referring to Table 4 together with graph 1603, it can be seen that the magnitudes of the rotational restoring forces in the arrangement structure of embodiment 1602 are greater than the magnitudes of the rotational restoring forces in the arrangement structure of comparative example 1601. When the yoke members 470 and the magnets 461 and 463 are disposed such that the rotation axis RA is located close to the optical axis OA as described above, the radius of rotation may be formed to be larger, and thus the rotational restoring forces may be increased.

Figure 17A:
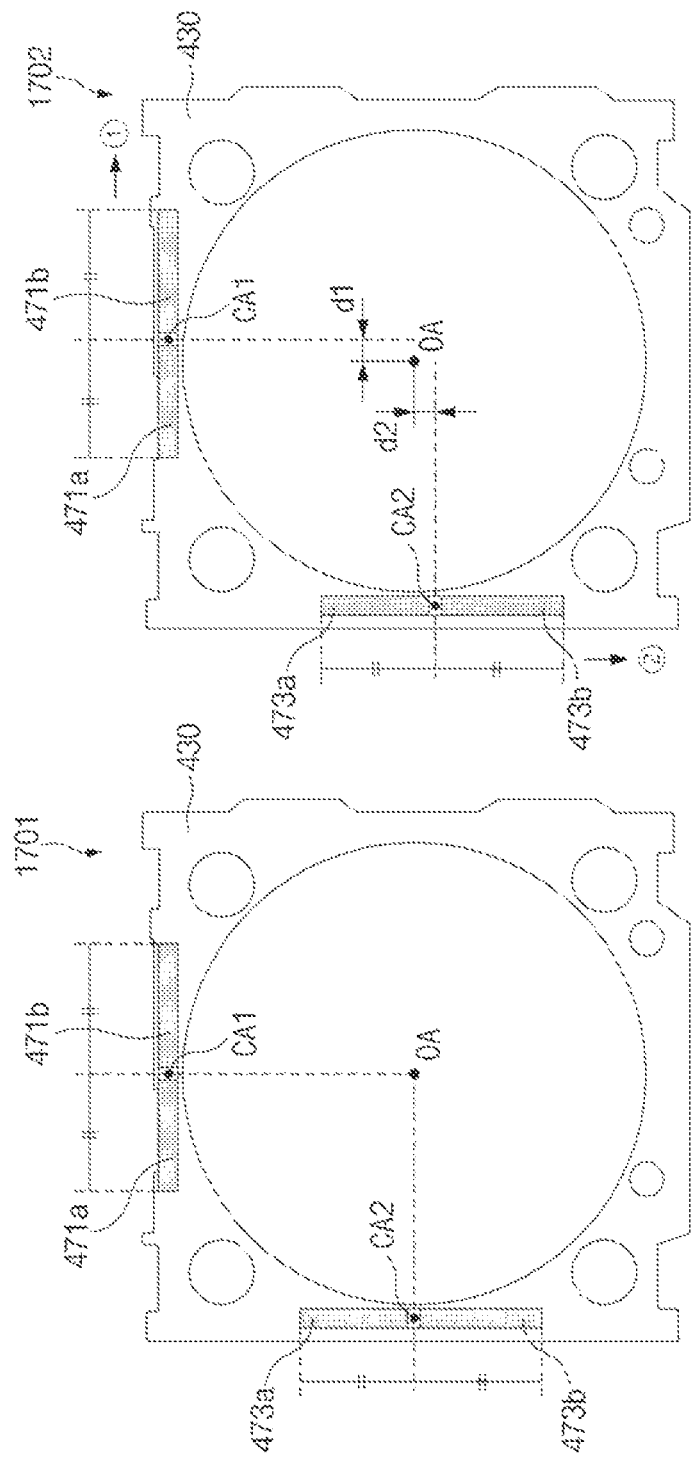
FIG. 17A is a diagram of various arrangement structures of yoke members of the camera module according to an embodiment.
Figure 17B:
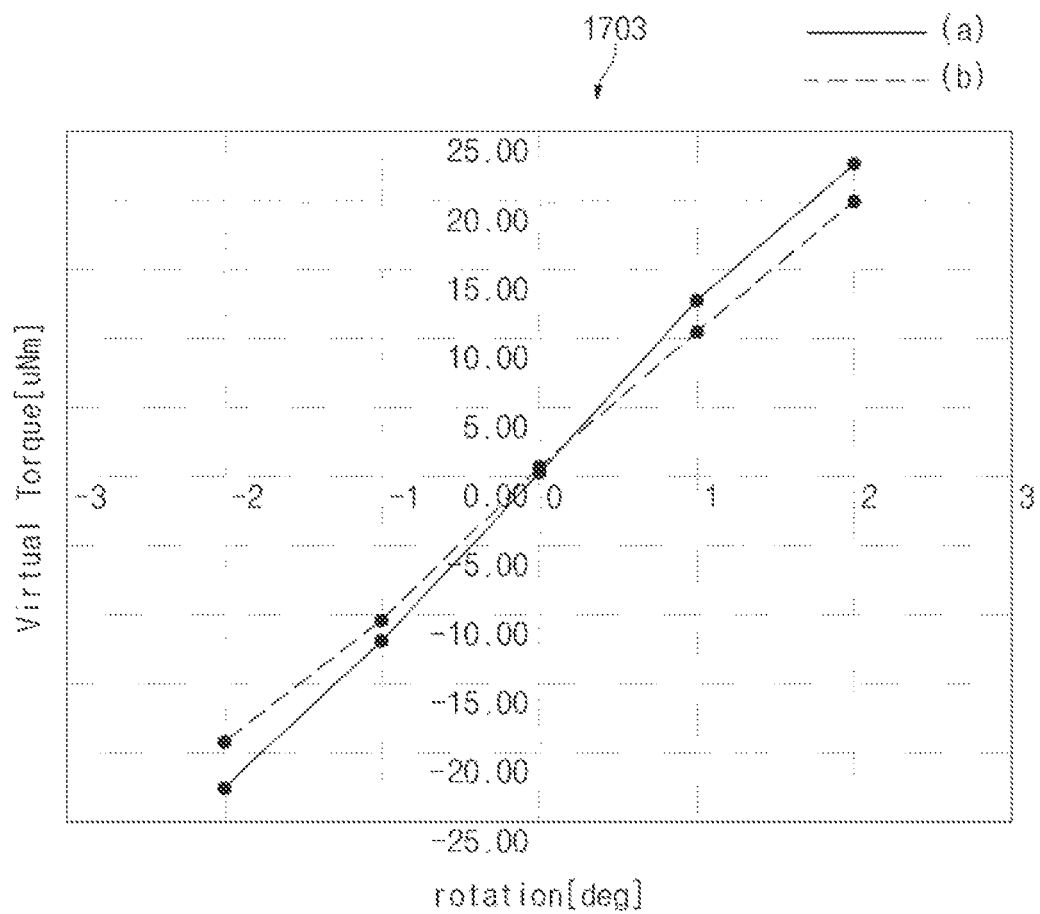
FIG. 17B is a graph depicting the magnitudes of rotational restoring forces for the various arrangement structures of the yoke members illustrated in FIG. 17A according to an embodiment.

FIG. 17A is a diagram of various arrangement structures of yoke members of the camera module according to an embodiment. FIG. 17B is a graph depicting the magnitudes of rotational restoring forces for the various arrangement structures of the yoke members illustrated in FIG. 17A according to an embodiment.

FIG. 17A is a view illustrating the shapes and positions of yoke members according to comparative example 1701 and embodiment 1702. FIG. 17B is a graph depicting rotational restoring forces (e.g., torques) for the yoke members according to comparative example 1701 and embodiment 1702.

Referring to FIG. 17A, in comparative example 1701 (e.g., comparative example 1102 of FIG. 11), the yoke members 470 may each be divided into two parts symmetrical to each other and may be disposed in positions corresponding to a first arrangement structure (e.g., the first arrangement structure 1501 of FIG. 15). In embodiment 1702, the yoke members 470 may be disposed in positions corresponding to a second arrangement structure (e.g., the second arrangement structure 1502 of FIG. 15) by moving the positions of the yoke members 470 and the magnets (e.g., the first magnet 461 and the second magnet 463 of FIG. 15) in comparative example 1701. For example, embodiment 1702 may correspond to a structure in which, based on comparative example 1701, the first yoke member 471 is moved together with the first magnet 461 in the first direction ① by a predetermined distance and the second yoke member 473 is moved together with the second magnet 463 in the second direction ② by a predetermined distance. In embodiment 1702, the first central axis CA1 may be spaced apart from the optical axis OA by a first distance d1 in the first direction ①, and the second central axis CA2 may be spaced apart from the optical axis OA by a second distance d2 in the second direction ②. The first distance d1 and the second distance d2 may be equal to or different from each other.

Referring to FIG. 17B, graph 1703 is a graph depicting the rotational restoring forces for comparative example 1701 and embodiment 1702 and is a graph depicting rotational restoring force (unit: μNm) versus rotation angle (unit: ° (degree)). For example, in graph 1703, the horizontal axis represents rotation angle, and the vertical axis represents rotational restoring force. In graph 1703, (a) is a graph depicting the rotational restoring forces of the yoke members according to embodiment 1702, and (b) is a graph depicting the rotational restoring forces of the yoke members according to comparative example 1701.

Based on graph 1703, the rotational restoring forces for comparative example 1701 and embodiment 1702 may be listed as in Table 5 below. In Table 5, the rotational restoring forces indicated by the + sign and the rotational restoring forces indicated by the − sign may face opposite directions.

TABLE 5

|  | Comparative example 1701 | Embodiment 1702 |
| --- | --- | --- |
| −2 (deg) | −19.12 | −22.48 |
| −1 (deg) | −10.26 | −11.79 |
| 0 (deg) | 0.63 | 0.36 |
| 1 (deg) | 10.57 | 12.84 |
| 2 (deg) | 20.23 | 22.65 |

Referring to Table 5 together with graph 1703, it can be seen that the magnitudes of the rotational restoring forces in the arrangement structure of embodiment 1702 are greater than the magnitudes of the rotational restoring forces in the arrangement structure of comparative example 1701. When the yoke members 470 and the magnets 461 and 463 are disposed such that the rotation axis RA is located close to the optical axis OA as described above, the radius of rotation may be formed to be larger, and thus the rotational restoring forces may be increased.

Figure 18A:
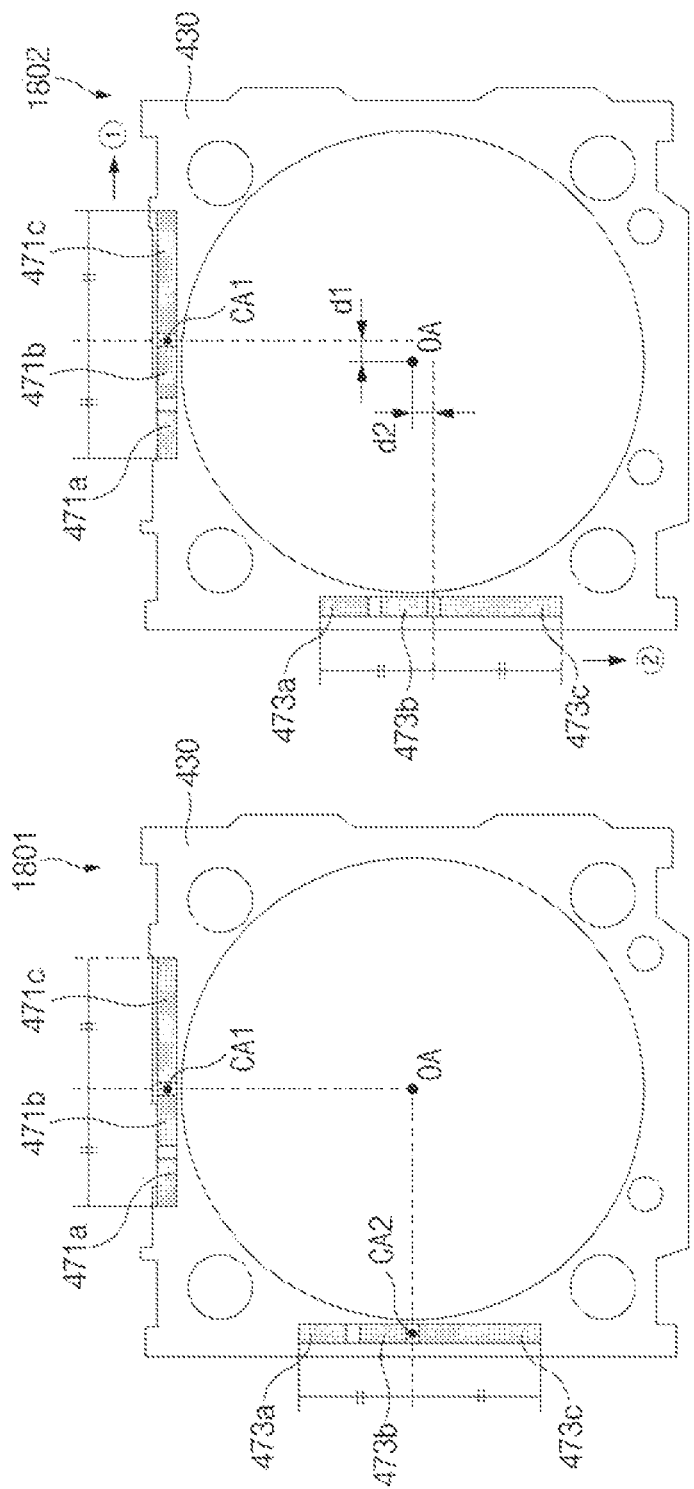
FIG. 18A is a diagram of various arrangement structures of yoke members of the camera module according to an embodiment.
Figure 18B:
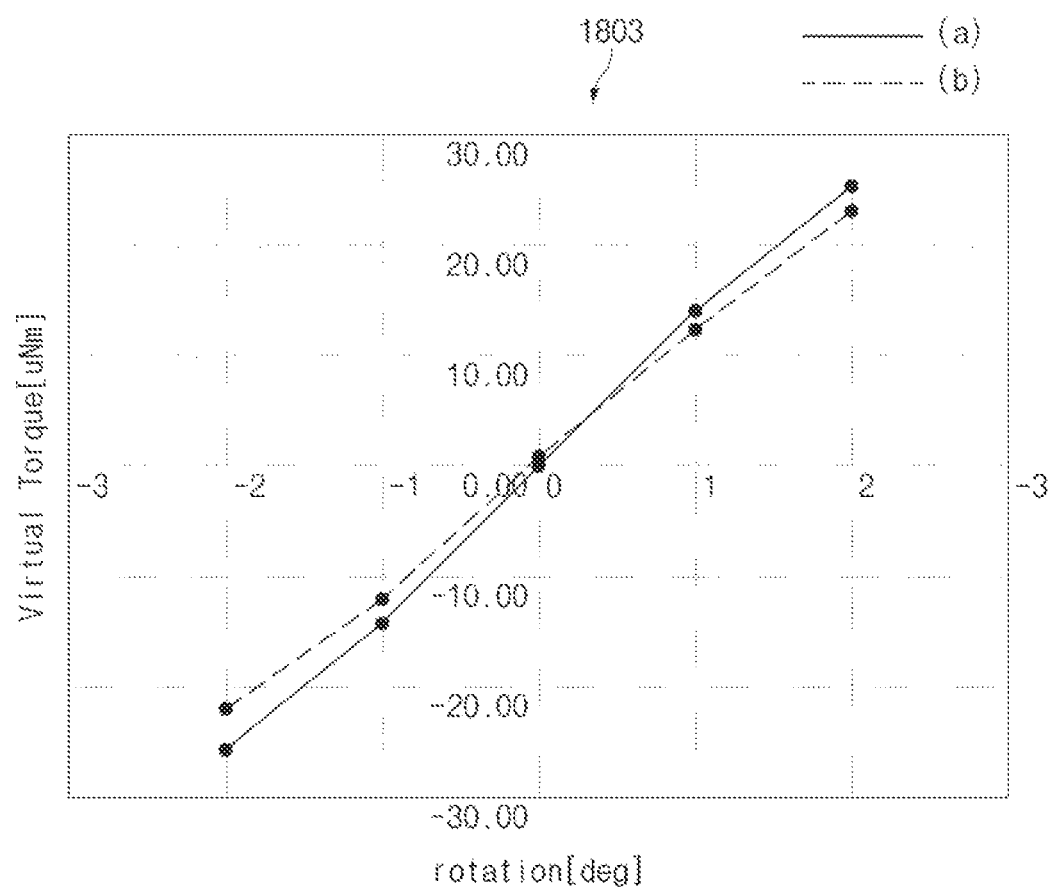
FIG. 18B is a graph depicting the magnitudes of rotational restoring forces for the various arrangement structures of the yoke members illustrated in FIG. 18A according to an embodiment.

FIG. 18A is a diagram of various arrangement structures of yoke members of the camera module according to an embodiment. FIG. 18B is a graph depicting the magnitudes of rotational restoring forces for the various arrangement structures of the yoke members illustrated in FIG. 18A according to an embodiment.

FIG. 18A is a view illustrating the shapes and positions of yoke members according to embodiment 1801 and embodiment 1802. FIG. 18B is a graph depicting the rotational restoring forces (e.g., torques) for the yoke members according to embodiment 1801 and embodiment 1802.

Referring to FIG. 18A, in embodiment 1801 (e.g., embodiment 1103 of FIG. 11), the yoke members 470 may each be asymmetrically divided into three parts, the areas of the third parts 471c and 473c located far away from the rotation axis RA may be greater than the areas of the first parts 471a and 473a and the second parts 471b and 473b, and the yoke members 470 may be disposed in positions corresponding to a first arrangement structure (e.g., the first arrangement structure 1501 of FIG. 15). In embodiment 1802, the yoke members 470 may be disposed in positions corresponding to a second arrangement structure (e.g., the second arrangement structure 1502 of FIG. 15) by moving the positions of the yoke members 470 and the magnets (e.g., the first magnet 461 and the second magnet 463 of FIG. 15) in embodiment 1801. For example, embodiment 1802 may correspond to a structure in which, based on embodiment 1801, the first yoke member 471 is moved together with the first magnet 461 in the first direction ① by a predetermined distance and the second yoke member 473 is moved together with the second magnet 463 in the second direction ② by a predetermined distance. In embodiment 1802, the first central axis CA1 may be spaced apart from the optical axis OA by a specified distance in the first direction ①, and the second central axis CA2 may be spaced apart from the optical axis OA by a specified distance in the second direction ②.

Referring to FIG. 18B, graph 1803 is a graph depicting the rotational restoring forces for embodiment 1801 and embodiment 1802 and is a graph depicting rotational restoring force (unit: μNm) versus rotation angle (unit: ° (degree)). For example, in graph 1803, the horizontal axis represents rotation angle, and the vertical axis represents rotational restoring force. In graph 1803, (a) is a graph depicting the rotational restoring forces of the yoke members according to embodiment 1802, and (b) is a graph depicting the rotational restoring forces of the yoke members according to embodiment 1801.

Based on graph 1803, the rotational restoring forces for embodiment 1801 and embodiment 1802 may be listed as in Table 6 below. In Table 6, the rotational restoring forces indicated by the + sign and the rotational restoring forces indicated by the − sign may face opposite directions.

TABLE 6

|  | Embodiment 1801 | Embodiment 1802 |
| --- | --- | --- |
| −2 (deg) | −22.05 | −25.54 |
| −1 (deg) | −12.01 | −14.27 |
| 0 (deg) | 0.70 | −0.01 |
| 1 (deg) | 12.26 | 13.96 |
| 2 (deg) | 23.24 | 25.56 |

Referring to Table 6 together with graph 1803, it can be seen that the magnitudes of the rotational restoring forces in the arrangement structure of embodiment 1802 are greater than the magnitudes of the rotational restoring forces in the arrangement structure of embodiment 1801. When the yoke members 470 and the magnets 461 and 463 are disposed such that the rotation axis RA is located close to the optical axis OA as described above, the radius of rotation may be formed to be larger, and thus the rotational restoring forces may be increased.

Figure 19A:
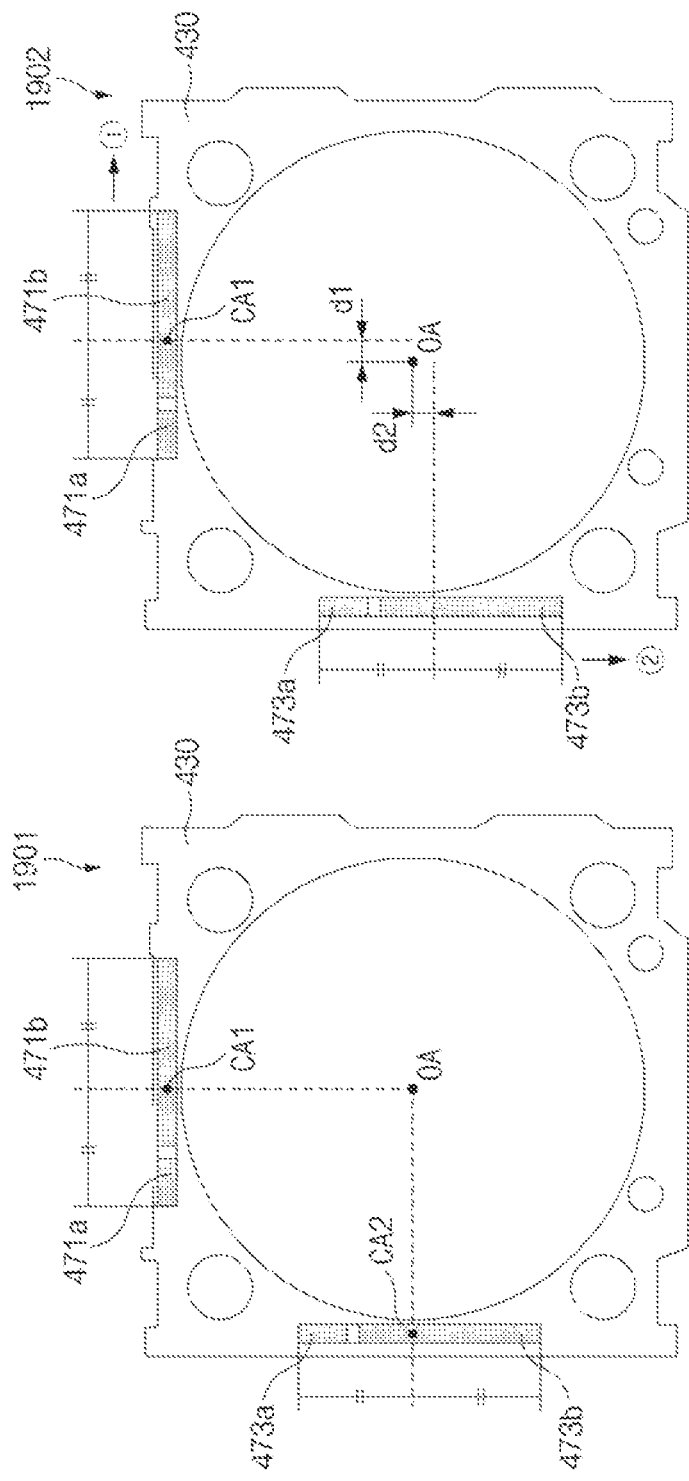
FIG. 19A is a diagram of various arrangement structures of yoke members of the camera module according to an embodiment.
Figure 19B:
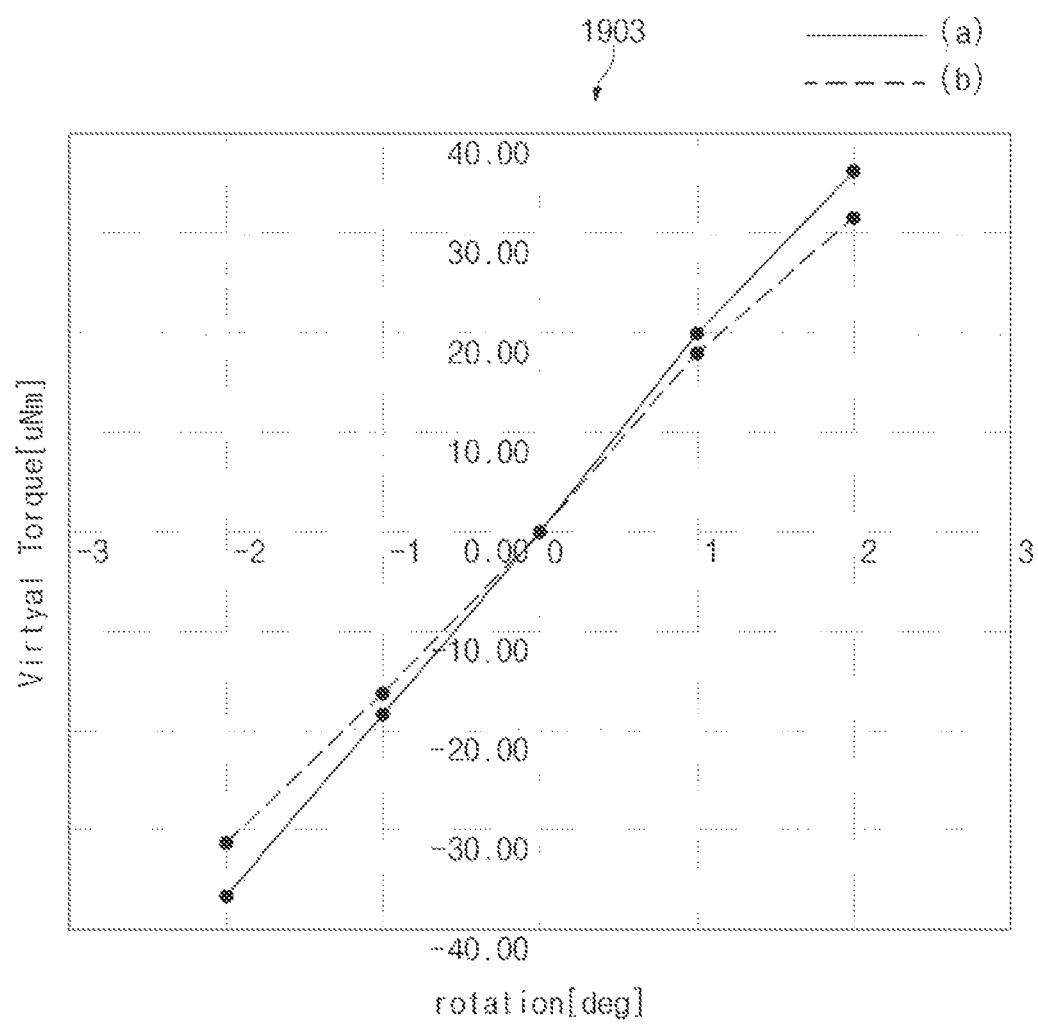
FIG. 19B is a graph depicting the magnitudes of rotational restoring forces for the various arrangement structures of the yoke members illustrated in FIG. 19A according to an embodiment.

FIG. 19A is a diagram of various arrangement structures of yoke members of the camera module according to an embodiment. FIG. 19B is a graph depicting the magnitudes of rotational restoring forces for the various arrangement structures of the yoke members illustrated in FIG. 19A according to an embodiment.

FIG. 19A is a view illustrating the shapes and positions of yoke members according to embodiment 1901 and embodiment 1902. FIG. 19B is a graph depicting rotational restoring forces (e.g., torques) for the yoke members according to embodiment 1901 and embodiment 1902.

Referring to FIG. 19A, in embodiment 1901 (e.g., embodiment 1104 of FIG. 11), the yoke members 470 may each be asymmetrically divided into two parts, the areas of the second parts 471b and 473b located far away from the rotation axis RA may be greater than the areas of the first parts 471a and 473a, and the yoke members 470 may be disposed in positions corresponding to a first arrangement structure (e.g., the first arrangement structure 1501 of FIG. 15). In embodiment 1902, the yoke members 470 may be disposed in positions corresponding to a second arrangement structure (e.g., the second arrangement structure 1502 of FIG. 15) by moving the positions of the yoke members 470 and the magnets (e.g., the first magnet 461 and the second magnet 463 of FIG. 15) in embodiment 1901. For example, embodiment 1902 may correspond to a structure in which, based on embodiment 1901, the first yoke member 471 is moved together with the first magnet 461 in the first direction ① by a predetermined distance and the second yoke member 473 is moved together with the second magnet 463 in the second direction ② by a predetermined distance. In embodiment 1902, the first central axis CA1 may be spaced apart from the optical axis OA by a first distance d1 in the first direction ①, and the second central axis CA2 may be spaced apart from the optical axis OA by a second distance d2 in the second direction ②. The first distance d1 and the second distance d2 may be equal to or different from each other.

Referring to FIG. 19B, graph 1903 is a graph depicting the rotational restoring forces for embodiment 1901 and embodiment 1902 and is a graph depicting rotational restoring force (unit: µNm) versus rotation angle (unit: ° (degree)). For example, in graph 1903, the horizontal axis represents rotation angle, and the vertical axis represents rotational restoring force. In graph 1903, (a) is a graph depicting the rotational restoring forces of the yoke members according to embodiment 1902, and (b) is a graph depicting the rotational restoring forces of the yoke members according to embodiment 1901.

Based on graph 1903, the rotational restoring forces for embodiment 1901 and embodiment 1902 may be listed as in Table 7 below. In Table 7, the rotational restoring forces indicated by the + sign and the rotational restoring forces indicated by the − sign may face opposite directions.

TABLE 7

|  | Embodiment 1901 | Embodiment 1902 |
|---|---|---|
| −2 (deg) | −31.13 | −36.36 |
| −1 (deg) | −16.43 | −18.33 |
| 0 (deg) | −0.04 | −0.24 |
| 1 (deg) | 18.09 | 19.42 |
| 2 (deg) | 31.71 | 36.23 |

Referring to Table 7 together with graph 1903, it can be seen that the magnitudes of the rotational restoring forces in the arrangement structure of embodiment 1902 are greater than the magnitudes of the rotational restoring forces in the arrangement structure of embodiment 1901. When the yoke members 470 and the magnets 461 and 463 are disposed such that the rotation axis RA is located close to the optical axis OA as described above, the radius of rotation may be formed to be larger, and thus the rotational restoring forces may be increased.

Figure 20A:
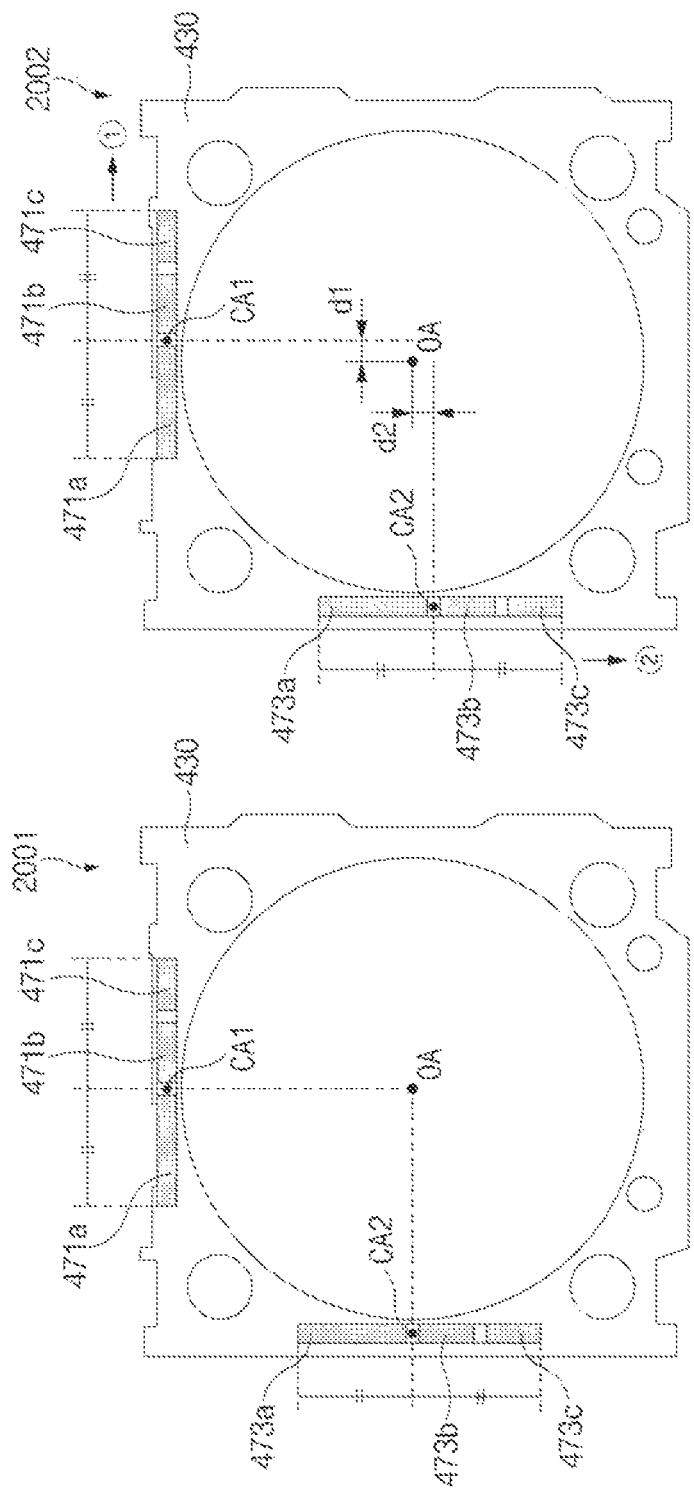
FIG. 20A is a diagram of various arrangement structures of yoke members of the camera module according to an embodiment.
Figure 20B:
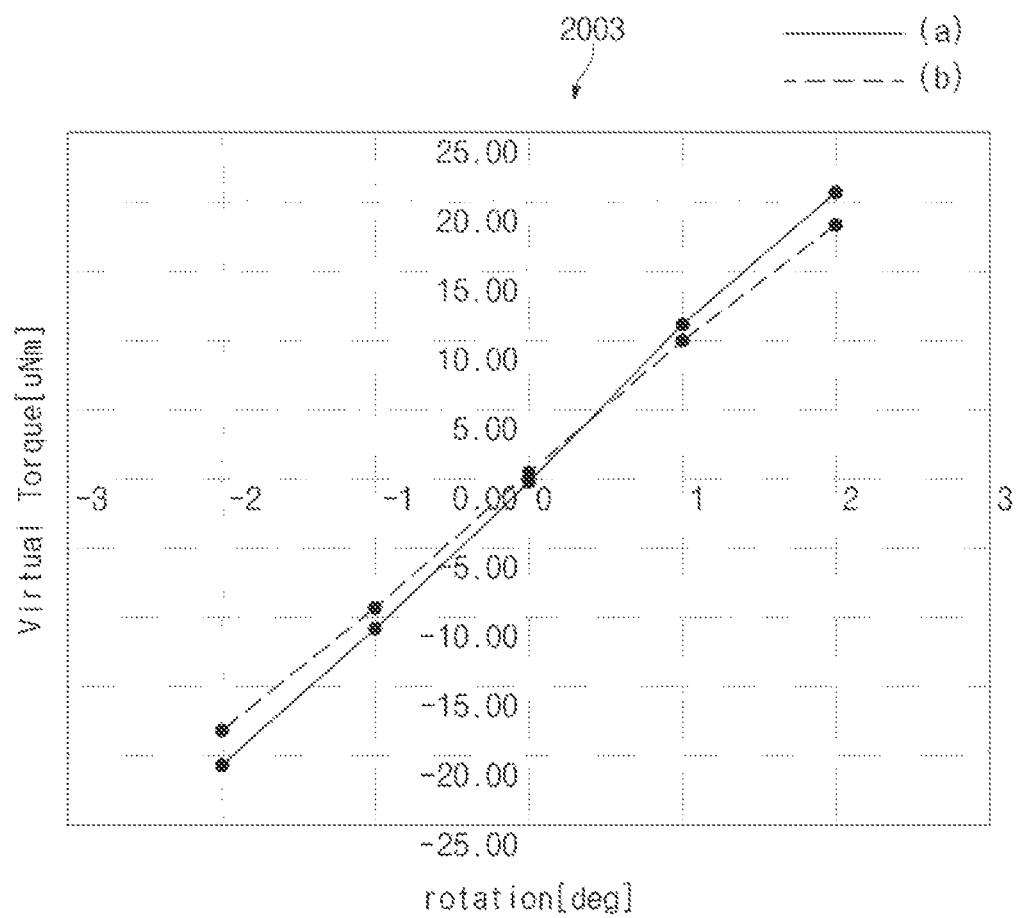
FIG. 20B is a graph depicting the magnitudes of rotational restoring forces for the various arrangement structures of the yoke members illustrated in FIG. 20A according to an embodiment.

FIG. 20A is a diagram of various arrangement structures of yoke members of the camera module according to an embodiment. FIG. 20B is a graph depicting the magnitudes of rotational restoring forces for the various arrangement structures of the yoke members illustrated in FIG. 20A according to an embodiment.

FIG. 20A is a view illustrating the shapes and positions of yoke members according to comparative example 2001 and embodiment 2002. FIG. 20B is a graph depicting rotational restoring forces (e.g., torques) for the yoke members according to comparative example 2001 and embodiment 2002.

Referring to FIG. 20A, in comparative example 2001 (e.g., comparative example 1301 of FIG. 13A), the yoke members 470 may each be asymmetrically divided into three parts, the areas of the first parts 471a and 473a located close to the rotation axis RA may be greater than the areas of the second parts 471b and 473b and the third parts 471c and 473c, and the yoke members 470 may be disposed in positions corresponding to a first arrangement structure (e.g., the first arrangement structure 1501 of FIG. 15). In embodiment 2002, the yoke members 470 may be disposed in positions corresponding to a second arrangement structure (e.g., the second arrangement structure 1502 of FIG. 15) by moving the positions of the yoke members 470 and the magnets (e.g., the first magnet 461 and the second magnet 463 of FIG. 15) in comparative example 2001. For example, embodiment 2002 may correspond to a structure in which, based on comparative example 2001, the first yoke member 471 is moved together with the first magnet 461 in the first direction ① by a predetermined distance and the second yoke member 473 is moved together with the second magnet 463 in the second direction ② by a predetermined distance. In embodiment 2002, the first central axis CA1 may be spaced apart from the optical axis OA by a first distance d1 in the first direction ①, and the second central axis CA2 may be spaced apart from the optical axis OA by a second distance d2 in the second direction ②. The first distance d1 and the second distance d2 may be equal to or different from each other.

Referring to FIG. 20B, graph 2003 is a graph depicting the rotational restoring forces for comparative example 2001 and embodiment 2002 and is a graph depicting rotational restoring force (unit: µNm) versus rotation angle (unit: ° (degree)). For example, in graph 2003, the horizontal axis represents rotation angle, and the vertical axis represents rotational restoring force. In graph 2003, (a) is a graph depicting the rotational restoring forces of the yoke members according to embodiment 2002, and (b) is a graph depicting the rotational restoring forces of the yoke members according to comparative example 2001.

Based on graph 2003, the rotational restoring forces for comparative example 2001 and embodiment 2002 may be listed as in Table 8 below. In Table 8, the rotational restoring forces indicated by the + sign and the rotational restoring forces indicated by the − sign may face opposite directions.

TABLE 8

|  | Comparative example 2001 | Embodiment 2002 |
|---|---|---|
| −2 (deg) | −18.05 | −20.65 |
| −1 (deg) | −9.33 | −10.64 |
| 0 (deg) | 0.40 | 0.01 |
| 1 (deg) | 9.95 | 11.20 |
| 2 (deg) | 18.39 | 20.85 |

Referring to Table 8 together with graph 2003, it can be seen that the magnitudes of the rotational restoring forces in the arrangement structure of embodiment 2002 are greater than the magnitudes of the rotational restoring forces in the arrangement structure of comparative example 2001. When the yoke members 470 and the magnets 461 and 463 are disposed such that the rotation axis RA is located close to the optical axis OA as described above, the radius of rotation may be formed to be larger, and thus the rotational restoring forces may be increased.

Figure 21A:
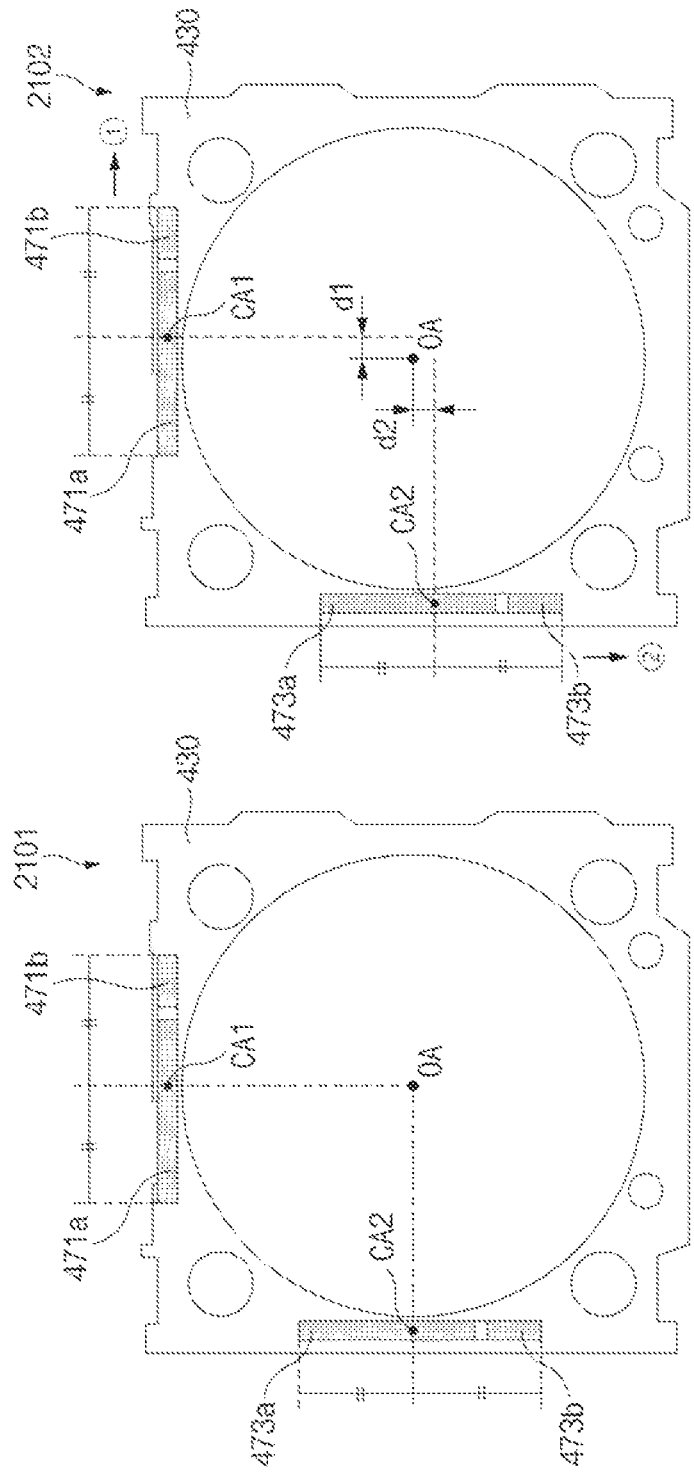
FIG. 21A is a diagram of various arrangement structures of yoke members of the camera module according to an embodiment.
Figure 21B:
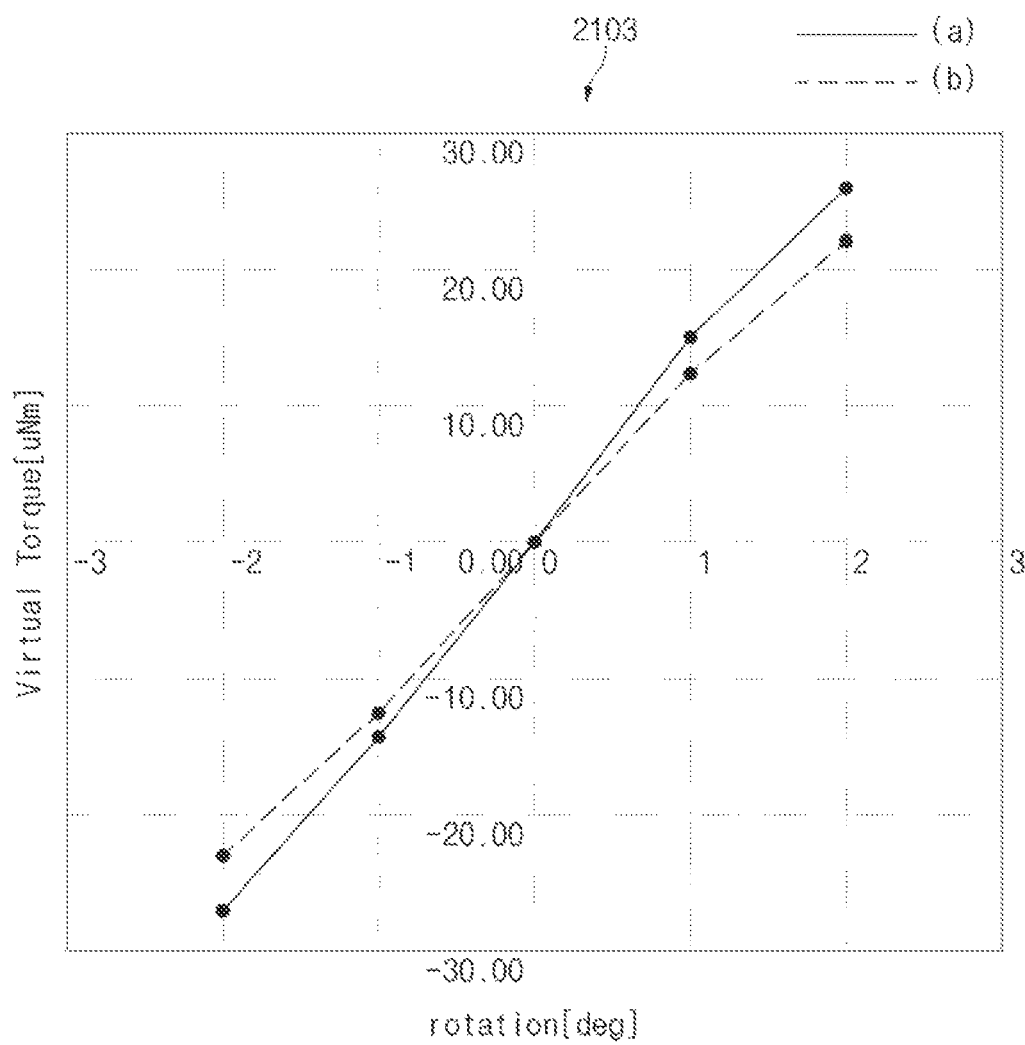
FIG. 21B is a graph depicting the magnitudes of rotational restoring forces for the various arrangement structures of the yoke members illustrated in FIG. 21A according to an embodiment.

FIG. 21A is a diagram of various arrangement structures of yoke members of the camera module according to an embodiment. FIG. 21B is a graph depicting the magnitudes of rotational restoring forces for the various arrangement structures of the yoke members illustrated in FIG. 21A according to an embodiment.

FIG. 21A is a view illustrating the shapes and positions of yoke members according to comparative example 2101 and embodiment 2102. FIG. 21B is a graph depicting rotational restoring forces (e.g., torques) for the yoke members according to comparative example 2101 and embodiment 2102.

Referring to FIG. 21A, in comparative example 2101 (e.g., comparative example 1401 of FIG. 14A), the yoke members 470 may each be asymmetrically divided into two parts, the areas of the first parts 471a and 473a located close to the rotation axis RA may be greater than the areas of the second parts 471b and 473b, and the yoke members 470 may be disposed in positions corresponding to a first arrangement structure (e.g., the first arrangement structure 1501 of FIG. 15). In embodiment 2102, the yoke members 470 may be disposed in positions corresponding to a second arrangement structure (e.g., the second arrangement structure 1502 of FIG. 15) by moving the positions of the yoke members 470 and the magnets (e.g., the first magnet 461 and the second magnet 463 of FIG. 15) in comparative example 2101. For example, embodiment 2102 may correspond to a structure in which, based on comparative example 2101, the first yoke member 471 is moved together with the first magnet 461 in the first direction ① by a predetermined distance and the second yoke member 473 is moved together with the second magnet 463 in the second direction ② by a predetermined distance. In embodiment 2102, the first central axis CA1 may be spaced apart from the optical axis OA by a first distance d1 in the first direction ①, and the second central axis CA2 may be spaced apart from the optical axis OA by a second distance d2 in the second direction ②. The first distance d1 and the second distance d2 may be equal to or different from each other.

Referring to FIG. 21B, graph 2103 is a graph depicting the rotational restoring forces for comparative example 2101 and embodiment 2102 and is a graph depicting rotational restoring force (unit: μNm) versus rotation angle (unit: ° (degree)). For example, in graph 2103, the horizontal axis represents rotation angle, and the vertical axis represents rotational restoring force. In graph 2103, (a) is a graph depicting the rotational restoring forces of the yoke members according to embodiment 2102, and (b) is a graph depicting the rotational restoring forces of the yoke members according to comparative example 2101.

Based on graph 2103, the rotational restoring forces for comparative example 2101 and embodiment 2102 may be listed as in Table 9 below. In Table 9, the rotational restoring forces indicated by the + sign and the rotational restoring forces indicated by the − sign may face opposite directions.

TABLE 9

|  | Comparative example 2101 | Embodiment 2102 |
| --- | --- | --- |
| −2 (deg) | −22.90 | −26.94 |
| −1 (deg) | −12.60 | −14.18 |
| 0 (deg) | −0.22 | −0.13 |
| 1 (deg) | 12.36 | 15.12 |
| 2 (deg) | 22.10 | 25.94 |

Referring to Table 9 together with graph 2103, it can be seen that the magnitudes of the rotational restoring forces in the arrangement structure of embodiment 2102 are greater than the magnitudes of the rotational restoring forces in the arrangement structure of comparative example 2101. When the yoke members 470 and the magnets 461 and 463 are disposed such that the rotation axis RA is located close to the optical axis OA as described above, the radius of rotation may be formed to be larger, and thus the rotational restoring forces may be increased.

Figure 22:
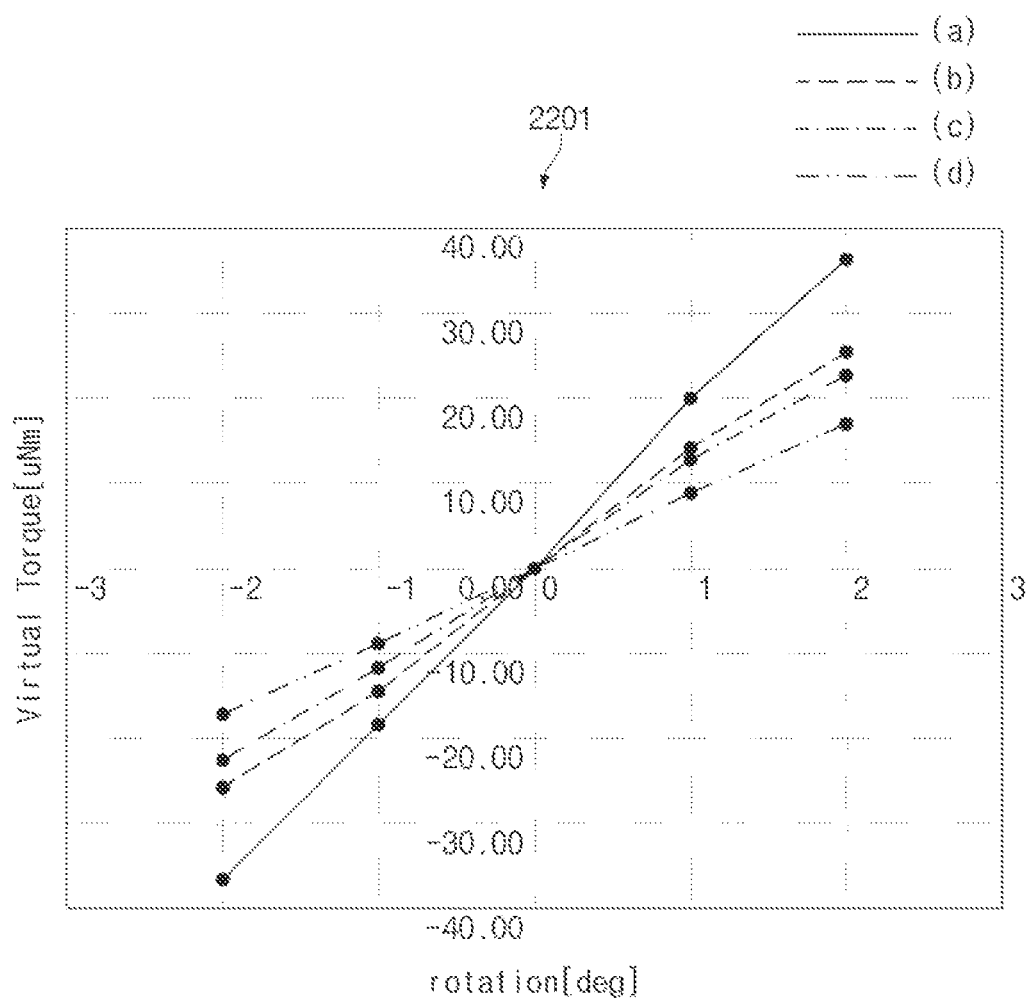
FIG. 22 is a graph depicting the magnitudes of rotational restoring forces for yoke members according to various embodiments.

FIG. 22 is a graph depicting the magnitudes of rotational restoring forces for yoke members according to various embodiments.

Referring to FIG. 22, graph 2201 is a graph depicting the rotational restoring forces for embodiment 1602 of FIG. 16A, embodiment 1702 of FIG. 17A, embodiment 1802 of FIG. 18A, and embodiment 1902 of FIG. 19A, and is a graph depicting rotational restoring force (unit: μNm) versus rotation angle (unit: ° (degree)). For example, in graph 2201, the horizontal axis represents rotation angle, and the vertical axis represents rotational restoring force. In graph 2201, (a) is a graph depicting the rotational restoring forces according to embodiment 1902, (b) is a graph depicting the rotational restoring forces according to embodiment 1802, (c) is a graph depicting the rotational restoring forces according to embodiment 1702, and (d) is a graph depicting the rotational restoring forces according to embodiment 1602.

Based on graph 2201, the rotational restoring forces for embodiment 1602, embodiment 1702, embodiment 1802, and embodiment 1902 may be listed as in Table 10 below. In Table 10, the rotational restoring forces indicated by the + sign and the rotational restoring forces indicated by the − sign may face opposite directions.

TABLE 10

|  | Embodiment 1602 | Embodiment 1702 | Embodiment 1802 | Embodiment 1902 |
| --- | --- | --- | --- | --- |
| −2 (deg) | −17.03 | −22.48 | −25.54 | −36.36 |
| −1 (deg) | −8.82 | −11.79 | −14.27 | −18.33 |
| 0 (deg) | 0.16 | 0.36 | −0.01 | −0.24 |
| 1 (deg) | 8.82 | 12.84 | 13.96 | 19.42 |
| 2 (deg) | 17.25 | 22.65 | 25.56 | 36.23 |

Referring to Table 10 together with graph 2201, it can be seen that the magnitudes of the rotational restoring forces in embodiment 1802 and embodiment 1902 are greater than the magnitudes of the rotational restoring forces in embodiment 1602 and embodiment 1702. In addition, it can be seen that the rotational restoring forces are increased in the order of embodiment 1602, embodiment 1702, embodiment 1802, and embodiment 1902. The rotational restoring forces may be increased by asymmetrically dividing the yoke members 470 and making the areas (or, lengths) of the parts far away from the rotation axis RA larger as described above.

Figure 23A:
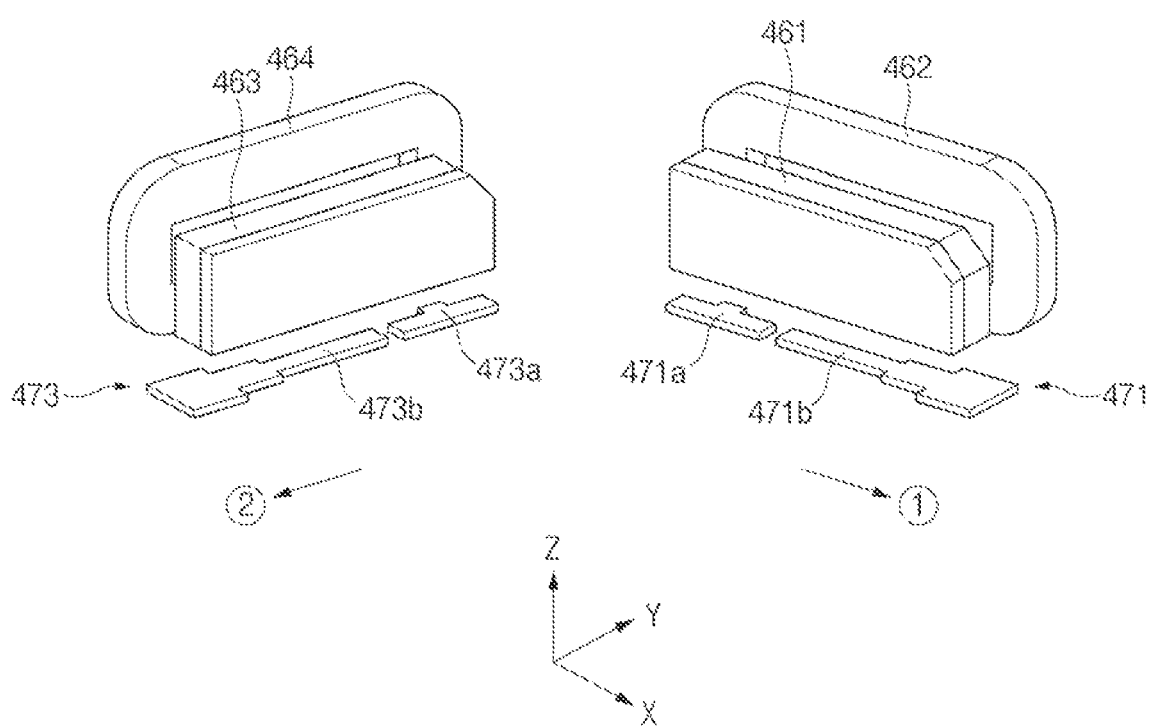
FIG. 23A is a diagram of a first drive unit and yoke members of a camera module according to various embodiments.
Figure 23B:
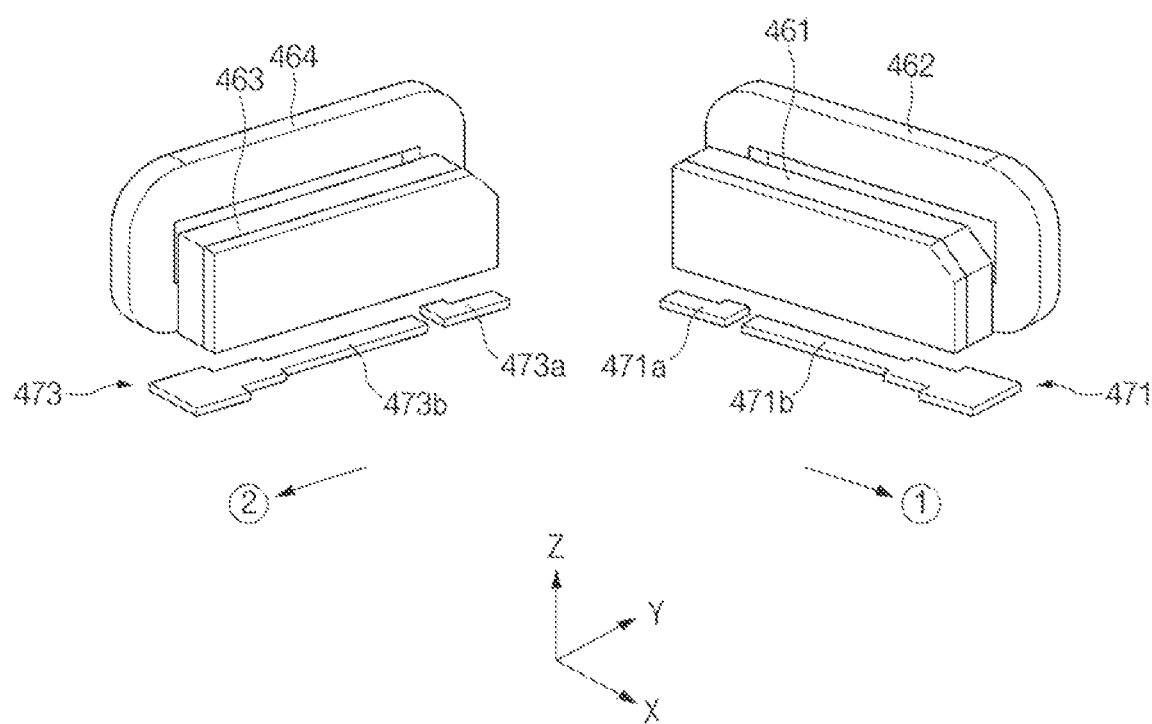
FIG. 23B is a diagram of the first drive unit and the yoke members of the camera module according to various embodiments.

FIG. 23A is a diagram of a first drive unit and yoke members of a camera module according to various embodiments. FIG. 23B is a diagram of the first drive unit and the yoke members of the camera module according to various embodiments.

Referring to FIGS. 23A and 23B, the camera module 400 according to an embodiment may include a first magnet 461, a second magnet 463 disposed perpendicular to the first magnet 461, a first coil 462 facing the first magnet 461, a second coil 464 facing the second magnet 463, a first yoke member 471 forming an attractive force with the first magnet 461, and a second yoke member 473 forming an attractive force with the second magnet 463.

In an embodiment, the first yoke member 471 (e.g., the first yoke member 471 of FIG. 10A) may include a first part 471a (e.g., the first part 471a of FIG. 10A) and a second part 471b (e.g., the second part 471b of FIG. 10A) that are spaced apart from each other by a predetermined gap in a first direction ①. The first direction ① may be a direction parallel to the direction of a second movement axis (e.g., the second movement axis S2 of FIG. 9) and away from the second magnet 463. The first yoke member 471 may be formed such that the area (or, volume) of the second part 471b is greater than the area (or, volume) of the first part 471a, and thus a rotational restoring force may increase.

In an embodiment, the first yoke member 471 may be formed such that the area of the second part 471b increases in the first direction ①. For example, the second part 471b may be formed in a shape in which the area of the surface facing the first magnet 461 increases in the first direction ①. Accordingly, a relatively strong attractive force may be formed on a portion of the second part 471b located far away from a rotation axis (e.g., the rotation axis RA of FIG. 9), and thus the rotational restoring force may be further increased.

In an embodiment, the second yoke member 473 (e.g., the first yoke member 473 of FIG. 10A) may include a first part 473a (e.g., the first part 473a of FIG. 10A) and a second part 473b (e.g., the second part 473b of FIG. 10A) that are spaced apart from each other by a predetermined gap in a second direction ②. The second direction ② may be a direction parallel to the direction of a first movement axis (e.g., the first movement axis S1 of FIG. 9) and away from the first magnet 461. The second yoke member 473 may be formed such that the area (or, volume) of the second part 473b is greater than the area (or, volume) of the first part 473a, and thus a rotational restoring force may increase.

In an embodiment, the second yoke member 473 may be formed such that the area of the second part 473b increases in the second direction ②. For example, the second part 473b may be formed in a shape in which the area of the surface facing the second magnet 463 increases in the second direction ②. Accordingly, a relatively strong attractive force may be formed on a portion of the second part 473b located far away from the rotation axis (e.g., the rotation axis RA of FIG. 9), and thus the rotational restoring force may be further increased.

The shapes of the first yoke member 471 and the second yoke member 473 illustrated in FIGS. 23A and 23B are illustrative, and the first yoke member 471 and the second yoke member 473 are not limited to the illustrated example. According to various embodiments, the first yoke member 471 and the second yoke member 473 may be formed in various shapes in which the areas of the second parts 471b and 473b increase gradually or in a stepwise manner in the first direction ① and the second direction ② depending on the shape of a first carrier (e.g., the first carrier 430 of FIG. 11) and the positions in which the first yoke member 471 and the second yoke member 473 are disposed on the first carrier 430.

Figure 24A:
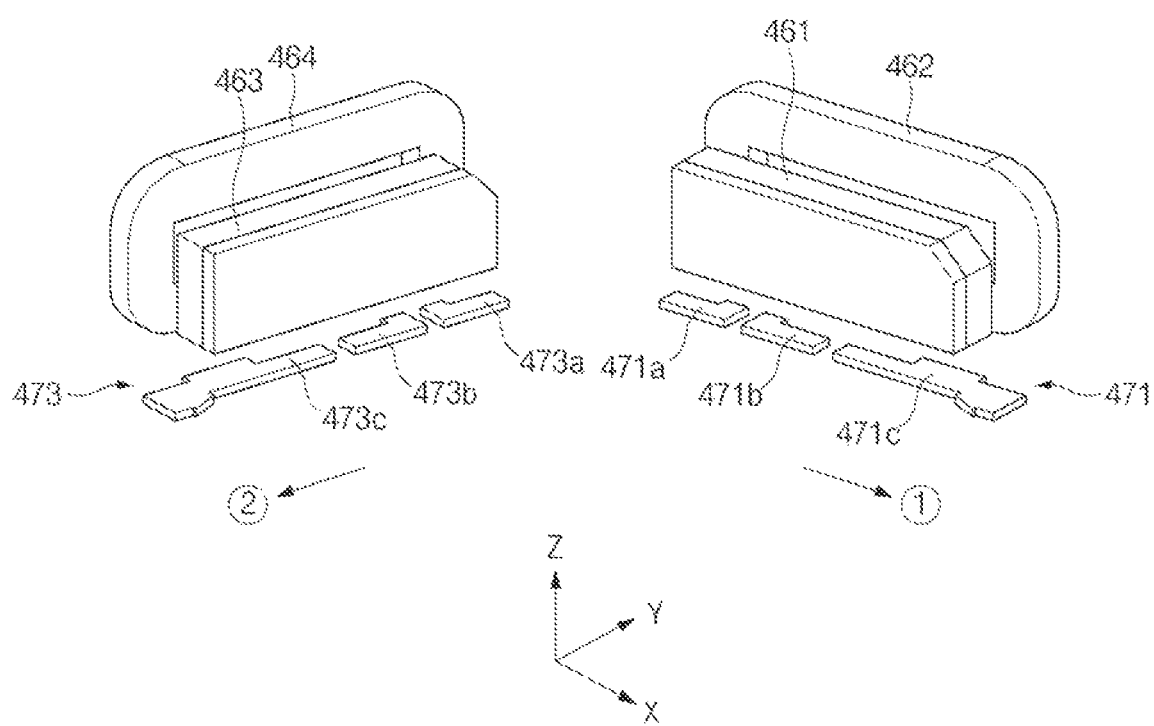
FIG. 24A is a diagram of a first drive unit and yoke members of a camera module according to various embodiments.
Figure 24B:
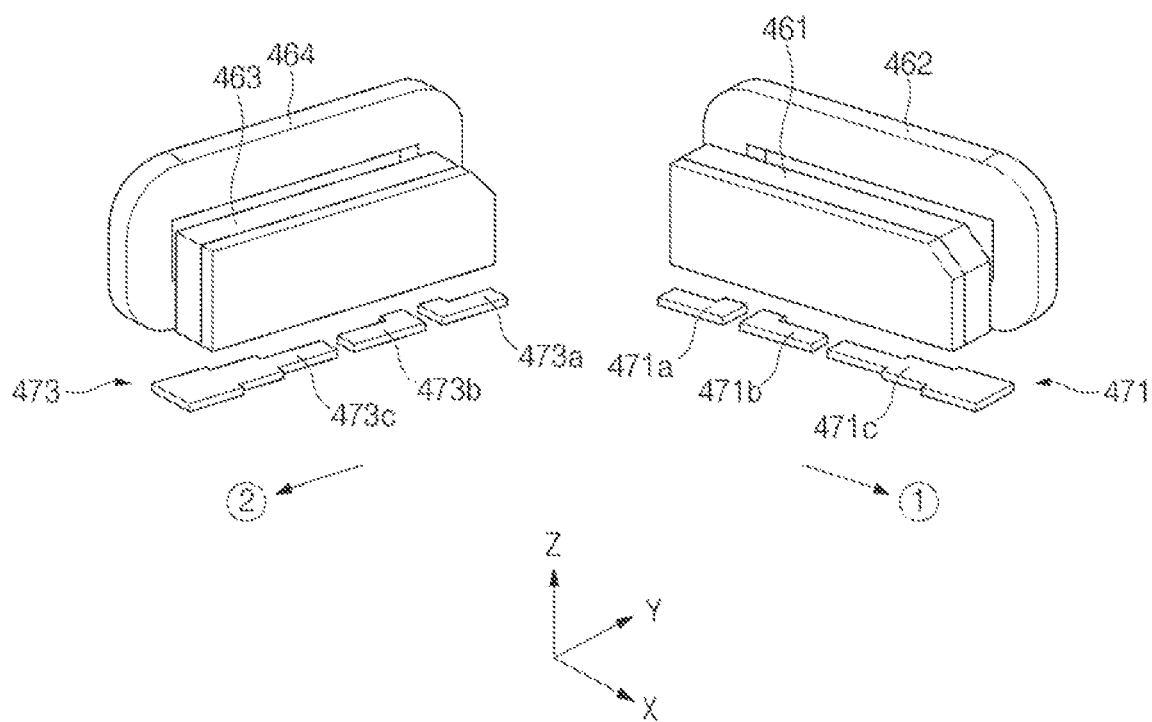
FIG. 24B is a diagram of the first drive unit and the yoke members of the camera module according to various embodiments.

FIG. 24A is a diagram of a first drive unit and yoke members of a camera module according to various embodiments. FIG. 24B is a diagram of the first drive unit and the yoke members of the camera module according to various embodiments.

Referring to FIGS. 24A and 24B, the camera module 400 according to an embodiment may include a first magnet 461, a second magnet 463 disposed perpendicular to the first magnet 461, a first coil 462 facing the first magnet 461, a second coil 464 facing the second magnet 463, a first yoke member 471 forming an attractive force with the first magnet 461, and a second yoke member 473 forming an attractive force with the second magnet 463.

In an embodiment, the first yoke member 471 (e.g., the first yoke member 471 of FIG. 10B) may include a first part 471a (e.g., the first part 471a of FIG. 10B), a second part 471b (e.g., the second part 471b of FIG. 10B), and a third part 471c (e.g., the third part 471c of FIG. 10B) that are spaced apart from each other by a predetermined gap in a first direction ①. The first direction ① may be a direction parallel to the direction of a second movement axis (e.g., the second movement axis S2 of FIG. 9) and away from the second magnet 463. The first yoke member 471 may be formed such that the area (or, volume) of the third part 471c is greater than the areas (or, volumes) of the first part 471a and the second part 471b, and thus a rotational restoring force may increase.

In an embodiment, the first yoke member 471 may be formed such that the area of the third part 471c increases in the first direction ①. For example, the third part 471c may be formed in a shape in which the area of the surface facing the first magnet 461 increases in the first direction ①. Accordingly, a relatively strong attractive force may be formed on a portion of the third part 471c located far away from a rotation axis (e.g., the rotation axis RA of FIG. 9), and thus the rotational restoring force may be further increased.

In an embodiment, the second yoke member 473 (e.g., the second yoke member 473 of FIG. 10B) may include a first part 473a (e.g., the first part 473a of FIG. 10B), a second part 473b (e.g., the second part 473b of FIG. 10B), and a third part 473c (e.g., the third part 473c of FIG. 10B) that are spaced apart from each other by a predetermined gap in a second direction ②. The second direction ② may be a direction parallel to the direction of a first movement axis (e.g., the first movement axis S1 of FIG. 9) and away from the first magnet 461. The second yoke member 473 may be formed such that the area (or, volume) of the third part 473c is greater than the areas (or, volumes) of the first part 473a and the second part 473b, and thus a rotational restoring force may increase.

In an embodiment, the second yoke member 473 may be formed such that the area of the third part 473c increases in the second direction ②. For example, the third part 473c may be formed in a shape in which the area of the surface facing the second magnet 463 increases in the second direction ②. Accordingly, a relatively strong attractive force may be formed on a portion of the third part 473c located far away from the rotation axis (e.g., the rotation axis RA of FIG. 9), and thus the rotational restoring force may be further increased.

The shapes of the first yoke member 471 and the second yoke member 473 illustrated in FIGS. 24A and 24B are illustrative, and the first yoke member 471 and the second yoke member 473 are not limited to the illustrated example. According to various embodiments, the first yoke member 471 and the second yoke member 473 may be formed in various shapes in which the areas of the third parts 471c and 473c increase gradually or in a stepwise manner in the first direction ① and the second direction ② depending on the shape of a first carrier (e.g., the first carrier 430 of FIG. 11) and the positions in which the first yoke member 471 and the second yoke member 473 are disposed on the first carrier 430.

A camera module 400 according to an embodiment of the disclosure may include a camera housing 410, a first carrier 430 disposed in the camera housing so as to be movable, a second carrier 440 that is at least partially disposed in the first carrier and that has a lens 421 coupled thereto and moves relative to the first carrier in at least one direction perpendicular to an optical axis OA of the lens, a plurality of magnets 461 and 463 that are disposed on the second carrier and that include a first magnet 461 and a second magnet 463 that face directions perpendicular to each other, and a plurality of yoke members 470 that are disposed on the first carrier and that form magnetic attractions with the plurality of magnets, the plurality of yoke members including a first yoke member 471 and a second yoke member 473 that face the first magnet and the second magnet, respectively. The first yoke member may include a first part 471a and a second part 471b spaced apart from each other in a lengthwise direction of the first magnet, the second yoke member may include a first part 473a and a second part 473b spaced apart from each other in a lengthwise direction of the second magnet, and the second parts may be longer than the first parts or may have a larger area than the first parts. The first yoke member may be disposed such that the first part is located closer to the second magnet than the second part, and the second yoke member may be disposed such that the first part is located closer to the first magnet than the second part.

In various embodiments, the first yoke member may be configured such that the second part forms larger magnetic attraction with the first magnet than the first part, and the second yoke member may be configured such that the second part forms larger magnetic attraction with the second magnet than the first part.

In various embodiments, the camera module may further include a first coil 462 that faces the first magnet and a second coil 464 that faces the second magnet. The first magnet and the first coil may be configured to move the second carrier in a direction of a first movement axis S1 perpendicular to the optical axis through electromagnetic interaction. The second magnet and the second coil may be configured to move the second carrier in a direction of a second movement axis S2 perpendicular to the optical axis and the first movement axis through electromagnetic interaction.

In various embodiments, the plurality of magnets may be disposed such that the first magnet faces the direction of the first movement axis and the second magnet faces the direction of the second movement axis. The first part and the second part of the first yoke member may be sequentially disposed in a first direction ①, and the first direction may be a direction parallel to the second movement axis and away from the second magnet. The first part and the second part of the second yoke member may be sequentially disposed in a second direction ②, and the second direction may be a direction parallel to the first movement axis and away from the first magnet.

In various embodiments, the first magnet and the first coil may form a driving force facing the second direction or a direction opposite to the second direction depending on a direction of a current applied to the first coil, and the second magnet and the second coil may form a driving force facing the first direction or a direction opposite to the first direction depending on a direction of a current applied to the second coil.

In various embodiments, the first yoke member may further include a third part 471b disposed between the first part 471a and the second part 471c of the first yoke member, and the second yoke member may further include a third part 473b disposed between the first part 473a and the second part 473c of the second yoke member. The third parts may be shorter than the second parts or may have a smaller area than the second parts.

In various embodiments, the first part, the third part, and the second part of the first yoke member may be sequentially disposed in the first direction, and the first part, the third part, and the second part of the second yoke member may be sequentially disposed in the second direction.

In various embodiments, the first yoke member may be configured such that the second part forms stronger magnetic attraction with the first magnet than the first part and the third part, and the second yoke member may be configured such that the second part forms stronger magnetic attraction with the second magnet than the first part and the third part.

In various embodiments, a first central axis CA1 and a second central axis CA2 parallel to the optical axis may be defined in the first magnet and the second magnet, respectively. The first yoke member may be disposed in a position in which the center of the first yoke member overlaps the first central axis when viewed in the direction of the first movement axis, and the second yoke member may be disposed in a position in which the center of the second yoke member overlaps the second central axis when viewed in the direction of the second movement axis.

In various embodiments, a rotation axis RA may be defined to extend parallel to the optical axis and to pass through the center of a line segment LS connecting the first central axis and the second central axis so as to be perpendicular to the first central axis and the second central axis, and the plurality of yoke members may be configured such that the second parts are located farther away from the rotation axis than the first parts.

In various embodiments, the first magnet and the first yoke member may be disposed in a position in which the first central axis is spaced apart from the optical axis by a first distance d1 in the first direction when viewed in the direction of the first movement axis.

In various embodiments, the second magnet and the second yoke member may be disposed in a position in which the second central axis is spaced apart from the optical axis by a second distance d2 in the second direction when viewed in the direction of the second movement axis.

In various embodiments, when viewed in a direction of the optical axis, a first line segment L1 connecting the optical axis and the first central axis and a second line segment L2 connecting the optical axis and the second central axis may be defined, and an included angle A3 formed by the first line segment and the second line segment may be an obtuse angle.

In various embodiments, the plurality of magnets may be disposed such that the first magnet faces the direction of the second movement axis and the second magnet faces the direction of the first movement axis. The first part and the second part of the first yoke member may be sequentially disposed in a first direction, and the first direction may be a direction parallel to the first movement axis and away from the second magnet. The first part and the second part of the second yoke member may be sequentially disposed in a second direction, and the second direction may be a direction parallel to the second movement axis and away from the first magnet.

In various embodiments, the first magnet and the first coil may form a driving force facing the first direction or a direction opposite to the first direction depending on a direction of a current applied to the first coil, and the second magnet and the second coil may form a driving force facing the second direction or a direction opposite to the second direction depending on a direction of a current applied to the second coil.

A camera module 400 according to an embodiment of the disclosure may include a camera housing 410, a first carrier 430 disposed in the camera housing so as to be movable, a second carrier 440 that is at least partially disposed in the first carrier and that has a lens 421 coupled thereto and moves relative to the first carrier in a direction perpendicular to an optical axis OA of the lens, a first magnet 461 that is disposed on the second carrier and that moves the second carrier in a direction of a first movement axis S1 perpendicular to the optical axis, a second magnet 463 that is disposed on the second carrier and that moves the second carrier in a direction of a second movement axis S2 perpendicular to the optical axis and the first movement axis, a first yoke member 471 that is disposed on the first carrier and that forms magnetic attraction with the first magnet, and a second yoke member 473 that is disposed on the first carrier and that forms magnetic attraction with the second magnet. A first central axis CA1 and a second central axis CA2 parallel to the optical axis may be defined in the first magnet and the second magnet, respectively. When viewed in a direction of the optical axis, a first line segment L1 connecting the optical axis and the first central axis and a second line segment L2 connecting the optical axis and the second central axis may be defined, and an included angle A3 formed by the first line segment and the second line segment may be an obtuse angle.

In various embodiments, when viewed in the direction of the optical axis, a first extension line L3 extending from the optical axis in a direction parallel to the first movement axis and a second extension line L4 extending from the optical axis in a direction parallel to the second movement axis may be defined. The first line segment may form a first included angle A1 with the first extension line in a direction away from the second magnet, and the second line segment may form a second included angle A2 with the second extension line in a direction away from the first magnet.

In various embodiments, the first magnet may be disposed such that opposite surfaces thereof face the direction of the first movement axis, and the second magnet may be disposed such that opposite surfaces thereof face the direction of the second movement axis. The first yoke member may be disposed in a position in which the center of the first yoke member overlaps the first central axis when viewed in the direction of the first movement axis, and the second yoke member may be disposed in a position in which the center of the second yoke member overlaps the second central axis when viewed in the direction of the second movement axis.

In various embodiments, the first magnet and the first yoke member may be disposed in a position in which the first central axis is spaced apart from the optical axis by a first distance d1 in a first direction when viewed in the direction of the first movement axis. The first direction may be a direction parallel to the first movement axis and away from the second magnet.

In various embodiments, the second magnet and the second yoke member may be disposed in a position in which the second central axis is spaced apart from the optical axis by a second distance d2 in a second direction when viewed in the direction of the second movement axis. The second direction may be a direction parallel to the first movement axis and away from the first magnet.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. A camera module comprising:
a camera housing;
a first carrier provided in the camera housing and configured to be movable;
a lens;
a second carrier having the lens coupled thereto, the second carrier being at least partially provided in the first carrier and configured to move relative to the first carrier in at least one direction substantially perpendicular to an optical axis of the lens;
a plurality of magnets provided on the second carrier, the plurality of magnets comprising a first magnet and a second magnet facing directions perpendicular to each other; and
a plurality of yoke members provided on the first carrier and configured to form magnetic attractions with the plurality of magnets, the plurality of yoke members comprising a first yoke member facing the first magnet and a second yoke member facing the second magnet,
wherein the first yoke member comprises a first part and a second part spaced apart from the first part in a lengthwise direction of the first magnet,
wherein the second yoke member comprises a third part and a fourth part spaced apart from the third part in a lengthwise direction of the second magnet,
wherein the second part is longer than the first part or has a larger area than the first part,
wherein the fourth part is longer than the third part or has a larger area than the third part,
wherein the first part is closer to the second magnet than the second part, and
wherein the third part is closer to the first magnet than the fourth part.

2. The camera module of claim 1, wherein the second part is configured to form a larger magnetic attraction with the first magnet than the first part, and
wherein the fourth part is configured to form a larger magnetic attraction with the second magnet than the third part.

3. The camera module of claim 1, further comprising:
a first coil facing the first magnet; and
a second coil facing the second magnet,
wherein the first magnet and the first coil are configured to move the second carrier in a direction of a first movement axis perpendicular to the optical axis through electromagnetic interaction, and
wherein the second magnet and the second coil are configured to move the second carrier in a direction of a second movement axis perpendicular to the optical axis and the first movement axis through electromagnetic interaction.

4. The camera module of claim 3, wherein the first magnet faces the direction of the first movement axis and the second magnet faces the direction of the second movement axis,
wherein the first part and the second part of the first yoke member are sequentially disposed in a first direction that is parallel to the second movement axis and away from the second magnet, and
wherein the third part and the fourth part of the second yoke member are sequentially disposed in a second direction that is parallel to the first movement axis and away from the first magnet.

5. The camera module of claim 4, wherein the first magnet and the first coil are configured to form a driving force facing the second direction or a direction opposite to the second direction based on a direction of a current applied to the first coil, and
wherein the second magnet and the second coil are configured to form a driving force facing the first direction or a direction opposite to the first direction based on a direction of a current applied to the second coil.

6. The camera module of claim 4, wherein the first yoke member further comprises a fifth part provided between the first part and the second part of the first yoke member,
wherein the second yoke member further comprises a sixth part provided between the third part and the fourth part of the second yoke member,
wherein the fifth part is shorter than the second part or has a smaller area than the second part, and
wherein the sixth part is shorter than the fourth part or has a smaller area than the fourth part.

7. The camera module of claim 6, wherein the first part, the fifth part, and the second part of the first yoke member are sequentially disposed in the first direction, and
wherein the third part, the sixth part, and the fourth part of the second yoke member are sequentially disposed in the second direction.

8. The camera module of claim 6, wherein the second part is configured to form a stronger magnetic attraction with the first magnet than the first part and the fifth part, and
wherein the fourth part is configured to form a stronger magnetic attraction with the second magnet than the third part and the sixth part.

9. The camera module of claim 4, wherein a first central axis and a second central axis parallel to the optical axis are defined in the first magnet and the second magnet, respectively,
wherein the first yoke member is disposed at a position in which a center of the first yoke member overlaps the first central axis when viewed in the direction of the first movement axis, and
wherein the second yoke member is disposed at a position in which a center of the second yoke member overlaps the second central axis when viewed in the direction of the second movement axis.

10. The camera module of claim 9, wherein a rotation axis is defined to extend parallel to the optical axis and to pass through a center of a line segment connecting the first central axis and the second central axis so as to be perpendicular to the first central axis and the second central axis,
wherein the second part is located farther away from the rotation axis than the first part, and
wherein the fourth part is located farther away from the rotation axis than the third part.

11. The camera module of claim 9, wherein the first magnet and the first yoke member are disposed at a position in which the first central axis is spaced apart from the optical axis by a first distance in the first direction when viewed in the direction of the first movement axis.

12. The camera module of claim 9, wherein the second magnet and the second yoke member are disposed at a position in which the second central axis is spaced apart from the optical axis by a second distance in the second direction when viewed in the direction of the second movement axis.

13. The camera module of claim 9, wherein, when viewed in a direction of the optical axis, a first line segment connecting the optical axis and the first central axis and a second line segment connecting the optical axis and the second central axis are defined, and an angle formed by the first line segment and the second line segment is an obtuse angle.

14. The camera module of claim 3, wherein the first magnet faces the direction of the second movement axis and the second magnet faces the direction of the first movement axis,
wherein the first part and the second part of the first yoke member are sequentially disposed in a first direction that is parallel to the first movement axis and away from the second magnet, and
wherein the third part and the fourth part of the second yoke member are sequentially disposed in a second direction that is parallel to the second movement axis and away from the first magnet.

15. The camera module of claim 14, wherein the first magnet and the first coil are configured to form a driving force facing the first direction or a direction opposite to the first direction based on a direction of a current applied to the first coil, and
wherein the second magnet and the second coil are configured to form a driving force facing the second direction or a direction opposite to the second direction based on a direction of a current applied to the second coil.

16. A camera module comprising:
a camera housing;
a first carrier provided in the camera housing and configured to be movable;
a lens;
a second carrier having the lens coupled thereto, the second carrier being at least partially provided in the first carrier and configured to move relative to the first carrier in a direction perpendicular to an optical axis of the lens;
a first magnet provided on the second carrier and configured to move the second carrier in a direction of a first movement axis perpendicular to the optical axis;
a second magnet provided on the second carrier and configured to move the second carrier in a direction of a second movement axis perpendicular to the optical axis and the first movement axis;
a first yoke member provided on the first carrier and configured to form a magnetic attraction with the first magnet; and
a second yoke member provided on the first carrier and configured to form a magnetic attraction with the second magnet,
wherein a first central axis and a second central axis parallel to the optical axis are defined in the first magnet and the second magnet, respectively, and
wherein, when viewed in a direction of the optical axis, a first line segment connecting the optical axis and the first central axis and a second line segment connecting the optical axis and the second central axis are defined, and a first angle formed by the first line segment and the second line segment is an obtuse angle.

17. The camera module of claim 16, wherein, when viewed in the direction of the optical axis, a first extension line extending from the optical axis in a direction parallel to the first movement axis and a second extension line extending from the optical axis in a direction parallel to the second movement axis are defined,
wherein the first line segment forms a second angle with the first extension line in a direction away from the second magnet, and
wherein the second line segment forms a third angle with the second extension line in a direction away from the first magnet.

18. The camera module of claim 16, wherein opposite surfaces of the first magnet face the direction of the first movement axis,
wherein opposite surfaces of the second magnet face the direction of the second movement axis,
wherein the first yoke member is disposed at a position in which a center of the first yoke member overlaps the first central axis when viewed in the direction of the first movement axis, and
wherein the second yoke member is disposed at a position in which a center of the second yoke member overlaps the second central axis when viewed in the direction of the second movement axis.

19. The camera module of claim 18, wherein the first magnet and the first yoke member are disposed at a position in which the first central axis is spaced apart from the optical axis by a first distance in a first direction when viewed in the direction of the first movement axis, and wherein the first direction is parallel to the second movement axis and away from the second magnet.

20. The camera module of claim 18, wherein the second magnet and the second yoke member are disposed at a position in which the second central axis is spaced apart from the optical axis by a second distance in a second direction when viewed in the direction of the second movement axis, and wherein the second direction is parallel to the first movement axis and away from the first magnet.

* * * * *